(12) United States Patent
Yoon et al.

(10) Patent No.: US 10,650,861 B2
(45) Date of Patent: May 12, 2020

(54) VIDEO SUMMARIZATION AND COLLABORATION SYSTEMS AND METHODS

(71) Applicant: Tildawatch, Inc., Palo Alto, CA (US)

(72) Inventors: Yi Hyan Yoon, Palo Alto, CA (US); Keesang Song, San Jose, CA (US); Su-ech Pettrakool, Santa Clara, CA (US)

(*) Notice: Subject to any disclaimer, the term of this patent is extended or adjusted under 35 U.S.C. 154(b) by 0 days.

(21) Appl. No.: 16/016,324

(22) Filed: Jun. 22, 2018

(65) Prior Publication Data
US 2019/0392866 A1    Dec. 26, 2019

(51) Int. Cl.
| | |
|---|---|
| *G11B 27/031* | (2006.01) |
| *G11B 27/19* | (2006.01) |
| *G06F 3/0482* | (2013.01) |
| *G06F 3/0488* | (2013.01) |

(52) U.S. Cl.
CPC ........... *G11B 27/031* (2013.01); *G11B 27/19* (2013.01); *G06F 3/0482* (2013.01); *G06F 3/0488* (2013.01)

(58) Field of Classification Search
CPC ..... G11B 27/031; G11B 27/19; G06F 3/0482; G06F 3/0488
See application file for complete search history.

(56) References Cited

U.S. PATENT DOCUMENTS

| | | | |
|---|---|---|---|
| 6,792,073 B2* | 9/2004 | Deasy | A61N 5/1031 378/64 |
| 2008/0292162 A1 | 11/2008 | Gering | |
| 2010/0188519 A1* | 7/2010 | Yamaoka | G06K 9/00369 348/222.1 |
| 2015/0213316 A1 | 7/2015 | Vunic et al. | |
| 2017/0061636 A1* | 3/2017 | Nordback | G06K 9/6267 |

FOREIGN PATENT DOCUMENTS

| | | | | |
|---|---|---|---|---|
| KR | 6792073 | * | 2/2018 | ......... H04N 21/8549 |
| WO | 2015038342 A1 | | 3/2015 | |

* cited by examiner

*Primary Examiner* — Mishwan N. Hunter
(74) *Attorney, Agent, or Firm* — Ellenoff Grossman & Schole LLP; James M. Smedley; Alex Korona

(57) ABSTRACT

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. In an illustrative example, the multimedia stream may be video. The video may be divided into segmented sections as a function of a characteristic of the video. The video characteristic may be, for example, a video temporal characteristic. In some examples, the highlight multimedia segment may be selected from the sections based on video segment content. A video highlight summary may be automatically created based on one or more highlight segments. Various examples may advantageously provide multi-user video montage creation based on the automatic highlight summaries.

20 Claims, 53 Drawing Sheets

From

From

To FIG. 5A

To FIG. 5A isinstanceof django.db.models.base.Model

- __init__(self, *args, **kwargs)
- from_db(cls, db, field_names, values)
- __repr__(self)
- __str__(self)
- __eq__(self, other)
- __ne__(self, other)
- __hash__(self)
- __reduce__(self)
- __setstate__(self, state)
- _get_pk_val(self, meta=None)
- _set_pk_val(self, value)
- get_deferred_fields(self)
- refresh_from_db(self, using=None, fields=None)
- serializable_value(self, field_name)
- save(self, force_insert=False, force_update=False, using=None, update_fields=None)
- save_base(self, raw=False, force_insert=False, force_update=False, using=None, update_fields=None)
- _save_parents(self, cls, using, update_fields)
- _save_table(self, raw=False, cls=None, force_insert=False, force_update=False, using=None, update_fields=None)
- _do_update(self, base_qs, using, pk_val, values, update_fields, forced_update)
- _do_insert(self, manager, using, fields, update_pk, raw)
- delete(self, using=None, keep_parents=False)
- _get_FIELD_display(self, field)
- _get_next_or_previous_by_FIELD(self, field, is_next, **kwargs)
- _get_next_or_previous_in_order(self, is_next)
- prepare_database_save(self, field)
- clean(self)
- validate_unique(self, exclude=None)
- _get_unique_checks(self, exclude=None)
- _perform_unique_checks(self, unique_checks)
- _perform_date_checks(self, date_checks)
- date_error_message(self, lookup_type, field_name, unique_for)
- unique_error_message(self, model_class, unique_check)
- full_clean(self, exclude=None, validate_unique=True)
- clean_fields(self, exclude=None)
- check(cls, **kwargs)
- _check_swappable(cls)
- _check_model(cls)
- _check_managers(cls, **kwargs)
- _check_fields(cls, **kwargs)
- _check_m2m_through_same_relationship(cls)
- _check_id_field(cls)
- _check_field_name_clashes(cls)
- _check_column_name_clashes(cls)
- _check_index_together(cls)
- _check_unique_together(cls)
- _check_local_fields(cls, fields, option)
- _check_ordering(cls)
- _check_long_column_names(cls)
- _order
- _state
- pk
- alters_data
- alters_data
- alters_data From FIG. 5C

FIG. 5B

From

From

To FIG. 6A

To FIG. 6A isinstanceof django.db.models.base.Model
- __init__(self, *args, **kwargs)
- from_db(cls, db, field_names, values)
- __repr__(self)
- __str__(self)
- __eq__(self, other)
- __ne__(self, other)
- __hash__(self)
- __reduce__(self)
- __setstate__(self, state)
- _get_pk_val(self, meta=None)
- _set_pk_val(self, value)
- get_deferred_fields(self)
- refresh_from_db(self, using=None, fields=None)
- serializable_value(self, field_name)
- save(self, force_insert=False, force_update=False, using=None, update_fields=None)
- save_base(self, raw=False, force_insert=False, force_update=False, using=None, update_fields=None)
- _save_parents(self, cls, using, update_fields)
- _save_table(self, raw=False, cls=None, force_insert=False, force_update=False, using=None, update_fields=None)
- _do_update(self, base_qs, using, pk_val, values, update_fields, forced_update)
- _do_insert(self, manager, using, fields, update_pk, raw)
- delete(self, using=None, keep_parents=False)
- _get_FIELD_display(self, field)
- _get_next_or_previous_by_FIELD(self, field, is_next, **kwargs)
- _get_next_or_previous_in_order(self, is_next)
- prepare_database_save(self, field)
- clean(self)
- validate_unique(self, exclude=None)
- _get_unique_checks(self, exclude=None)
- _perform_unique_checks(self, unique_checks)
- _perform_date_checks(self, date_checks)
- date_error_message(self, lookup_type, field_name, unique_for)
- unique_error_message(self, model_class, unique_check)
- full_clean(self, exclude=None, validate_unique=True)
- clean_fields(self, exclude=None)
- check(cls, **kwargs)
- _check_swappable(cls)
- _check_model(cls)
- _check_managers(cls, **kwargs)
- _check_fields(cls, **kwargs)
- _check_m2m_through_same_relationship(cls)
- _check_id_field(cls)
- _check_field_name_clashes(cls)
- _check_column_name_clashes(cls)
- _check_index_together(cls)
- _check_unique_together(cls)
- _check_local_fields(cls, fields, option)
- _check_ordering(cls)
- _check_long_column_names(cls)
- _order
- _state
- pk
- alters_data
- alters_data
- alters_data From FIG. 6C

FIG. 6B

To FIG. 7A    To FIG. 7A    To FIG. 7A
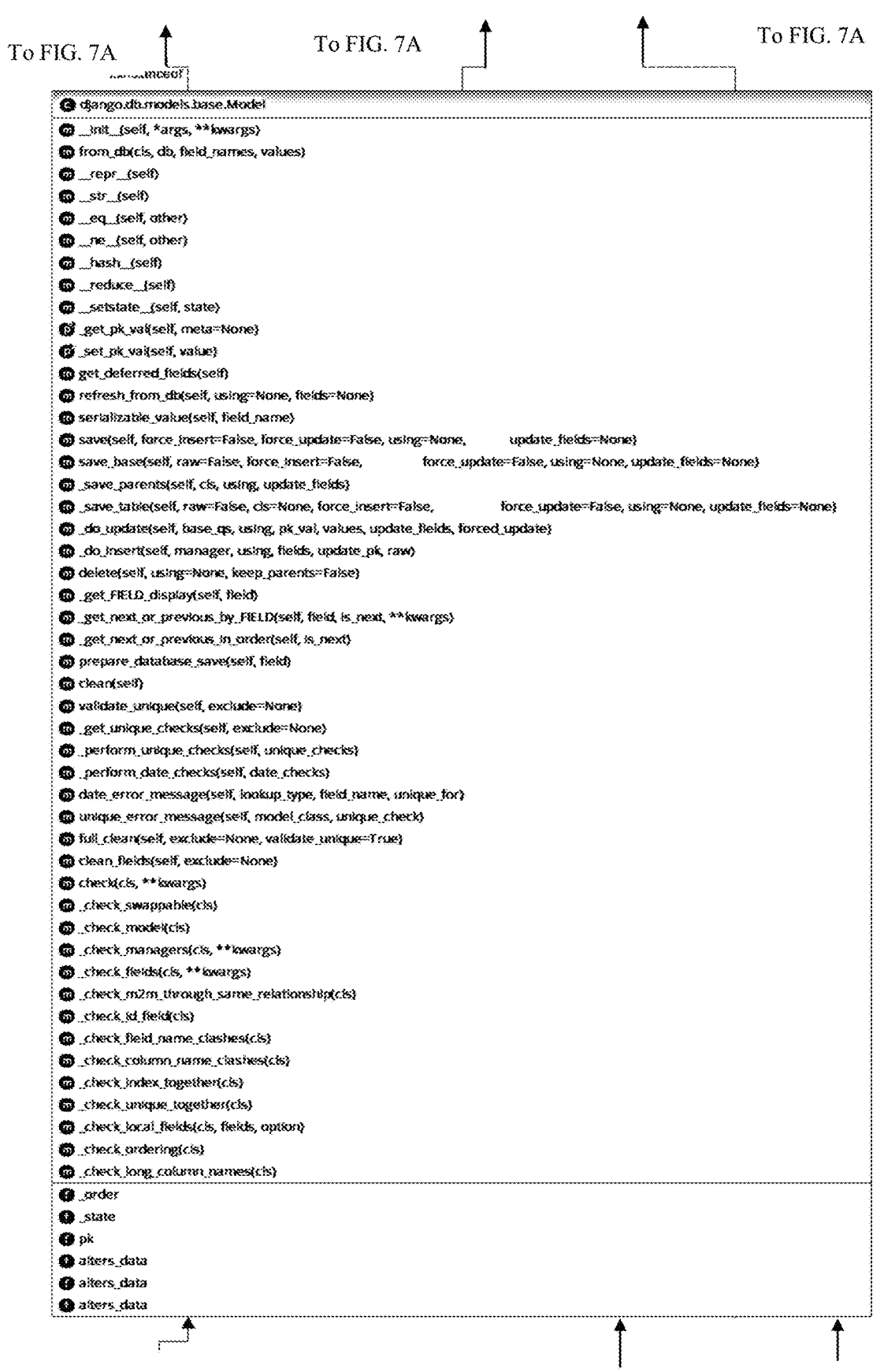
From FIG. 7C    FIG. 7B    From FIG. 7C    From FIG. 7C To FIG. 8A     To FIG. 8A     To FIG. 8A isinstanceof django.db.models.base.Model

- \_\_init\_\_(self, *args, **kwargs)
- from_db(cls, db, field_names, values)
- \_\_repr\_\_(self)
- \_\_str\_\_(self)
- \_\_eq\_\_(self, other)
- \_\_ne\_\_(self, other)
- \_\_hash\_\_(self)
- \_\_reduce\_\_(self)
- \_\_setstate\_\_(self, state)
- _get_pk_val(self, meta=None)
- _set_pk_val(self, value)
- get_deferred_fields(self)
- refresh_from_db(self, using=None, fields=None)
- serializable_value(self, field_name)
- save(self, force_insert=False, force_update=False, using=None, update_fields=None)
- save_base(self, raw=False, force_insert=False, force_update=False, using=None, update_fields=None)
- _save_parents(self, cls, using, update_fields)
- _save_table(self, raw=False, cls=None, force_insert=False, force_update=False, using=None, update_fields=None)
- _do_update(self, base_qs, using, pk_val, values, update_fields, forced_update)
- _do_insert(self, manager, using, fields, update_pk, raw)
- delete(self, using=None, keep_parents=False)
- _get_FIELD_display(self, field)
- _get_next_or_previous_by_FIELD(self, field, is_next, **kwargs)
- _get_next_or_previous_in_order(self, is_next)
- prepare_database_save(self, field)
- clean(self)
- validate_unique(self, exclude=None)
- _get_unique_checks(self, exclude=None)
- _perform_unique_checks(self, unique_checks)
- _perform_date_checks(self, date_checks)
- date_error_message(self, lookup_type, field_name, unique_for)
- unique_error_message(self, model_class, unique_check)
- full_clean(self, exclude=None, validate_unique=True)
- clean_fields(self, exclude=None)
- check(cls, **kwargs)
- _check_swappable(cls)
- _check_model(cls)
- _check_managers(cls, **kwargs)
- _check_fields(cls, **kwargs)
- _check_m2m_through_same_relationship(cls)
- _check_id_field(cls)
- _check_field_name_clashes(cls)
- _check_column_name_clashes(cls)
- _check_index_together(cls)
- _check_unique_together(cls)
- _check_local_fields(cls, fields, option)
- _check_ordering(cls)
- _check_long_column_names(cls)

- _order
- _state
- pk
- alters_data
- alters_data
- alters_data

From FIG. 8C

Create an Account tester tester@tildawatch.com

••••••••

Create User Account

340

———— or ————

Username or e-mail

Password

☐ Remember Login

Minecraft - Little Kelly: LITTLE CARLY VOLUNTEERS FOR HUNGER GAMES!
2 Views · an hour ago

1810 —

1805

Minecraft - Little Kelly: LITTLE CARLY
VOLUNTEERS FOR HUNGER GAMES!
2 Views · an hour ago

340 needlemouseproductions 1810  1505

Every Version Of The Justice League In Video
Games
1 Views · an hour ago littlekelly

1815

1805

Minecraft – Little Kelly: LITTLE CARLY VOLUNTEERS FOR HUNGER GAMES!
2 Views · an hour ago

340 needlemouseproductions

1810

1505

Every Version Of The Justice League In Video Games
1 Views · an hour ago littlekelly

1815

Minecraft - Little Kelly: LITTLE CARLY
VOLUNTEERS FOR HUNGER GAMES!
2 Views · an hour ago Every Version Of The Justice League In Video
Games
1 Views · an hour ago

VIDEO SUMMARIZATION AND COLLABORATION SYSTEMS AND METHODS

TECHNICAL FIELD

Various embodiments relate generally to video summarization.

BACKGROUND

Multimedia is media that may include multiple content types. Some multimedia may include audio, images, video, subtitles, transcripts, or lyrics. In some examples, images may be associated with text including subtitles or transcripts. Some multimedia may present multiple content types in the same program. For example, a collection of still images may have an audio clip associated to each image.

In some scenarios, video may include audio, images, or subtitles. Video may be considered a time-varying image sequence. In some examples, the images in a video may be presented fast enough in a sequence for the video to appear to a human viewer as a continuous flow of motion. In some scenarios, a particular portion of a video may be more relevant than another portion of the video. For example, music video sections containing music may be more interesting than the sections without music.

Some video sections with interesting content may be more important than other such sections. For example, game video sections may include some play attempts directed to a particular objective, where some play attempts succeed, and other play attempts fail. In some examples, various play attempts may spectacularly succeed or fail. Such spectacular play sequences may be considered of high importance. Users of video may expend much time and effort reviewing video to locate such highly important video sections. Highly important video sections may be known as highlights.

Some video may be summarized by the video highlights. In an illustrative example, a lecture or speech may have an associated summary illustrating each main point or event. Some video summaries may include a related screenshot linked to each main point or event in the video. In some examples, a user may save time assessing the usefulness of a video based on reviewing such summary highlights. In some scenarios, highlights may be combined from different videos into a montage summarizing various video streams with highlights identified by different individuals. Creating a highlight montage summarizing video may require substantial iterative effort by multiple collaborators reviewing and editing video.

SUMMARY

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. In an illustrative example, the multimedia stream may be video. The video may be divided into segmented sections as a function of a characteristic of the video. The video characteristic may be, for example, a video temporal characteristic. In some examples, the highlight multimedia segment may be selected from the sections based on video segment content. A video highlight summary may be automatically created based on one or more highlight segments. Various examples may advantageously provide multi-user video montage creation based on the automatic highlight summaries.

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. For example, the multimedia stream may be video. The video may be divided based on characteristics of sound extracted from the video. The sound characteristic may be, for example, a sound statistic calculated as a function of time. In some examples, the highlight multimedia segment may be selected from the sections based on video segment content. A video highlight summary may be automatically created based on one or more highlight segments. Various examples may advantageously provide multi-user video montage creation based on the automatic highlight summaries.

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. For example, the multimedia stream may be video. The video may be divided based on characteristics of pixels captured from the video. The pixel characteristic may be, for example, a histogram correlation calculated as a function of time. In some examples, the highlight multimedia segment may be selected from the sections based on video segment content. A video highlight summary may be automatically created based on one or more highlight segments. Various examples may advantageously provide multi-user video montage creation based on the automatic highlight summaries.

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. The multimedia stream may be music video. The video may be divided based on the video's associated subtitle or lyric characteristics. The subtitle or lyric characteristics may be, for example, determined as a function of TF-IDF analysis over time. In some examples, the highlight multimedia segment may be selected from sections based on video segment content. A video highlight summary may be automatically created based on one or more highlight segments. Various examples may advantageously provide multi-user video montage creation based on the automatic highlight summaries.

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. The multimedia stream may include a speech. The video may be divided based on the speech's associated transcript or subtitle characteristics. The transcript or subtitle characteristic may be, for example, determined as a function of punctuation analysis over time. In some examples, the highlight multimedia segment may be selected from sections based on video segment content. A video highlight summary may be automatically created based on one or more highlight segments. Various examples may advantageously provide multi-user video montage creation based on the automatic highlight summaries.

Apparatus and associated methods relate to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. The multimedia stream may be associated with subtitles and a transcript. The video may be divided into sections segmented based on a subtitle matched to a transcript stanza as a function of TF-IDF analysis of the subtitles and transcript. In some examples, the highlight multimedia segment may be selected from sections based on video segment content. A video highlight summary may be automatically created based on one or more highlight segments. Various examples may advantageously provide multi-user video montage creation based on the automatic highlight summaries.

Various embodiments may achieve one or more advantages. For example, some embodiments may improve a user's ease of access to multimedia highlights. This facilitation may be a result of reducing the user's effort reviewing and editing multimedia program content to locate highlights. In some embodiments, video highlights may be automatically located or extracted for a user. Such automatic highlight location or extraction may reduce a user's effort summarizing video programs. Some embodiments may increase the availability of video highlights. Such increased highlight availability may be a result of improved video segmentation based on video characteristics computed from the raw video data in real time. In various embodiments, such improved video segmentation may be a result of improved video segmentation accuracy. In some embodiments, the video sharing and collaboration efficiency may be improved. This facilitation may be a result of reducing the rendering workload on a user's device based on servers streaming video on demand as a function of metadata supplied by the user device. Various implementations may improve a video collaboration and sharing experience with reduced video access response time. Such improved video access interactivity response may be a result of dynamic video delivery based on a video viewer that changes content as a function of timestamps supplied by the system and the user-selected view mode.

In some designs, improved video segmentation may be a result of increased video segmentation speed. Such improved video segmentation and increased availability of video highlights may be the result of a video segmentation process that identifies more useful video segments. This facilitation may be the result of a video segmentation process that divides video into highlight segments identified as a function of the audio track volume rate of change. In some designs, faster or more accurate identification of video highlights may be a result of a video segmentation process that segments video into highlights selected based on pixel histogram cross-correlation as a function of time.

In some implementations, improved video highlight selection may be a result of a video segmentation process identifying highlights determined as a function of multiple sources of data associated to the raw video. For example, an improved video highlight identification may be a result of determining highly relevant video sections based on matching timestamped subtitles with a TF-IDF analysis of lyrics associated to the video. Various designs may improve the accuracy of identifying speech or lecture highlights. Such improved speech or lecture highlight identification may be a result of matching timestamped subtitle entries with a transcript of the speech or lecture tokenized into stanzas based on punctuation in the transcript. In an illustrative example, some designs may artificially punctuate a non-punctuated transcript with a recurrent neural networks algorithm to tokenize the transcript for improved video segmentation.

In some embodiments, video segments may be automatically identified as significant highlights, extracted, and made available for multi-user collaboration. Such automatic highlight identification and extraction may reduce a user's effort in reviewing and editing video to exchange video highlights. Various embodiments may provide improved video montages based on automatic summaries created from segmented video highlights. This facilitation may be a result of an improved video highlight generator service accessible by multiple users.

The details of various embodiments are set forth in the accompanying drawings and the description below. Other features and advantages will be apparent from the description and drawings, and from the claims.

BRIEF DESCRIPTION OF THE DRAWINGS

FIGS. 7A-7C together depict an exemplary Image class diagram illustrative of some Summarization and Collaboration embodiments.

FIGS. 8A-8C together depict an exemplary Article class diagram illustrative of some Summarization and Collaboration embodiments.

FIGS. 22A-22G depict illustrative views of an exemplary touch-enabled device interface user registering and using a video summarization and collaboration account.

Like reference symbols in the various drawings indicate like elements.

DETAILED DESCRIPTION OF ILLUSTRATIVE EMBODIMENTS

To aid understanding, this document is organized as follows. First, designs providing collaboration access to video summarized based on highlights selected from multimedia sections segmented as a function of a multimedia stream characteristic are briefly introduced with reference to FIGS. 1-8. Second, with reference to FIGS. 9-14, the discussion turns to exemplary embodiments that illustrate video segmentation and summarization. Specifically, illustrative process flows of exemplary VSACE (Video Summarization and Collaboration Engine) designs are disclosed. Then, with reference to FIGS. 15-27, illustrative views of exemplary touch-enabled video summarization and collaboration device user interfaces are presented, to explain improvements in touch-enabled multimedia device design. Finally, with reference to FIG. 28, exemplary encryption techniques in accordance with various embodiment video segmentation designs are disclosed.

Figure 1:
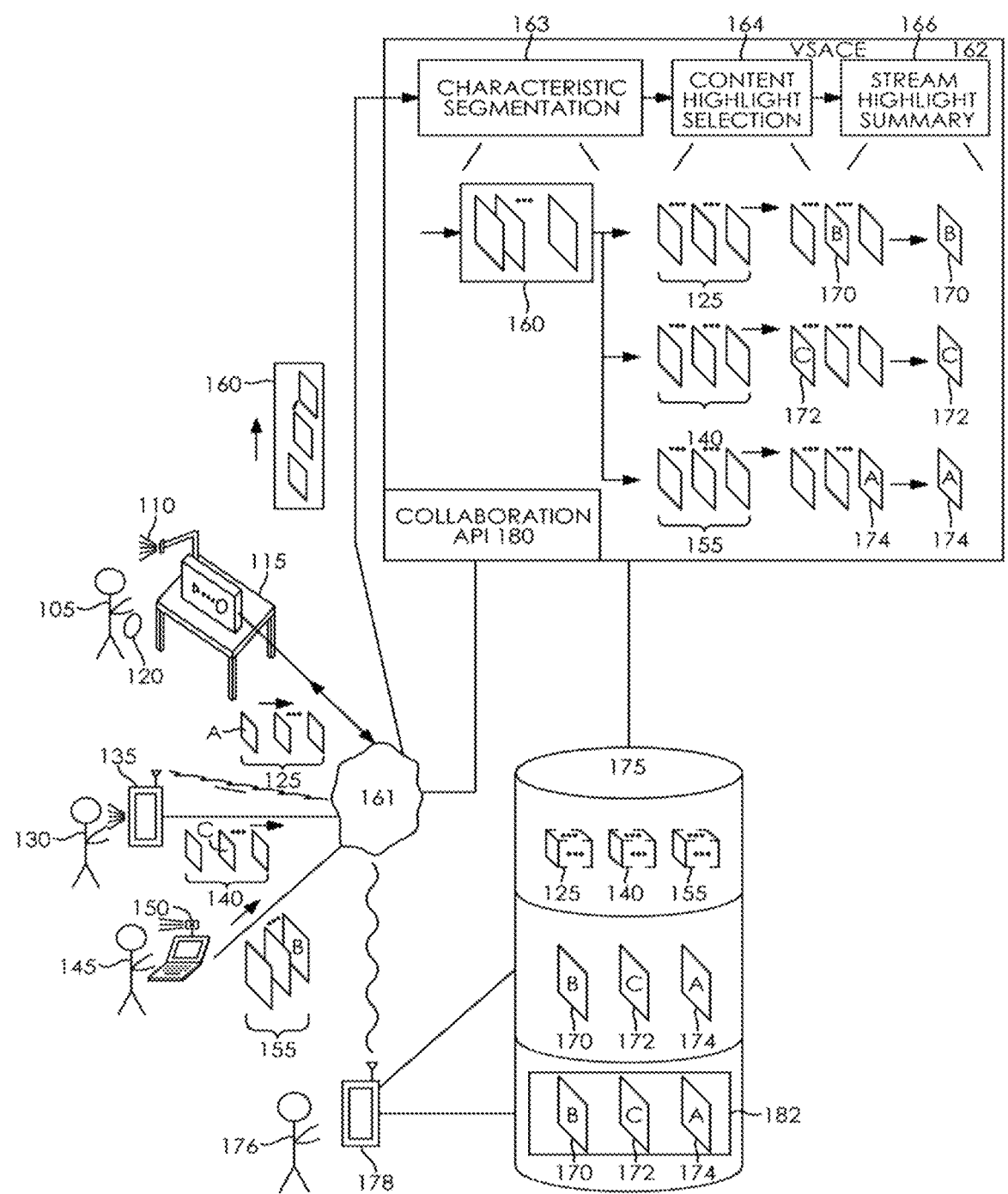
FIG. 1 depicts an exemplary collaboration network dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment.

FIG. 1 depicts an exemplary collaboration network dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. In FIG. 1, the first user 105 plays a video game using video camera 110 operatively coupled with the gaming console 115 and gaming controller 120 to capture video images and audio of the first user 105 video game experience. In the depicted embodiment, the video camera 110 emits the first video stream 125 including video images and audio representative of the video game play captured from the gaming console 115. In the illustrated embodiment, the first video stream 125 also includes video images and audio of the first user 105. In the depicted example, the video game experienced by the first user 105 includes a consequential game event 'A'. In the illustrated example, video frames representative of the consequential game event 'A' are included in the first video stream 125. In an illustrative example, such a consequential event may be referred to as a highlight. The second user 130 plays a video game using the mobile device 135. In the illustrated example, the mobile device 135 includes a video camera and microphones operably coupled with the mobile device 135 to capture video images and audio of the second user 130 video game experience. In the depicted embodiment, the mobile device 135 emits the second video stream 140 including video images and audio representative of the video game play captured from the mobile device 135. In the depicted example, the video game experienced by the second user 130 includes a consequential game event 'C'. In the illustrated example, video frames representative of the consequential game event 'C' are included in the second video stream 140. In the depicted example, the third user 145 plays a music video on the computer 150. In the illustrated example, while playing the music video, the third user 145 also observes live on the computer 150 the video game played by the first user 105 and the second user 130. In the depicted embodiment, the computer 150 includes a video camera and microphones operably coupled with the computer 150 to capture video images and audio of the third user 145 experience. In the illustrated embodiment, the computer 150 emits the third video stream 155 including the music video. In the depicted example, the third video stream 155 also includes video images and audio of the third user 145 experience. In the depicted example, the third video stream 155 also includes video frames representative of the third user 145 reaction 'B' including facial expressions, hand gestures, and vocalization, to the consequential game event 'A' included in the first video stream 125 and viewed by the third user 145. In the illustrated embodiment, the gaming console 115, the mobile device 135 and the computer 150 each send their respective first video stream 125, second video stream 140, and third video stream 155 in the aggregate video stream 160 via the network cloud 161 to the Video Summarization and Collaboration Engine Host (VSACE) host computing device 162. In an illustrative example, the Video Summarization and Collaboration Engine Host (VSACE) host computing device 162 is configured with video segmentation, video highlight selection, and video summarization capabilities including characteristic segmentation 163, content highlight selection 164, and stream highlight summary 166. The VSACE host 162 characteristic segmentation 163 divides the aggregate video stream 160 received by the VSACE host 162 into sections segmented as a function of a characteristic of the multimedia stream. In the depicted embodiment, the VSACE host 162 characteristic segmentation 163 divides the first video stream 125, second video stream 140, and third video stream 155 included in the aggregate video stream 160 into sections segmented according to a multimedia characteristic specific to each of the first video stream 125, second video stream 140, and third video stream 155. In an illustrative example, the first video stream 125 may be segmented as a function of the video image pixel histogram; the second video stream 140 may be segmented based on sound volume; and, the third video stream 155 may be segmented based on TF-IDF analysis of the music video lyrics. In some embodiments, the third video stream 155, which may include facial expressions, may be segmented based on facial recognition or gesture recognition. In the depicted embodiment, the VSACE host 162 content highlight selection 164 evaluates each of the first video stream 125, the second video stream 140, and the third video stream 155 to identify video stream highlights determined by the VSACE host 162 content highlight selection 164 as a function of the video stream content. In the illustrated embodiment, VSACE host 162 content highlight selection 164 identifies video frames representative of the third user 145 reaction 'B' included in the third video stream 155 as highlight video frames 'B' 170. In the depicted embodiment, VSACE host 162 content highlight selection 164 identifies video frames representative of the consequential game event 'C' experienced by the second user 130 included in the second video stream 140 as highlight video frames 'C' 172. In the illustrated embodiment, VSACE host 162 content highlight selection 164 identifies video frames representative of the consequential video game event 'A' experienced by the first user 105 included in the first video stream 125 as highlight video frames 'A' 174. In the illustrated embodiment, the VSACE host 162 stores the first video stream 125 segments, the second video stream 140 segments, and the third video stream segments 155 in the collaboration host database 175 communicatively and operably coupled with the VSACE host 162. In the depicted embodiment, the VSACE host 162 also stores in the collaboration host database 175 the highlight video frames 'C' 172, the highlight video frames 'B' 170, and the highlight video frames 'A' 174. In the illustrated embodiment, the fourth user 176 connects to the VSACE host 162 through the network cloud 161 to visually browse video highlights including the highlight video frames 'C' 172, the highlight video frames 'B' 170, and the highlight video frames 'A' 174 on the mobile device 178 via the collaboration API configured in the VSACE host 162. In the illustrated embodiment, the fourth user 176 creates video montage 182 summarizing the events from the first video stream 125, the second video stream 140, and the third video stream 155, which appeal to the interest of the fourth user 176. In some embodiments, the video montage may be created automatically based on predictive analytics. For example, in some implementations, a learning machine configured in the VSACE host 162 may predict user preferences, and automatically summarize vast amounts of video into a montage customized for a particular user's preference. In an illustrative example, the VSACE host 162 may include a neural network trained to recognize video segments including, for example, goals scored in a soccer match, or home runs in a baseball game, and such a VSACE host 162 may automatically segment and summarize vast amounts of video condensed in the form of a montage automatically customized to a user.

Figure 2:
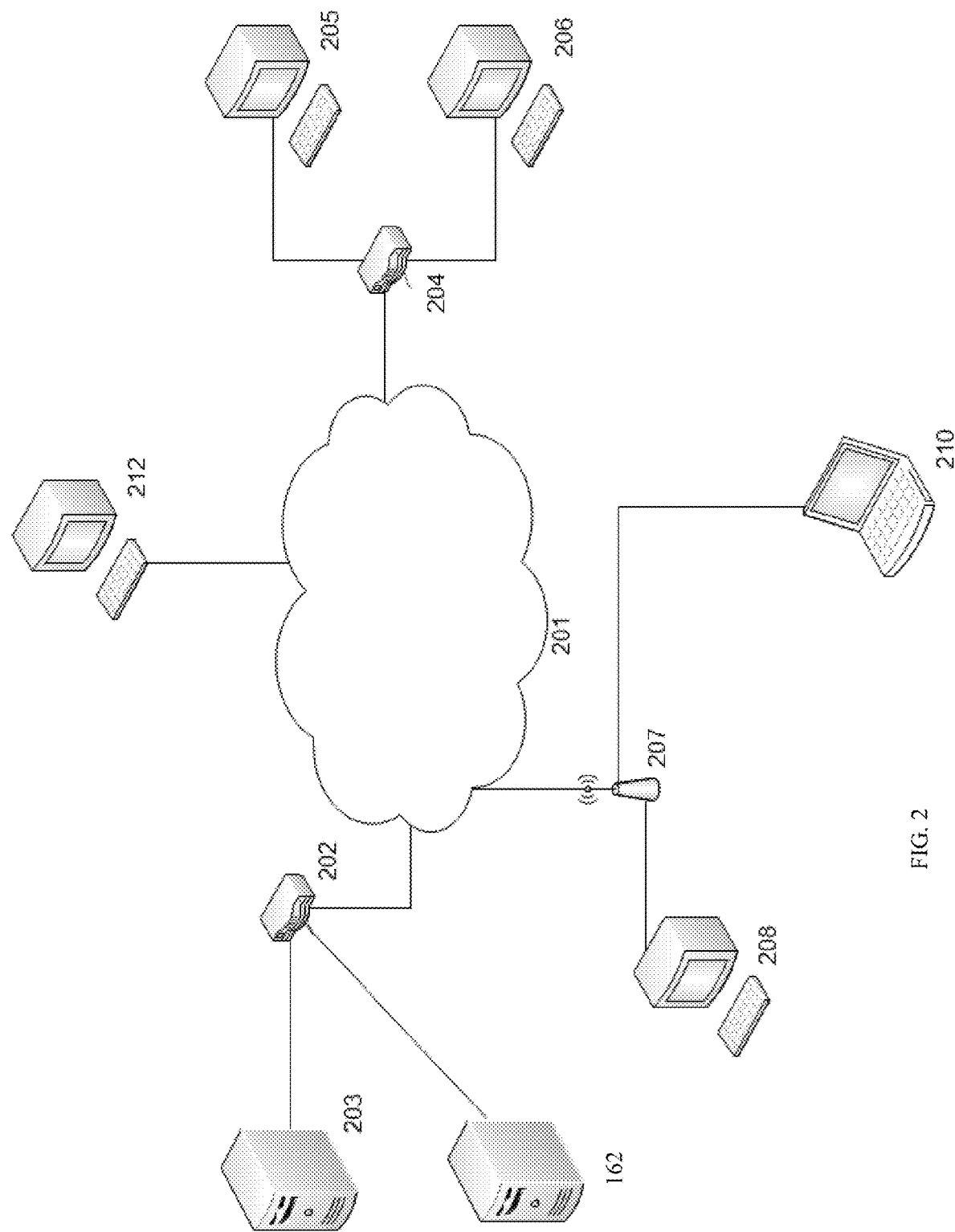
FIG. 2 depicts a schematic view of an exemplary network configured with an exemplary computing device adapted to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment.

FIG. 2 depicts a schematic view of an exemplary network configured with an exemplary computing device adapted to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. In FIG. 2, according to an exemplary embodiment of the present disclosure, data may be transferred to the system, stored by the system and/or transferred by the system to users of the system across local area networks (LANs) or wide area networks (WANs). In accordance with the previous embodiment, the system may be comprised of numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In depicted embodiment, an exemplary system includes the VSACE host 162 adapted to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. In the illustrated embodiment, the VSACE host 162 is communicatively and operably coupled with the WAN 201 (e.g., the Internet) to send, retrieve, or manipulate information in storage devices, servers, and network components, and exchange information with various other systems and devices via the WAN 201. In the depicted example, the illustrative system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet). According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed. Components or modules of the system may connect to device 162 or server 203 via WAN 201 or other network in numerous ways. For instance, a component or module may connect to the system i) through a computing device 212 directly connected to the WAN 201, ii) through a computing device 205, 206 connected to the WAN 201 through a routing device 204, or iii) through a computing device 208, 210 connected to a wireless access point 207. One of ordinary skill in the art will appreciate that there are numerous ways that a component or module may connect to device 162 or server 203 via WAN 201 or other network, and embodiments of the present disclosure are contemplated for use with any method for connecting to device 162 or server 203 via WAN 201 or other network. Furthermore, device 162 or server 203 could be comprised of a personal computing device, such as a smartphone, acting as a host for other computing devices to connect to. The communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
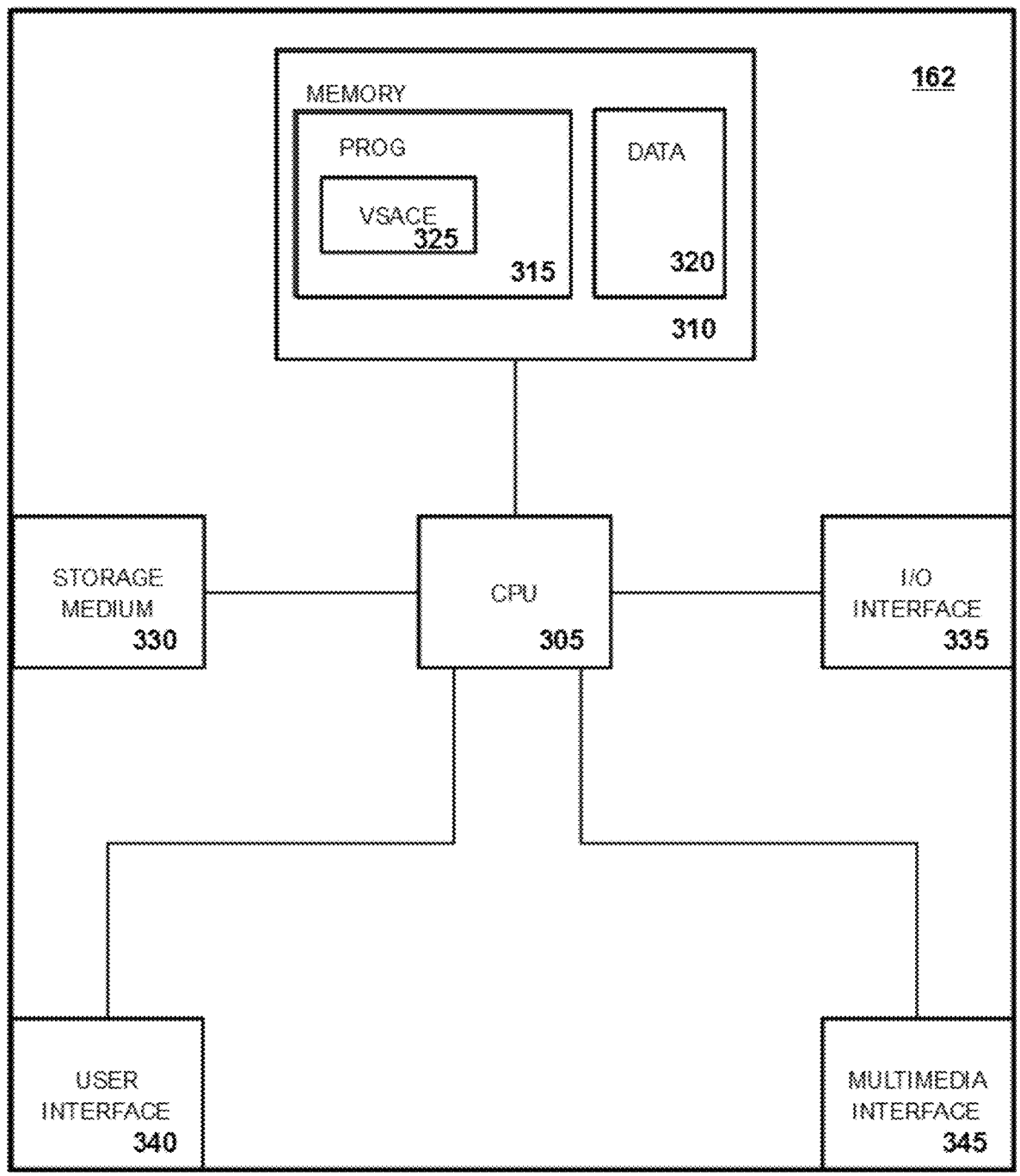
FIG. 3 depicts a structural view of an exemplary computing device adapted to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment.

FIG. 3 depicts a structural view of an exemplary computing device adapted to dividing a multimedia stream into sections segmented as a function of a characteristic of the multimedia stream, choosing from the segmented multimedia stream sections a highlight multimedia segment selected as a function of the segmented multimedia stream section content, and automatically providing collaboration access to a summarized multimedia stream constructed as a function of the highlight multimedia segment. In FIG. 3, the block diagram of the VSACE host 162 includes processor 305 and memory 310. The processor 305 is in electrical communication with the memory 310. The depicted memory 310 includes program memory 315 and data memory 320. The depicted program memory 315 includes processor-executable program instructions implementing VSACE (Video Summarization and Collaboration Engine) 325. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the depicted embodiment, the processor 305 is communicatively and operably coupled with the storage medium 330. In the depicted embodiment, the processor 305 is communicatively and operably coupled with the user interface 340. In the depicted embodiment, the processor 305 is communicatively and operably coupled with the I/O (Input/Output) module 335. In the depicted embodiment, the I/O module 335 includes a network interface. In various implementations, the network interface may be a wireless network interface. In some designs, the network interface may be a Wi-Fi interface. In some embodiments, the network interface may be a Bluetooth interface. In an illustrative example, the VSACE host 162 may include more than one network interface. In some designs, the network interface may be a wireline interface. In some designs, the network interface may be omitted. In various implementations, the user interface 340 may be adapted to receive input from a user or send output to a user. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the VSACE host 162 may include an accelerometer operably coupled with the processor 305. In various embodiments, the VSACE host 162 may include a GPS module operably coupled with the processor 305. In an illustrative example, the VSACE host 162 may include a magnetometer operably coupled with the processor 305. In some embodiments, some or all parts of an exemplary VSACE system may be included within a client device, such that the functionalities could operate in a distributed manner. In some embodiments, the user interface 340 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the VSACE host 162. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. In some embodiments, the multimedia interface 345 may be omitted. Useful examples of the illustrated VSACE host 162 include, but are not limited to, personal computers, servers, tablet PCs, smartphones, or other computing devices. In some embodiments, multiple VSACE host 162 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary VSACE design may be realized in a distributed implementation. In an illustrative example, some VSACE designs may be partitioned between a client device, such as, for example, a phone, and, a more powerful server system, such as server 203, depicted in FIG. 2. In various designs, a VSACE partition hosted on a PC or mobile device may choose to delegate some parts of computation, such as, for example, machine learning or deep learning, to a VSACE host server. In some embodiments, a client device VSACE partition may delegate computation-intensive tasks to a VSACE host server to take advantage of a more powerful processor, or to offload excess work. In an illustrative example, some mobile devices may be configured with a mobile chip including a neural engine, which may have sufficient processing power to implement a majority of VSACE features. However, in some embodiments, an exemplary VSACE may be configured to operate on device with less processing power, such as, for example, various gaming consoles, which may not have sufficient processor power, or a suitable CPU architecture, to adequately support VSACE. Various embodiment VSACE designs configured to operate on a such a device with reduced processor power may work in conjunction with a more powerful VSACE server system.

Figure 4:
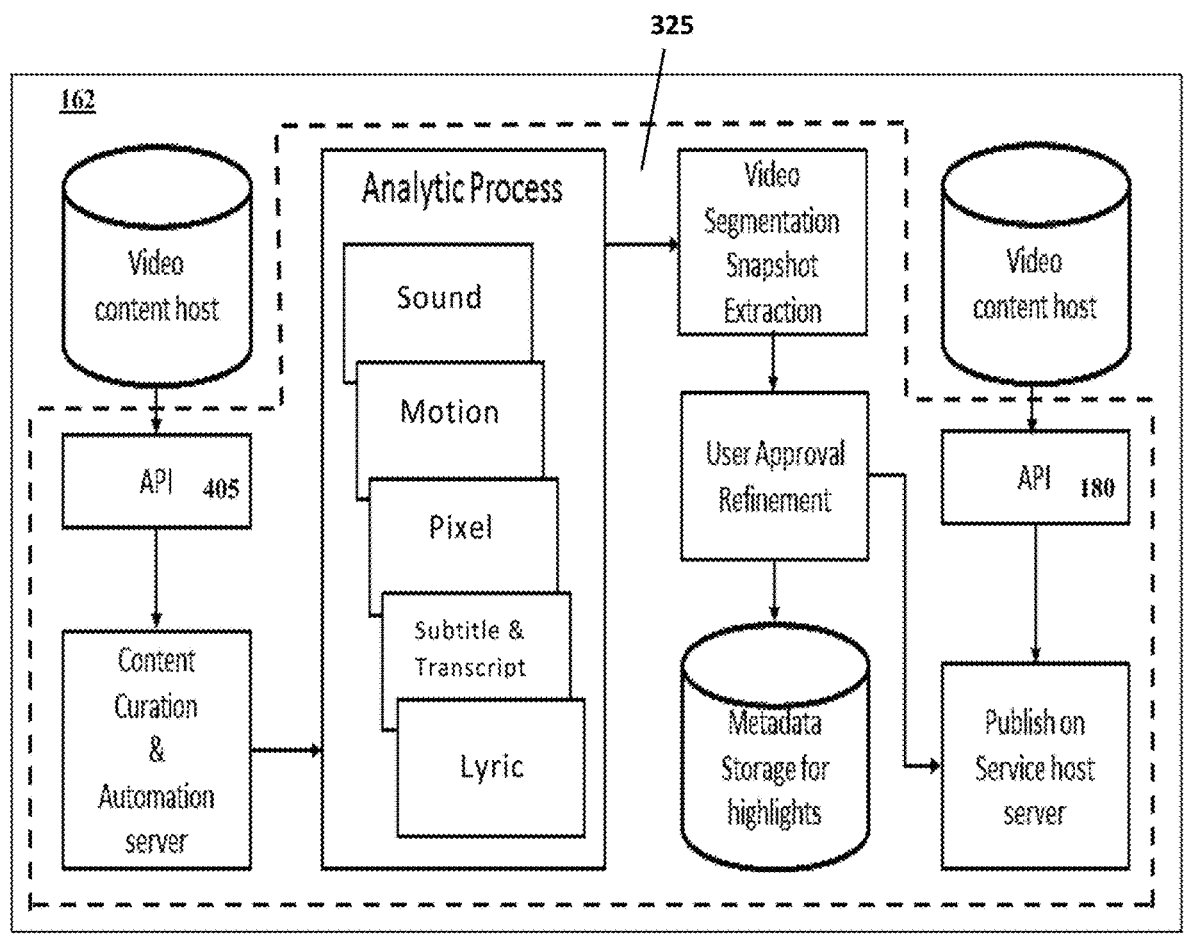
FIG. 4 depicts a schematic block diagram illustrating components of an exemplary system configured to provide collaboration access to video summarized based on highlights selected from multimedia sections segmented as a function of a multimedia stream characteristic.

FIG. 4 depicts a schematic block diagram illustrating components of an exemplary system configured to provide collaboration access to video summarized based on highlights selected from multimedia sections segmented as a function of a multimedia stream characteristic. Turning to FIG. 4, illustrative media flows and exemplary functional partitioning of an embodiment VSACE host 162 are described. In the illustrated embodiment, the VSACE host 162 may receive unprocessed video from the depicted Video Content Host via the Multimedia Summarization API 405 for processing by the depicted VSACE 325. In some embodiments, the unprocessed video may be received from various sources via a network cloud as depicted, for example, in at least FIG. 1 and FIG. 2. In the depicted embodiment, the exemplary VSACE 325 includes the Content Curation and Automation Server configured to automatically curate and summarize received video content received by the VSACE host 162 via the VSACE 325 Multimedia Summarization API 405. In the illustrated embodiment, the exemplary VSACE 325 includes the depicted Multimedia Content Analytic Process configured to identify multimedia highlights selected based on multimedia characteristics analyzed as a function of sound, motion, pixel, subtitle, transcript, or lyric content. In the depicted embodiment, the exemplary VSACE 325 includes the depicted Video Segmentation and Snapshot Extraction Engine adapted to divide multimedia streams into highlight sections segmented as a function of a multimedia stream characteristic determined by the depicted Multimedia Content Analytic Process. In the illustrated embodiment, the exemplary VSACE 325 includes the depicted User Approval and Refinement Engine configured to provide user access to multimedia highlight sections for approval. The depicted embodiment also includes Metadata Storage for segmented highlights. In the illustrated embodiment, the VSACE 325 may publish selected multimedia highlights to the depicted Service host or Video Content Host for access to the multimedia highlights by collaborators via the VSACE Collaboration API 180.

Figures 5A, 5B:
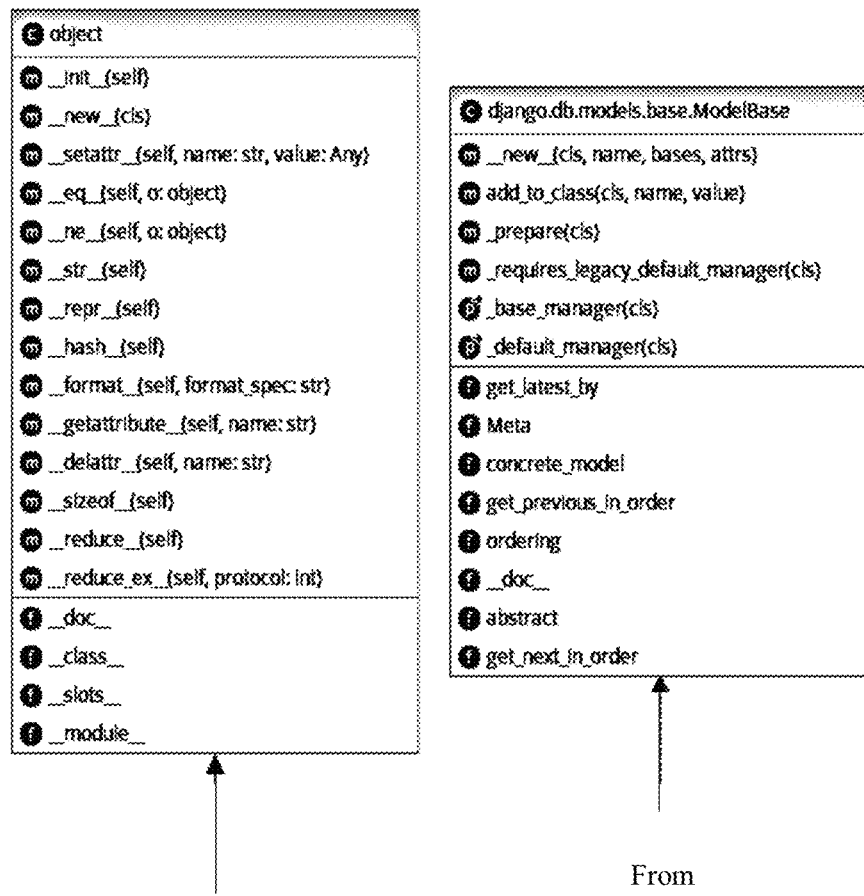
FIGS. 5A-5C together depict an exemplary Collection class diagram illustrative of some Summarization and Collaboration embodiments.
Figure 5C:
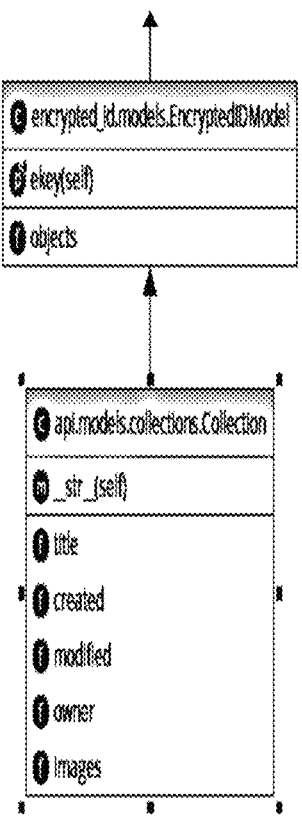

FIGS. 5A-5C together depict an exemplary Collection class diagram illustrative of some Summarization and Collaboration embodiments. In an illustrative example, an embodiment Collection class definition may include the following code:

```
class Collection(EncryptedIDModel):
    title=CharField( )
    created=DateTimeField( )
    modified=DateTimeField( )
    owner=ForeignKey(User)
    images=SortedManyToManyField(Image)
```

Figures 6A, 6B:
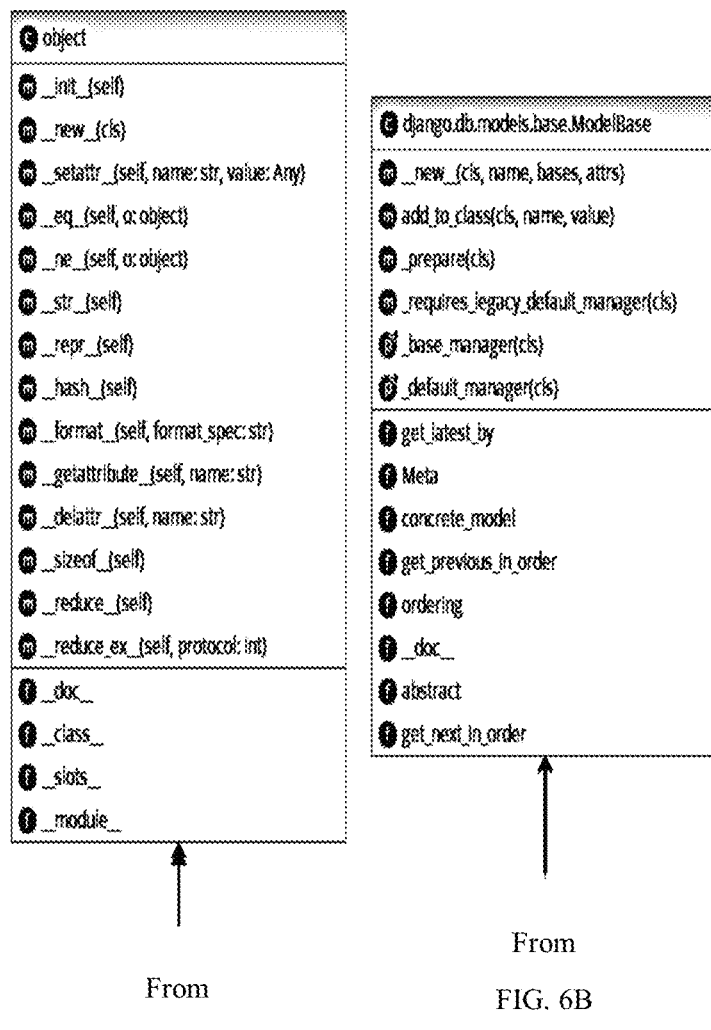
FIGS. 6A-6C together depict an exemplary Playlist class diagram illustrative of some Summarization and Collaboration embodiments.
Figure 6C:
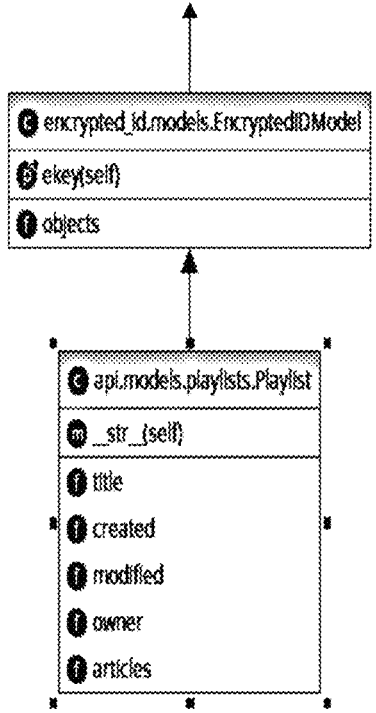

FIGS. 6A-6C together depict an exemplary Playlist class diagram illustrative of some Summarization and Collaboration embodiments.

Figure 7A:
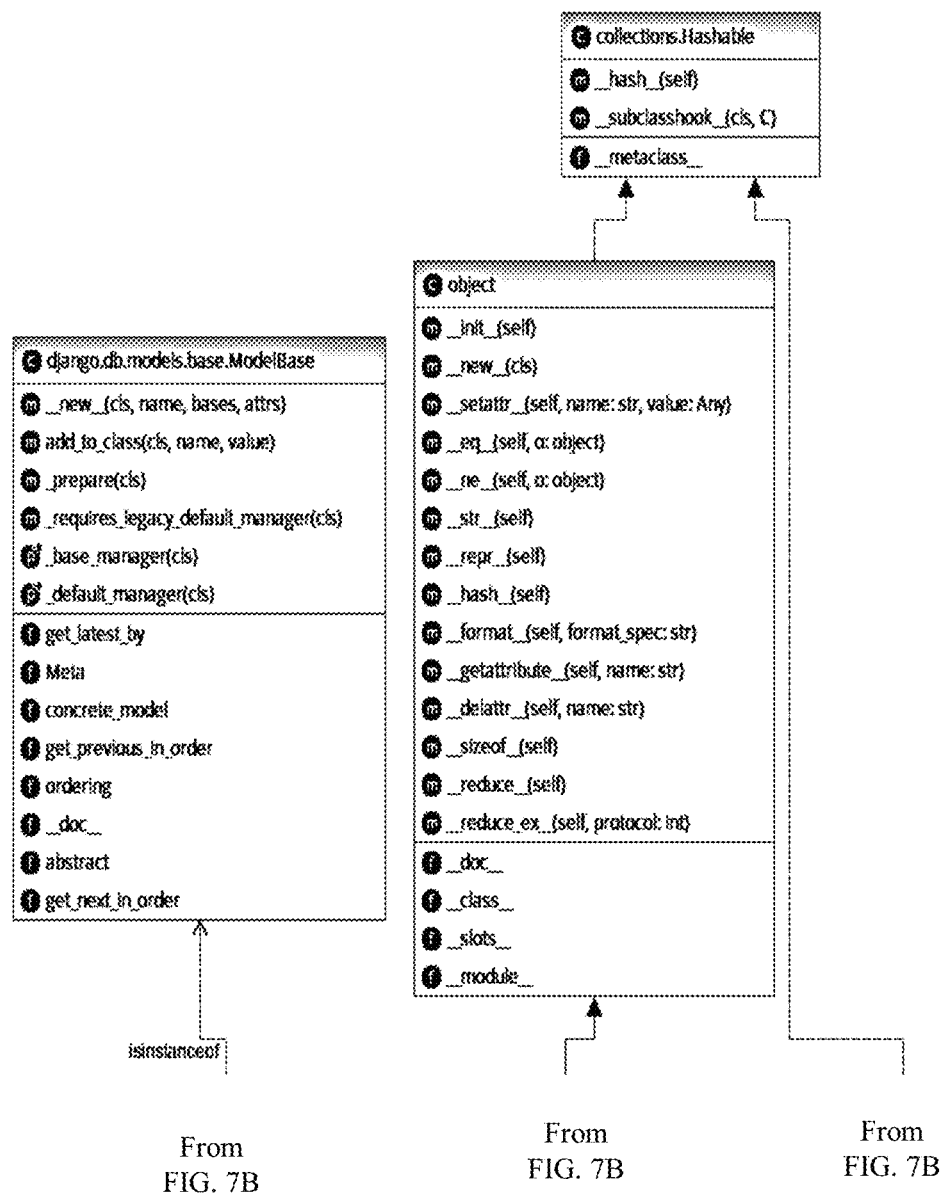
Figure 7C:

FIGS. 7A-7C together depict an exemplary Image class diagram illustrative of some Summarization and Collaboration embodiments. In an illustrative example, an embodiment Image class definition may include the following code:

```
# The interpretation of 'image' is loosely used for both
    images and video clip.
class Image( ):
    image=VersatileImageField( )
    source=TextField( )
    source_id=TextField( )
    start=SmallIntegerField( )
    duration=SmallIntegerField( )
    user_message=TextField( )
    created=DateTimeField(
    hashtags=TaggableManager( )
```

Figure 8A:
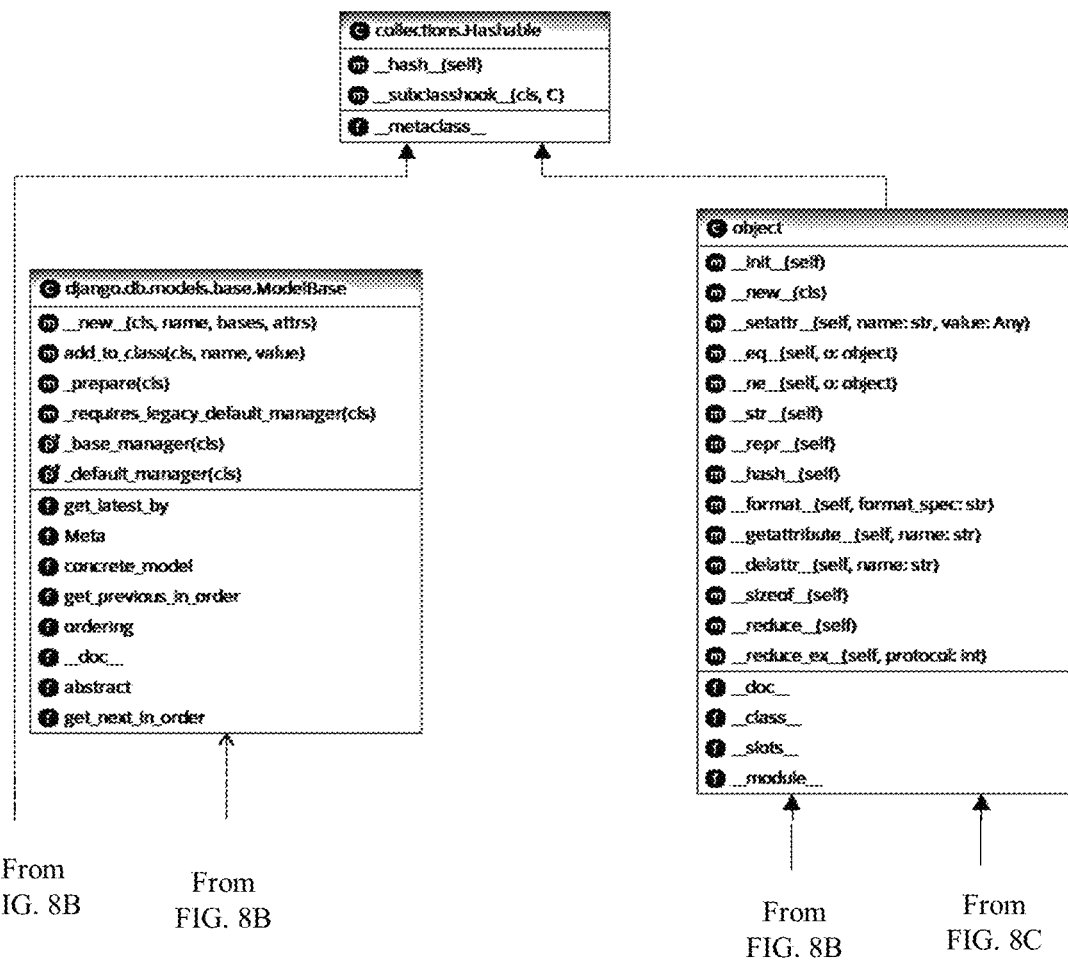
Figure 8C:
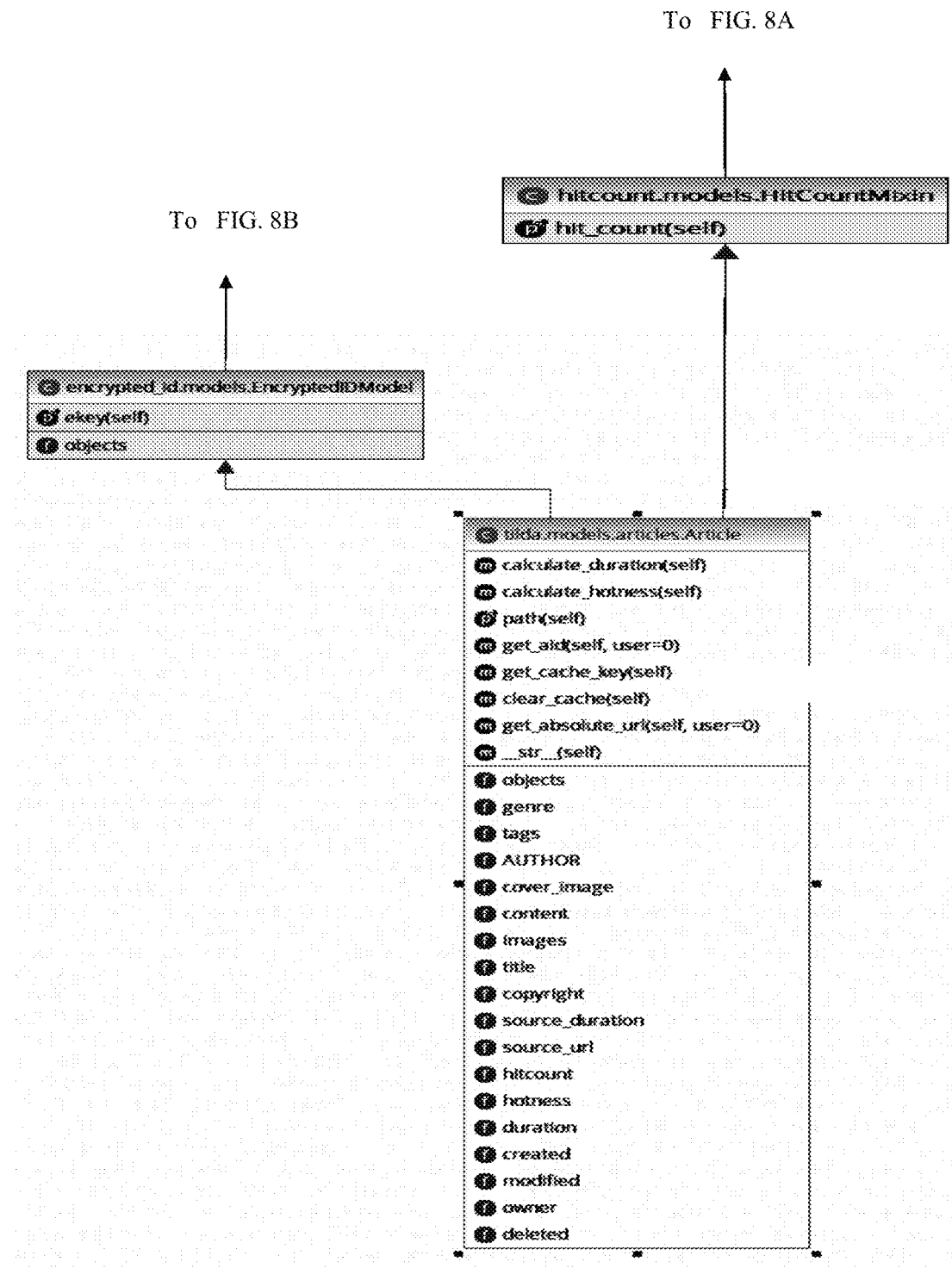

FIGS. 8A-8C together depict an exemplary Article class diagram illustrative of some Summarization and Collaboration embodiments. In an illustrative example, an embodiment Article class definition may include the following code:

```
class Article( ):
    genre=TaggableManager( )
    tags=TaggableManager( )
    author=CharField( )
    cover_image=VersatileImageField( )
    content=TextField( )
    images=SortedManyToManyField(Image)
    title=CharField(
    copyright=TextField( )
    source_duration=IntegerField( )
    source_url=TextField( )
    hitcount=GenericRelation(HitCount)
    hotness=CachedFloatField( )
    duration=CachedIntegerField( )
    created=DateTimeField( )
    modified=DateTimeField( )
    owner=ForeignKey(User)
```

Figure 9:
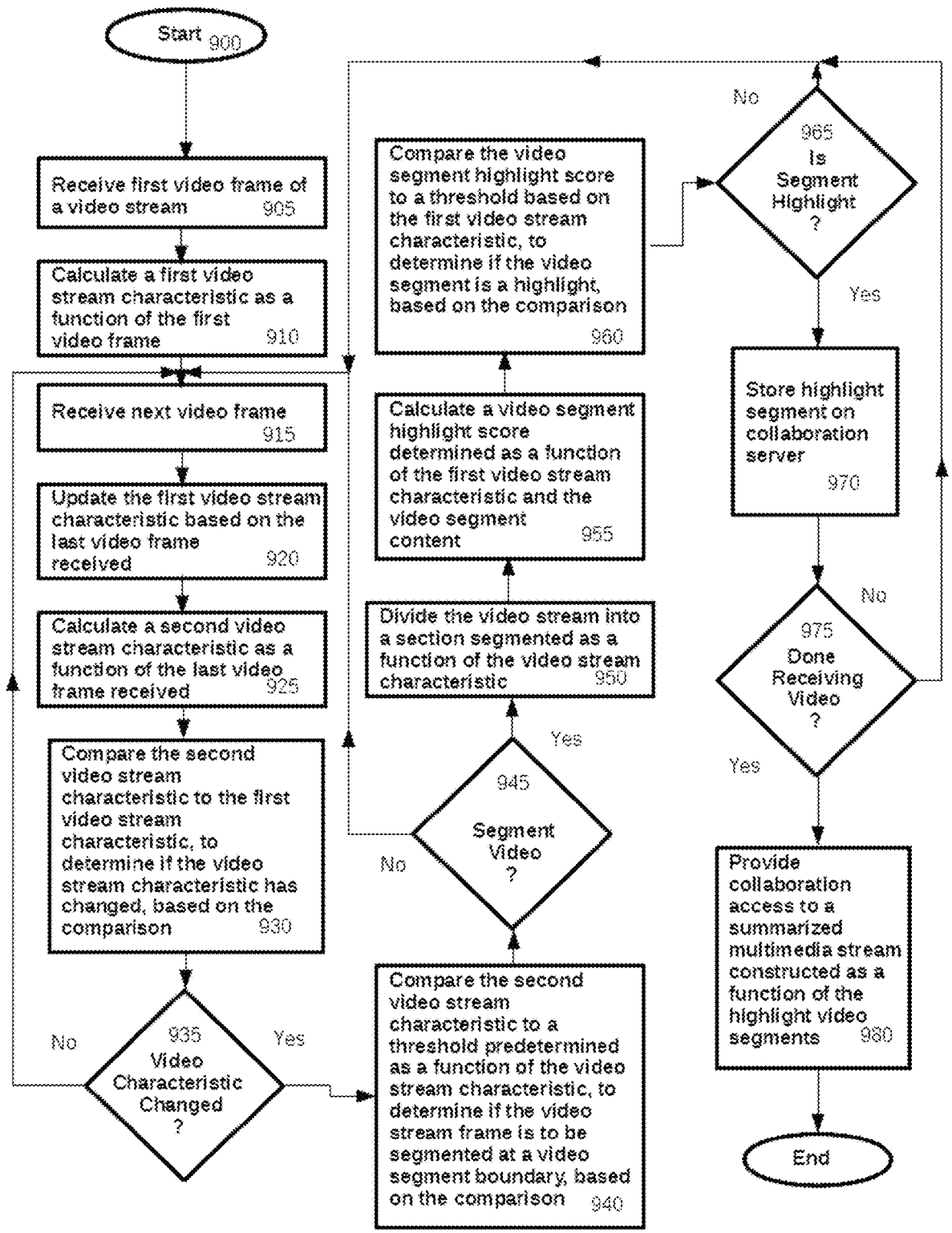
FIG. 9 depicts a process flow of an exemplary VSACE (Video Summarization and Collaboration Engine) providing collaboration access to video summarized based on highlights selected from multimedia sections segmented as a function of a multimedia stream characteristic.

FIG. 9 depicts a process flow of an exemplary VSACE (Video Summarization and Collaboration Engine) providing collaboration access to video summarized based on highlights selected from multimedia sections segmented as a function of a multimedia stream characteristic. The method depicted in FIG. 9 is given from the perspective of the Video Summarization and Collaboration Engine (VSACE) 325 executing as program instructions on the processor (CPU) 305, depicted in FIG. 3. In the illustrated embodiment, the VSACE 325 executes as program instructions on the processor 305 configured in VSACE host 162, depicted in at least FIG. 1, FIG. 2, FIG. 3, and FIG. 4. In some embodiments, the Video Summarization and Collaboration Engine (VSACE) 325 may execute as a cloud service communicatively coupled with system services, hardware resources, or software elements local to and/or external to the VSACE host 162. The depicted method 900 begins at step 905 with the processor 305 receiving the first video frame of a video stream. The method continues at step 910 with the processor 305 calculating a first video stream characteristic as a function of the first video frame. The method continues at step 915 with the processor 305 receiving the next video frame. The method continues at step 920 with the processor 305 updating the first video stream characteristic based on the last video frame received. The method continues at step 925 with the processor 305 calculating a second video stream characteristic as a function of the last video frame received. The method continues at step 930 with the processor 305 comparing the second video stream characteristic to the first video stream characteristic, to determine if the video stream characteristic has changed, based on the comparison. At step 935 the processor 305 performs a test to determine if the video characteristic changed, based on the comparison performed by the processor 305 at step 930. Upon a determination by the processor 305 at step 935 the video characteristic did not change, the method continues at step 915 with the processor 305 receiving the next video frame. Upon a determination by the processor 305 at step 935 the video characteristic changed, the method continues at step 940 with the processor 305 comparing the second video stream characteristic to a threshold predetermined as a function of the video stream characteristic, to determine if the video stream frame is to be segmented at a video segment boundary, based on the comparison. The method continues at step 945 with the processor 305 performing a test to determine if the video stream is to be segmented at a video segment boundary, based on the comparison performed by the processor at step 940. Upon a determination by the processor 305 at step 945 the video stream frame is not to be segmented at a video segment boundary, the method continues at step 915 with the processor 305 receiving the next video frame. Upon a determination by the processor 305 at step 945 the video stream frame is to be segmented at a video segment boundary, the method continues at step 950 with the processor 305 dividing the video stream into a section segmented as a function of the video stream characteristic. The method continues at step 955 with the processor 305 calculating a video segment highlight score as a function of the first video stream characteristic and the video segment content. The method continues at step 960 with the processor 305 comparing the video segment highlight score to a threshold based on the first video stream characteristic, to determine if the video segment is a highlight, based on the comparison. At step 965, the processor 305 performs a test to determine if the video segment is a highlight, based on the comparison performed by the processor 305 at step 960. Upon a determination by the processor 305 at step 965 the video segment is not a highlight, the method continues at step 915 with the processor 305 receiving the next video frame. Upon a determination by the processor 305 at step 965 the video segment is a highlight, the method continues at step 970 with the processor 305 storing the highlight segment on the collaboration server. At step 975 the processor 305 performs a test to determine if the method 900 is done receiving video. Upon a determination by the processor 305 at step 975 the method 900 is not done receiving video, the method continues at step 915 with the processor 305 receiving the next video frame. Upon a determination by the processor 305 at step 975 the method 900 is done receiving video, the method continues at step 980 with the processor 305 providing collaboration access to a summarized multimedia stream constructed as a function of the highlight video segments.

Figure 10:
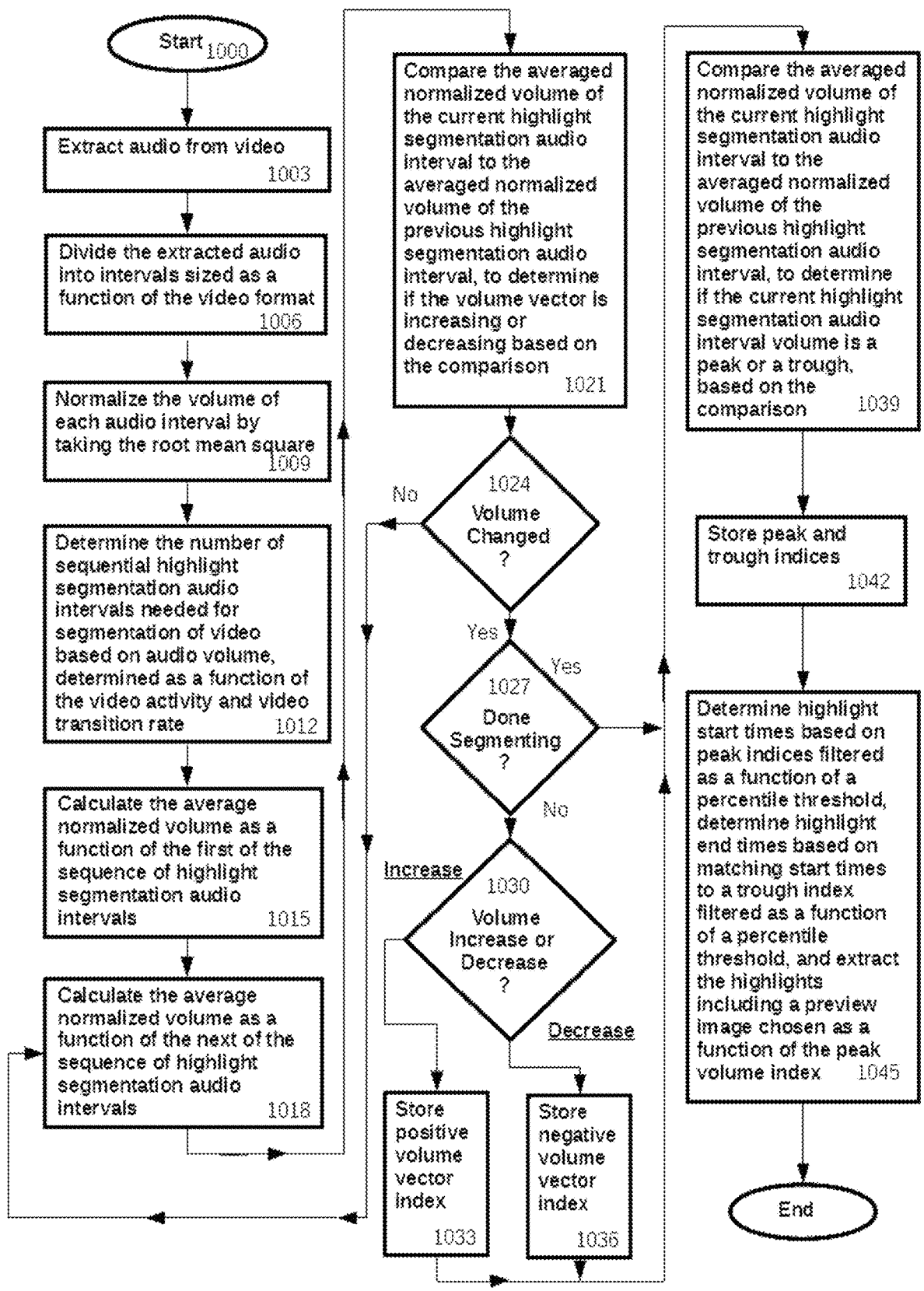
FIG. 10 depicts a process flow of an exemplary VSACE (Video Summarization and Collaboration Engine) providing collaboration access to video summarized based on highlights selected from multimedia sections segmented as a function of the multimedia stream sound volume.

FIG. 10 depicts a process flow of an exemplary VSACE (Video Summarization and Collaboration Engine) providing collaboration access to video summarized based on highlights selected from multimedia sections segmented as a function of the multimedia stream sound volume. The method depicted in FIG. 10 is given from the perspective of the Video Summarization and Collaboration Engine (VSACE) 325 executing as program instructions on the processor (CPU) 305, depicted in FIG. 3. In the illustrated embodiment, the VSACE 325 executes as program instructions on the processor 305 configured in VSACE host 162, depicted in at least FIG. 1, FIG. 2, FIG. 3, and FIG. 4. In some embodiments, the Video Summarization and Collaboration Engine (VSACE) 325 may execute as a cloud service communicatively coupled with system services, hardware resources, or software elements local to and/or external to the VSACE host 162. The depicted method 1000 begins at step 1003 with the processor 305 extracting audio from video. The method continues at step 1006 with the processor 305 dividing the extracted audio into intervals sized as a function of the video format. The method continues at step 1009 with the processor 305 normalizing the volume of each audio interval by taking the root mean square. The method continues at step 1012 with the processor 305 determining the number of sequential highlight segmentation audio intervals needed for segmentation of video based on audio volume, determined as a function of the video activity and video transition rate. The method continues at step 1015 with the processor 305 calculating the average normalized volume as a function of the first of the sequence of highlight segmentation audio intervals. The method continues at step 1018 with the processor 305 calculating the average normalized volume as a function of the next of the sequence of highlight segmentation audio intervals. The method continues at step 1021 with the processor 305 comparing the averaged normalized volume of the current highlight segmentation audio interval to the averaged normalized volume of the previous highlight segmentation audio interval, to determine if the volume vector is increasing or decreasing based on the comparison. At step 1024, the processor 305 performs a test to determine if the volume changed, based on the comparison performed by the processor 305 at step 1021. Upon a determination by the processor 305 at step 1024 the volume did not change, the method continues at step 1018 with the processor 305 calculating the average normalized volume as a function of the next of the sequence of highlight segmentation audio intervals. Upon a determination by the processor 305 at step 1024 the volume changed, the method continues at step 1027 with the processor 305 performing a test to determine if the method is done segmenting. Upon a determination by the processor 305 at step 1027 the method is not done segmenting, at step 1030 the processor 305 performs a test to determine if the volume increased or decreased. Upon a determination by the processor 305 at step 1027 the method is done segmenting, the method continues at step 1039. Upon a determination by the processor 305 at step 1030 the volume increased, the method continues at step 1033 with the processor 305 storing the positive volume vector index. Upon a determination by the processor 305 at step 1030 the volume decreased, the method continues at step 1036 with the processor 305 storing the negative volume vector index. The method continues at step 1039 with the processor 305 comparing the averaged normalized volume of the current highlight segmentation audio interval to the averaged normalized volume of the previous highlight segmentation audio interval, to determine if the current highlight segmentation audio interval volume is a peak or a trough, based on the comparison. The method continues at step 1042 with the processor 305 storing peak and trough indices. The method continues at step 1045 with the processor 305 determining highlight start times based on peak indices filtered as a function of a percentile threshold, determine highlight end times based on matching start times to a trough index filtered as a function of a percentile threshold, and extract the highlights including a preview image chosen as a function of the peak volume index.

In an illustrative example, exemplary video segmentation as a function of multimedia stream sound volume as depicted, for example, in FIG. 10, may be implemented in some embodiments with code such as the following:

```
def basic(config, meta, directory, video_filename):
    start_time = time.time( )
    clip = VideoFileClip(video_filename)
    print(video_filename.strip( ))
    cut = lambda i: clip.audio.subclip(i,i+1).to_soundarray(fps=22000) #frame rate for the audio (44k top)
    volume = lambda array: np.sqrt(((1.0*array)**2).mean( ))
    volumes = [volume(cut(i)) for i in range(0,int(clip.audio.duration-2))]
    # find the average volume across 5 frames
    averaged_volumes = np.array([sum(volumes[i:i+5])/5
        for i in range(len(volumes)-5)])
# find if volume is increasing beween 2 10f segments
increases = np.diff(averaged_volumes)[:-1]>=0
    # find if volume is descreasing beween 2 10f segments
    decreases = np.diff(averaged_volumes)[1:]<=0
    peaks_times = (increases * decreases).nonzero( )[0]
    peaks_vols = averaged_volumes[peaks_times]
    peaks_times = peaks_times[peaks_vols>np.percentile(peaks_vols,93)]
    increases = np.diff(averaged_volumes)[1:]>=0
    decreases = np.diff(averaged_volumes)[:-1]<=0
    throughs_times = (increases * decreases).nonzero( )[0]
    throughs_vols = averaged_volumes[throughs_times]
    throughs_times = throughs_times[throughs_vols<np.percentile(throughs_vols,75)]
```

-continued

```
    # Add 14 seconds to each peak time before sorting them into buckets marked by
throughs_times
    # so that we can identify the peak times that is at least 15 seconds prior to the throughs
times
        inds = np.digitize(peaks_times + 14, throughs_times)
    # Add the end time of the clip as a throughs time, so that we don't have a out of bound
exception
        throughs_times = np.append(throughs_times, clip.duration)
        t = peaks_times[0]
        final_times=[{"start":max(t-5,    0)*1000, "end": min(throughs_times[inds[0]],
clip.duration, t+85)*1000}]
        for i, t in enumerate(peaks_times):
            # Check if t is 60 seconds apart from the last final time
            # if (t - final_times[-1]) < 60:
            if ((t-5) * 1000 > final_times[-1]["end"]):
                # check if t is louder than the last final time
                # if averaged_volumes[t] > averaged_volumes[final_times[-1]["start"]+5]:
                #     final_times[-1] = { "start": max(t-5,0),
                #          "end": min(throughs_times[inds[i]], clip.duration, t+55)}
                # else:
                start = max(t-5,0)
                end = min(throughs_times[inds[i]], clip.duration, t+85)
                if end - start > float(config['algorithms']['minSecondsDuration']):
                    final_times.append({ "start": start*1000,
                                         "snap": t*1000,
                                         "end": end*1000 })
        elapsed_time = time.time( ) - start_time
        print(elapsed_time)
        return     getImagesFromTimestamps(config, meta, directory, video_filename,
final_times)
```

In an illustrative example, exemplary video segmentation as a function of multimedia stream sound volume as depicted, for example, in FIG. 10, and illustrated by the foregoing exemplary code, may be implemented in some embodiments by a process similar to the following to generate highlights based on volume of the sound:
1) Extract audio from video by with a buffer size, byte size, and frame rate of sound that may be different depending on the hardware specification.
2) Divide up the sound wave in one second intervals and put it into a list. In some embodiments the interval period may be chosen as more or less than one second.
3) Normalize the volume value by taking the root mean square. Do this for every one second interval.

$$x_{rms} = \sqrt{\frac{1}{n}(x_1^2 + x_2^2 + \ldots + x_n^2)}$$

4) Take the average of 5-30 second intervals for each interval. The value may be changed depending on the pace of the video. If the video has a lot of motions and has a quick transition between less important and important parts, this value may be less to lower the threshold for cutoff. The last interval may be omitted from the calculation since there are no more values to take an average of
5) Each interval is then calculated to see if the values are increasing over time. For the volume vectors that are positive, their indexes are stored in one array. The same is done for volume vectors that are negative and their indexes are stored in another array.
6) The peak volumes are defined as volume vector being positive in one interval and then negative in next interval. The interval indexes for peak volumes are calculated by taking matrix multiplication of positive indexes with the last index omitted, and negative indexes with first index omitted, and finding nonzero indices.
7) The trough volumes are defined as volumes vector being negative in one internal then positive in the next interval. Similarly, the interval index for trough indexes are calculated by taking matrix multiplication of positive indexes with the first index omitted and negative indexes with the last index omitted and finding nonzero indices.
8) From the peak volumes, the high percentile (>93%, or >1.8 standard deviation) are filtered into a separate list and from the trough volumes, the low percentile volumes (<75%) are filtered into a list. The threshold percentile may be changed to meet the target highlight product, which should be approximately 20% of the original duration adhering to the Pareto Principle.
9) For every peak index, the algorithm matches a trough index that occurs is least 14 seconds afterwards so that no highlight is shorter than 14 seconds. The interval from the peak index to the trough index.
10) The starting time is set as 5-30 seconds prior to the peak volume, as noted in the previous step to account for the transition time into the significance moment in a video.
11) The end time is set where the trough value is. This allows for the highlight to end gracefully where the content is on the verge of reaching a non-critical point.
12) The preview image for the highlight is extracted with the peak time as the anchor point, as a result of Video Segment thumbnail generation, also disclosed herein.

Figure 11:
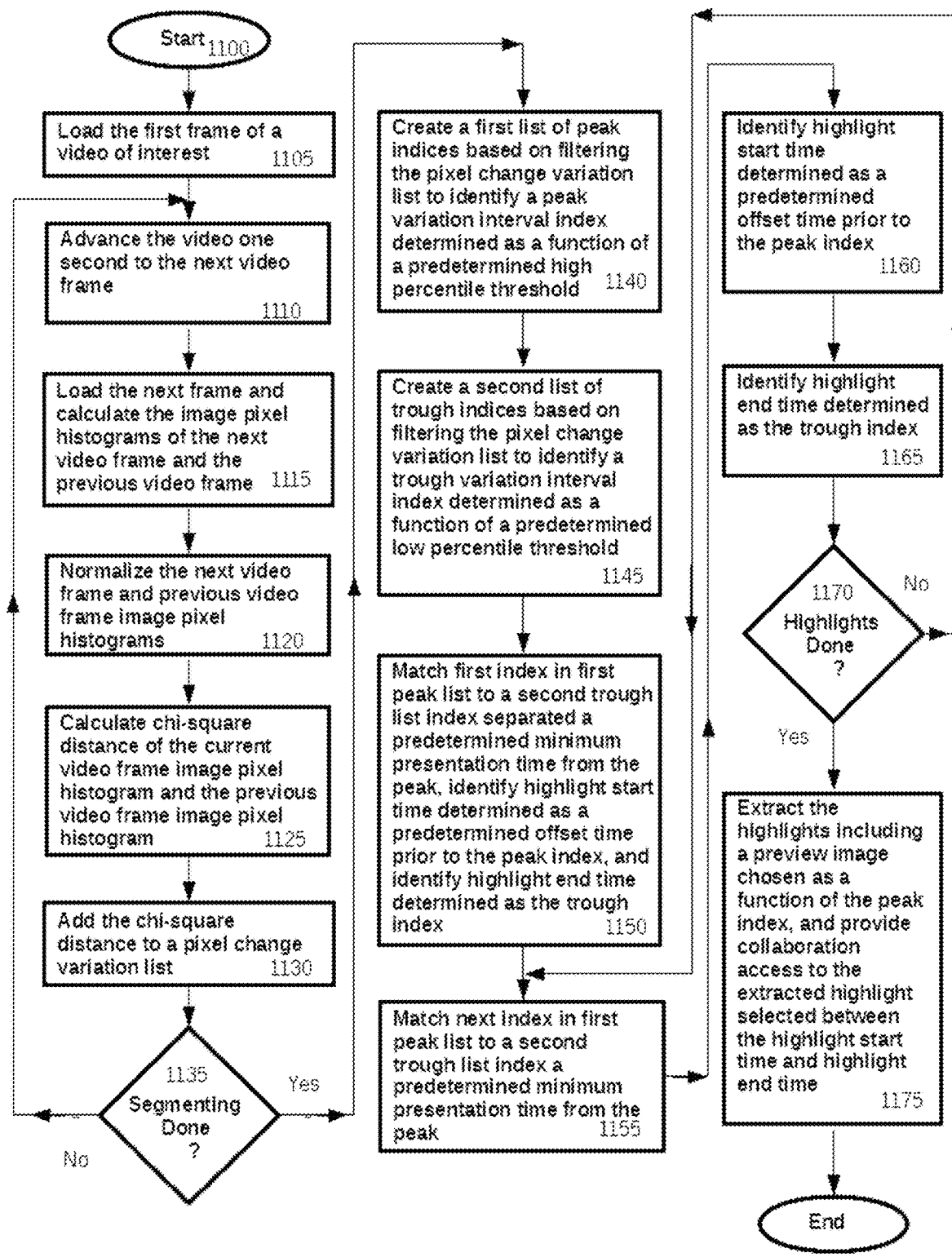
FIG. 11 depicts a process flow of an exemplary VSACE (Video Summarization and Collaboration Engine) providing collaboration access to video summarized based on highlights selected from multimedia sections segmented as a function of multimedia stream pixel histograms.

FIG. 11 depicts a process flow of an exemplary VSACE (Video Summarization and Collaboration Engine) providing collaboration access to video summarized based on highlights selected from multimedia sections segmented as a function of multimedia stream pixel histograms. The method depicted in FIG. 11 is given from the perspective of the Video Summarization and Collaboration Engine (VSACE) 325 executing as program instructions on the processor (CPU) 305, depicted in FIG. 3. In the illustrated embodiment, the VSACE 325 executes as program instructions on the processor 305 configured in VSACE host 162, depicted in at least FIG. 1, FIG. 2, FIG. 3, and FIG. 4. In some embodiments, the Video Summarization and Collaboration Engine (VSACE) 325 may execute as a cloud service communicatively coupled with system services, hardware resources, or software elements local to and/or external to the VSACE host 162. The depicted method 1100 begins at step 1105 with the processor 305 loading the first frame of a video of interest. The method continues at step 1110 with the processor 305 advancing the video one second to the next video frame. The method continues at step 1115 with the processor 305 loading the next frame and calculating the image pixel histograms of the next video frame and the previous video frame. The method continues at step 1120 with the processor 305 normalizing the next video frame and previous video frame image pixel histograms. The method continues at step 1125 with the processor 305 calculating the chi-square distance of the current video frame image pixel histogram and the previous video frame image pixel histogram. The method continues at step 1130 with the processor 305 adding the chi-square distance to a pixel change variation list. At step 1135, the processor 305 performs a test to determine if the method is done segmenting video. Upon a determination by the processor 305 at step 1135 the method is not done segmenting video, the method continues at step 1110 with the processor 305 advancing the video one second to the next video frame. Upon a determination by the processor 305 at step 1135 the method is done segmenting video, the method continues at step 1140 with the processor 305 creating a first list of peak indices based on filtering the pixel change variation list to identify a peak variation interval index determined as a function of a predetermined high percentile threshold. The method continues at step 1145 with the processor 305 creating a second list of trough indices based on filtering the pixel change variation list to identify a trough variation interval index determined as a function of a predetermined low percentile threshold. The method continues at step 1150 with the processor 305 matching the first index in the first peak list to a second trough list index separated a predetermined minimum presentation time from the peak, identifying the highlight start time determined as a predetermined offset time prior to the peak index, and identifying the highlight end time determined as the trough index. The method continues at step 1155 with the processor 305 matching the next index in the first peak list to a second trough list index a predetermined minimum presentation time from the peak. The method continues at step 1160 with the processor 305 identifying the highlight start time determined as a predetermined offset time prior to the peak index. The method continues at step 1165 with the processor 305 identifying the highlight end time determined as the trough index. At step 1170 the processor 305 performs a test to determine if the method is done locating highlights in the video. Upon a determination at step 1170 by the processor 305 the method is not done locating highlights in the video, the method continues at step 1155 with the processor 305 matching the next index in the first peak list to a second trough list index a predetermined minimum presentation time from the peak. Upon a determination at step 1170 by the processor 305 the method is done locating highlights in the video, the method continues at step 1175 with the processor 305 extracting the highlights including a preview image chosen as a function of the peak index, and providing collaboration access to the extracted highlight selected between the highlight start time and highlight end time.

In an illustrative example, exemplary video segmentation as a function of multimedia stream pixel histograms as depicted, for example, in FIG. 11, may be implemented in some embodiments by a process similar to the following to generate highlights based on video pixel histograms:

1) Access the video stream. In some embodiments, a portion of the video stream may be loaded into the memory using the Open Source OpenCV library.
2) Iterate through the video byte stream at every second based from the frames per second information. In some embodiments the iteration period may be chosen as more or less than one second.
3) Obtain the image histogram matrix at a given time. In some embodiments, the image histogram matrix may be resized so that only half of the information is stored for a faster processing. In various embodiments, an 8-pixel bin size and a range of 0, 256 for intensity values may be used to simplify the calculation.
4) Normalize the image file and flatten the matrix into a list Compute the chi-square distance of the current histogram and the previous histogram $$x^2 = \sum_{i=1}^{n} \frac{(O_i - E_i)^2}{E_i}$$

5) Store the chi-square distances into a list. This list describes the variation of pixel changes of the entire video at a specific interval.
6) From the pixel distance list, the high percentile (>93%, or >1.8 standard deviation) are filtered into a separate list and from the same list, the low percentile (<25%) are filtered into a list. The threshold percentile may be changed to meet the target highlight product, which may be approximately 20% of the original duration adhering to the Pareto Principle.
7) For every peak index, the algorithm matches a trough index that occurs at least 5 seconds afterwards so that no highlight is shorter than the 5 second peak-to-trough match interval from the peak index to the trough index. In some embodiments, the peak-to-trough match interval from the peak index to the trough index may be chosen as more or less than five seconds.
8) The starting time is set as 5-30 seconds prior to the peak volume, as noted in the previous step to account for the transition time into the significance moment in a video.
9) The end time is set where the trough value is. This allows for the highlight to end gracefully where the content is on the verge of reaching a non-critical point. The preview image for the highlight is extracted with the peak time as the anchor point, as a result of Video Segment thumbnail generation, also disclosed herein.

Figure 12:
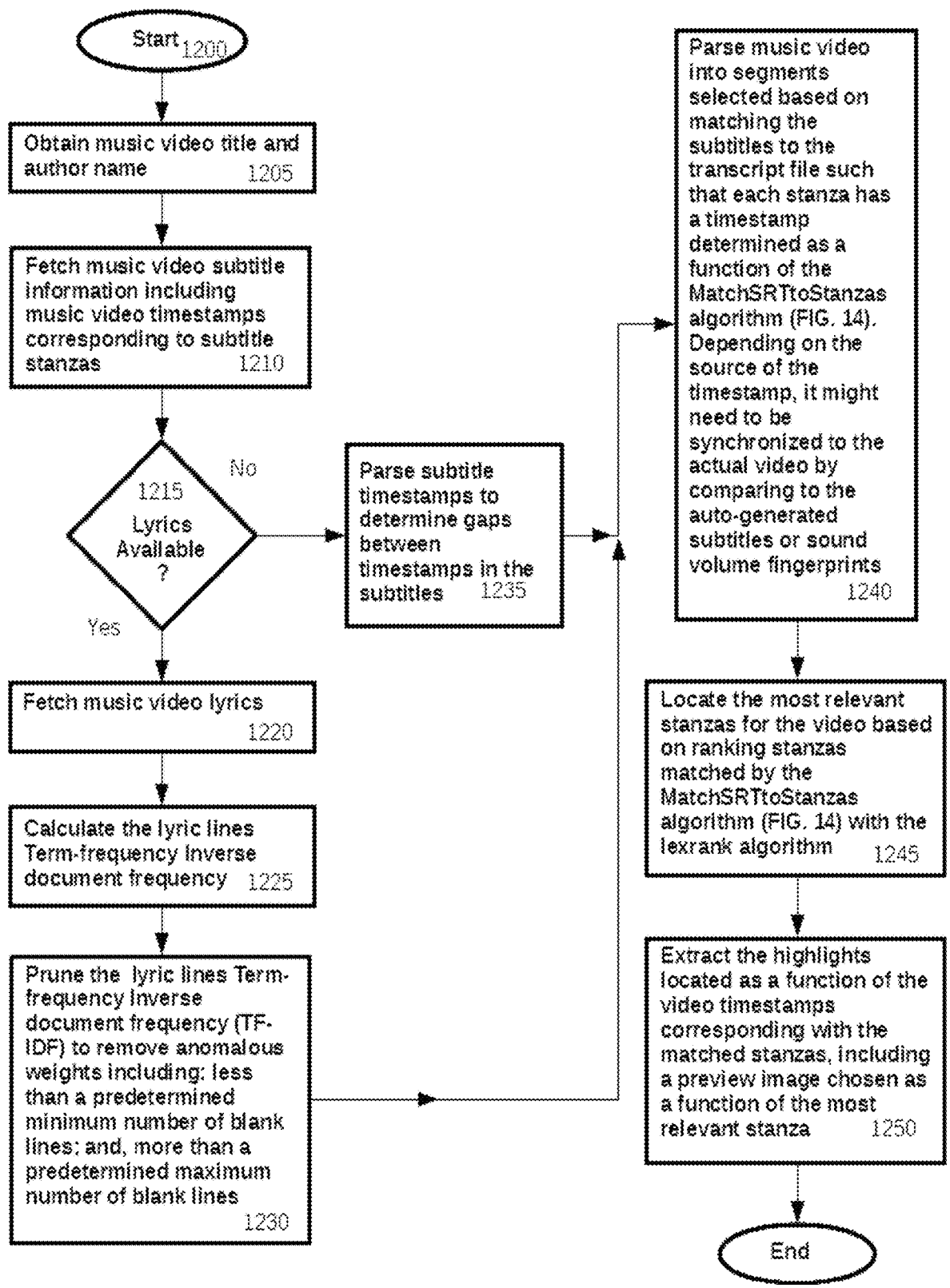
FIG. 12 depicts a process flow of an exemplary VSACE (Video Summarization and Collaboration Engine) providing collaboration access to video summarized based on highlights selected from multimedia sections segmented based on matching timestamped subtitles with a TF-IDF analysis of lyrics associated to the video.

FIG. 12 depicts a process flow of an exemplary VSACE (Video Summarization and Collaboration Engine) providing collaboration access to video summarized based on highlights selected from multimedia sections segmented based on matching timestamped subtitles with a TF-IDF analysis of lyrics associated to the video. The method depicted in FIG. 12 is given from the perspective of the Video Summarization and Collaboration Engine (VSACE) 325 executing as program instructions on the processor (CPU) 305, depicted in FIG. 3. In the illustrated embodiment, the VSACE 325 executes as program instructions on the processor 305 configured in VSACE host 162, depicted in at least FIG. 1, FIG. 2, FIG. 3, and FIG. 4. In some embodiments, the Video Summarization and Collaboration Engine (VSACE) 325 may execute as a cloud service communicatively coupled with system services, hardware resources, or software elements local to and/or external to the VSACE host 162. The depicted method 1200 begins at step 1205 with the processor 305 obtaining the title and author name of a music video. The method continues at step 1210 with the processor 1210 fetching the music video subtitle information including music video timestamps corresponding to subtitle stanzas. At step 1215 the processor 305 performs a test to determine if lyrics associated with the music video are available. Upon a determination by the processor 305 at step 1215 that lyrics are available, the method continues at step 1220 with the processor 305 fetching the music video lyrics. The method continues at step 1225 with the processor calculating the lyric lines Term-frequency Inverse document frequency. The method continues at step 1230 with the processor 305 pruning the lyric line's Term-frequency Inverse document frequency (TF-IDF) to remove anomalous weights including: less than a predetermined minimum number of blank lines; and, more than a predetermined maximum number of blank lines, and the method continues at step 1240. Upon a determination by the processor 305 at step 1215 that lyrics are not available, the method continues at step 1235 with the processor 305 parsing the subtitle timestamps to determine gaps between timestamps in the subtitles. The method continues at step 1240, with the processor 305 parsing the music video into segments selected based on matching the subtitles to the transcript file such that each stanza has a timestamp determined as a function of an exemplary MatchSRTtoStanzas algorithm (illustrated by FIG. 14). Depending on the source of the timestamp, it might need to be synchronized to the actual video by comparing to the auto-generated subtitles or sound volume fingerprints. The method continues at step 1245 with the processor 305 locating the most relevant stanzas for the video based on ranking stanzas matched by the exemplary MatchSRTtoStanzas algorithm (illustrated by FIG. 14) with the LexRank algorithm. The method ends with the processor 305 at step 1250 extracting the highlights located as a function of the video timestamps corresponding with the matched stanzas, including a preview image chosen as a function of the most relevant stanza.

In an illustrative example, exemplary video segmentation as a function of matching timestamped multimedia subtitles with a TF-IDF analysis of lyrics associated to the video as depicted, for example, in FIG. 12, may be implemented in some embodiments by a process similar to the following, to generate highlights based on music video lyrics:

1) Obtain the title and author of the music video from the video source provider (Youtube, Vimeo, etc.)
2) Fetch the subtitle information that include timestamps, so that the location for segmentation can be known for segmentation.
   a. There can be many sources for subtitles. Youtube, Amara.org (crowdsourced subtitles) as well as many different languages. In some embodiments, subtitles from multiple sources may be saved as possible candidates.
3) Fetch the lyrics lrc file from the web to use as a reference document for parsing music videos into stanzas. Some embodiments may use the python MiniLyrics library to fetch lyrics from crintsoft.com. There may be many versions of lyrics for a given musical work. In an illustrative example, some embodiments may employ the following technique for selecting an ideal lyric candidate:
   a. Do TF-IDF (term frequency-inverse document frequency) of the lyrics lines and store it to the list.
   b. Also, check if there are enough blank lines. Blank lines denote where the stanzas begin and end. If there are not enough blank lines, for example, less than three, it may be a blob of lyrics which may not represent stanzas properly. If the lyrics have too many blank lines such that the average lines in stanzas are less than 3, it is also undesirable for segmenting music video so they are filtered out.
   c. If the ratings for lyric files are provided by the service, any candidate less than the average rating may be filtered out. (e.g. 3 out 5 on a 5-star rating system)
   d. Lrc files may contain duration information. If the duration is beyond the chi square value from other lyrics, they may be filtered out.
4) If the lyrics files are not available, the subtitle file may be grouped by detecting the gap between timestamps in the subtitle file.
5) Match the subtitles to the transcript file so that each stanza has timestamps using the MatchSRTtoStanzas algorithm (depicted in FIG. 14). Depending on the source of the timestamp, it might need to be synchronized to the actual video by comparing to the auto-generated subtitles or sound volume fingerprints.
6) Feed the sentences into the LexRank algorithm to find the most relevant stanzas for the video. Increase the number of stanzas so that the total duration is approximately 20% of the original duration adhering to the Pareto Principle.
   The preview image for the highlight is extracted with the peak time as the anchor point, as a result of Video Segment thumbnail generation, also disclosed herein.

Figure 13:
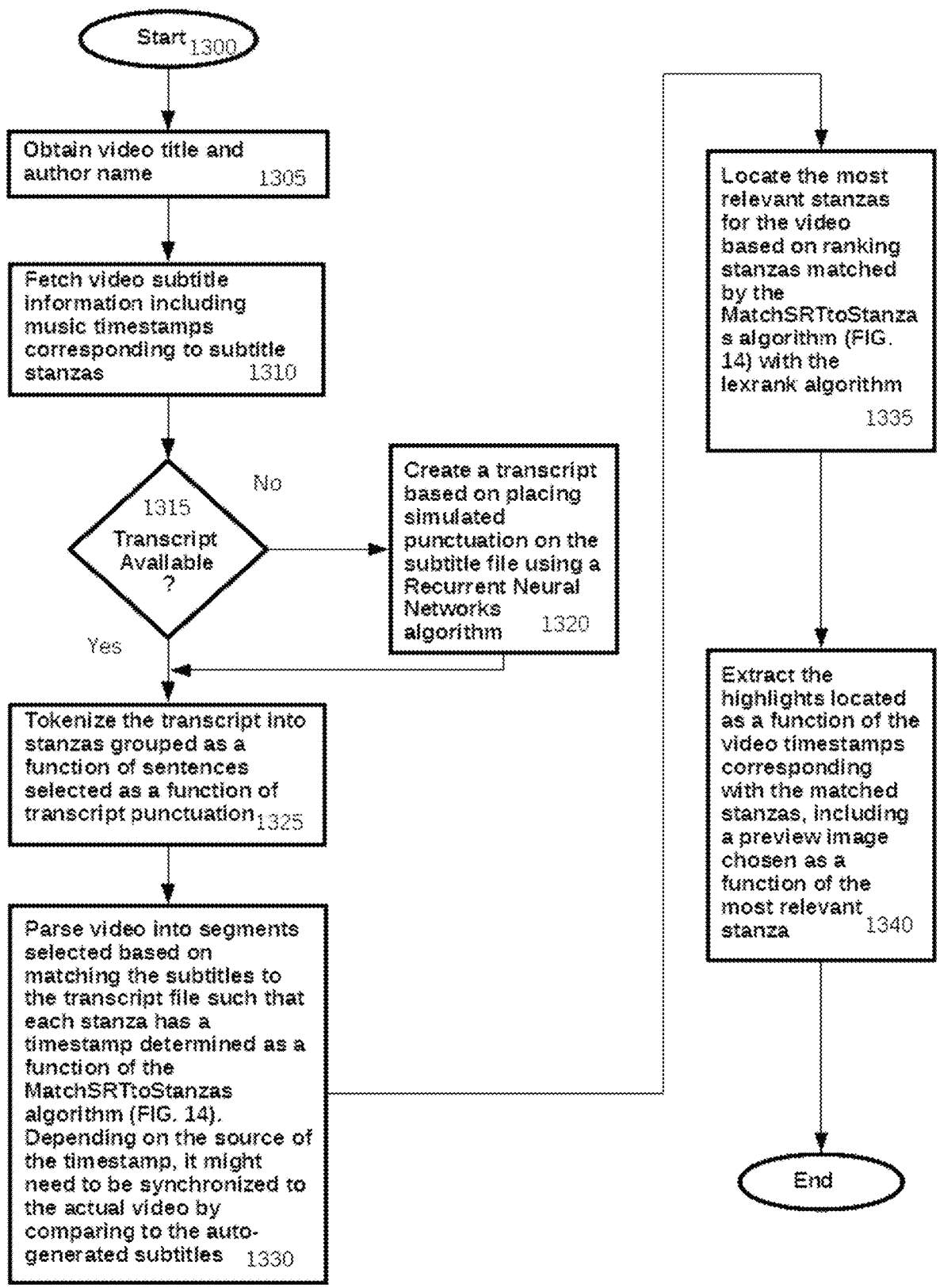
FIG. 13 depicts a process flow of an exemplary VSACE (Video Summarization and Collaboration Engine) providing collaboration access to video summarized based on highlights selected from multimedia sections segmented as a function of TF-IDF transcript or subtitle analysis.

FIG. 13 depicts a process flow of an exemplary VSACE (Video Summarization and Collaboration Engine) providing collaboration access to video summarized based on highlights selected from multimedia sections segmented as a function of TF-IDF transcript or subtitle analysis. The method depicted in FIG. 13 is given from the perspective of the Video Summarization and Collaboration Engine (VSACE) 325 executing as program instructions on the processor (CPU) 305, depicted in FIG. 3. In the illustrated embodiment, the VSACE 325 executes as program instructions on the processor 305 configured in VSACE host 162, depicted in at least FIG. 1, FIG. 2, FIG. 3, and FIG. 4. In some embodiments, the Video Summarization and Collaboration Engine (VSACE) 325 may execute as a cloud service communicatively coupled with system services, hardware resources, or software elements local to and/or external to the VSACE host 162. The depicted method 1300 begins at step 1305 with the processor 305 obtaining the title and author name of a video. The method continues at step 1310 with the processor 305 fetching the video subtitle information including music timestamps corresponding to subtitle stanzas. At step 1315 the processor 305 performs a test to determine if a video transcript is available. Upon a determination by the processor 305 at step 1315 a video transcript is not available, the method continues at step 1320 with the processor 305 creating a transcript based on placing simulated punctuation on the subtitle file using a Recurrent Neural Networks algorithm, and the method continues at step 1325. Upon a determination by the processor 305 at step 1315 a video transcript is available, the method continues at step 1325 with the processor 305 tokenizing the transcript into stanzas grouped as a function of sentences selected as a function of transcript punctuation. The method continues at step 1330 with the processor 305 parsing video into segments selected based on matching the subtitles to the transcript file such that each stanza has a timestamp determined as a function of an exemplary MatchSRTtoStanzas algorithm (illustrated by FIG. 14). Depending on the source of the timestamp, it might need to be synchronized to the actual video by comparing to the auto-generated subtitles. The method continues at step 1335 with the processor 305 locating the most relevant stanzas for the video based on ranking stanzas matched by the exemplary MatchSRTto-Stanzas algorithm (illustrated by FIG. 14) with the LexRank algorithm. At step 1340 the method ends with the processor 305 extracting the highlights located as a function of the video timestamps corresponding with the matched stanzas, including a preview image chosen as a function of the most relevant stanza.

In an illustrative example, exemplary video segmentation as a function of TF-IDF analysis of a transcript or subtitles associated to the video as depicted, for example, in FIG. 13, may be implemented in some embodiments by a process similar to the following, to generate highlights based on a transcript or subtitles:

1) Obtain the title and author of the music video from the video source provider (Youtube, Vimeo, etc.)
2) Fetch the subtitle information that includes timestamps, so that the precise subtitle location can be known for segmentation.
   a) There can be many sources for subtitles. Youtube, Amara.org (crowdsourced subtitles) as well as many different languages. In some embodiments, subtitles from multiple sources may be saved as possible candidates.
3) Fetch the transcript of the file. The source of these files may vary according to the source of the content. TEDTalk and many education institutions, for example, may host transcript files on their websites for the public to use. The way these files can be fetched differs. Sometimes a 3rd party service provides API for this information to be fetched, but if that is not the case, a custom scraper may be written. In various scenarios, a transcript may provide a logical organization of the speeches into proper stanzas, in addition to clean up of filler words and redundant phrases. In some examples, the inclusion of punctuation in a transcript may provide a vital role in tokenizing the document into sentences for running algorithms.
4) In some embodiments, if a transcript is not available, then a Recurrent Neural Networks algorithm may be used to place punctuations on the subtitle files. In various scenarios, the accuracy of this approach may be as much as approximately 90%.
   a) Using the transcript file, tokenize it. In some embodiments, the transcript file may be tokenized using Punkt Sentence Tokenizer in Natural Language Toolkit, or a similar library.
   b) These sentences can be organized into stanzas using various algorithms; the simplest approach may be detecting short sentences and using that as a marker for dividing up sentences. This approach relies on a speech pattern where a speech block starts off and ends with short fillers or short phrases.
5) Match the subtitles to the transcript file so that each stanza has timestamps using the 'MatchSRTtoStanzas' algorithm (depicted in FIG. 14). Depending on the source of the timestamp, it might need to be synchronized to the actual video by comparing to the auto-generated subtitles.
6) Feed the sentences into LexRank algorithm to find the most relevant stanzas for the video. Increase the number of stanzas so that the total duration is approximately 20% of the original duration adhering to the Pareto Principle.

The preview image for the highlight is extracted with the peak time as the anchor point, as a result of various embodiments of Video Segment thumbnail generation, also disclosed herein.

Figure 14:
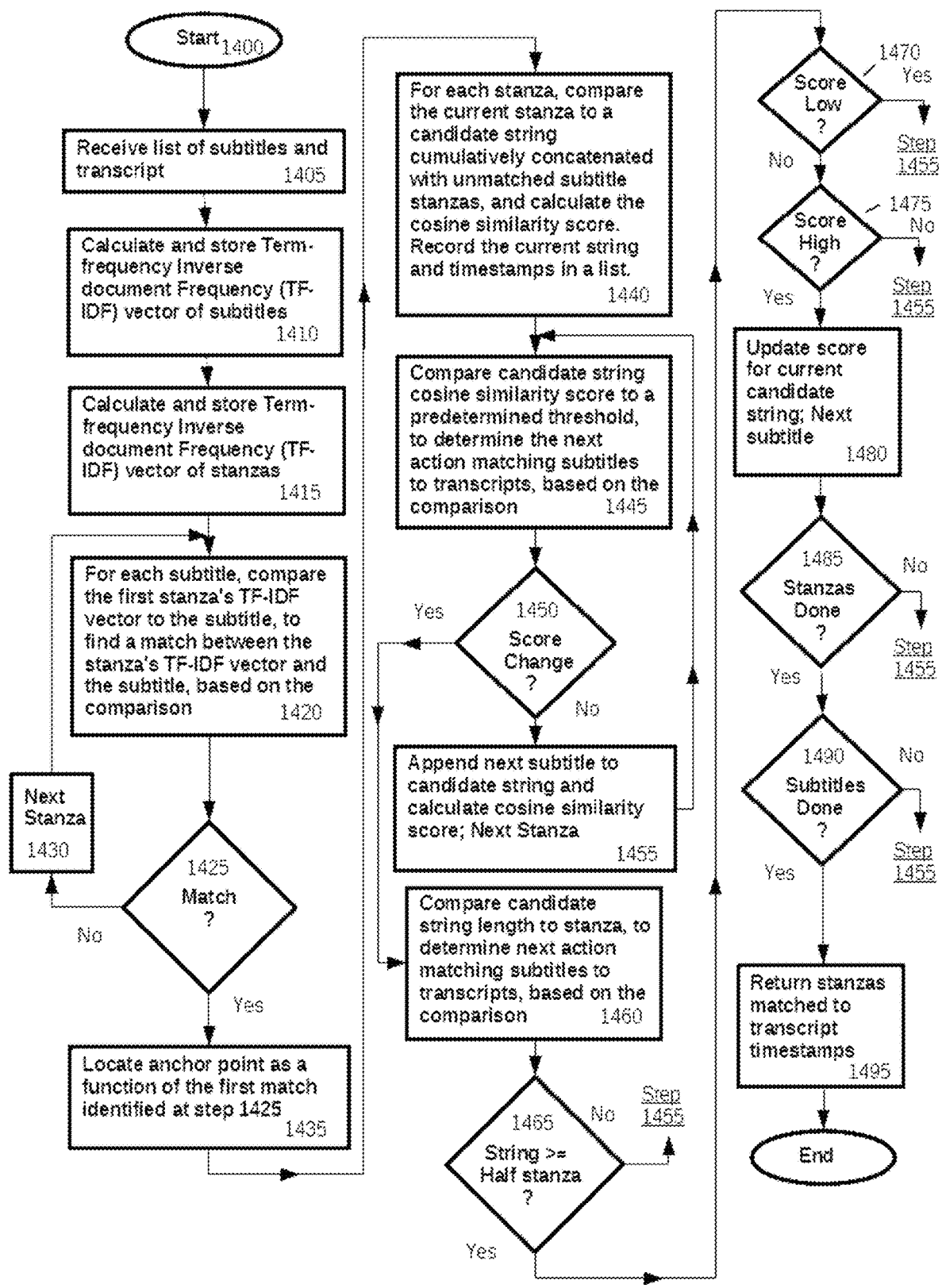
FIG. 14 depicts a process flow of an exemplary VSACE (Video Summarization and Collaboration Engine) providing collaboration access to video summarized based on highlights selected from multimedia sections segmented based on a subtitle matched to a transcript stanza as a function of TF-IDF analysis.

FIG. 14 depicts a process flow of an exemplary VSACE (Video Summarization and Collaboration Engine) providing collaboration access to video summarized based on highlights selected from multimedia sections segmented based on a subtitle matched to a transcript stanza as a function of TF-IDF analysis. The method depicted in FIG. 14 is given from the perspective of the Video Summarization and Collaboration Engine (VSACE) 325 executing as program instructions on the processor (CPU) 305, depicted in FIG. 3. In the illustrated embodiment, the VSACE 325 executes as program instructions on the processor 305 configured in VSACE host 162, depicted in at least FIG. 1, FIG. 2, FIG. 3, and FIG. 4. In some embodiments, the Video Summarization and Collaboration Engine (VSACE) 325 may execute as a cloud service communicatively coupled with system services, hardware resources, or software elements local to and/or external to the VSACE host 162. The depicted method 1400 begins at step 1405 with the processor 305 receiving a list of subtitles and a transcript. The method continues at step 1410 with the processor 305 calculating and storing the Term-frequency Inverse document Frequency (TF-IDF) vector of the subtitles. The method continues at step 1415 with the processor 305 calculating and storing Term-frequency Inverse document Frequency (TF-IDF) vector of transcript stanzas. In the illustrated embodiment, the transcript may include one or more stanza. The method continues at step 1420 with the processor 305 comparing for each subtitle the first stanza's TF-IDF vector to the current subtitle, to find a match between the stanza's TF-IDF vector and the subtitles, based on the comparison. At step 1425 the processor 305 performs a test to determine if a match was found between the stanza's TF-IDF vector and the subtitle, based on the comparison performed by the processor 305 at step 1420. Upon a determination by the processor 305 at step 1425 a match was not found between the stanza's TF-IDF vector and the subtitle, the processor 305 advances to the next stanza at step 1430 and the method continues at step 1420 with the processor 305 comparing the first stanza's TF-IDF vector to each subtitle, to find a match between the stanza's TF-IDF vector and the subtitle, based on the comparison. Upon a determination by the processor 305 at step 1425 a match was found between the stanza's TF-IDF vector and the subtitle, the method continues at step 1435 with the processor 305 locating the anchor point as a function of the first match identified at step 1425. The method continues at step 1440 with the processor 305 comparing for each stanza the current stanza to a candidate string cumulatively concatenated with unmatched subtitle stanzas, calculating the cosine similarity score, and recording the current string and timestamps in a list. The method continues at step 1445 with the processor 305 comparing the candidate string cosine similarity score to a predetermined threshold, to determine the next action matching subtitles to transcripts, based on the comparison. At step 1450 the processor 305 performs a test to determine if the cosine similarity score changed, based on the comparison performed by the processor 305 at step 1445. Upon a determination by the processor 305 at step 1450 the cosine similarity score did not change, the method continues at step 1455 with the processor 305 appending the next subtitle to the candidate string, the processor 305 calculating the candidate string cosine similarity score, and the processor 305 advancing to the next stanza. The method continues at step 1445 with the processor 305 comparing the candidate string cosine similarity score to a predetermined threshold, to determine the next action matching subtitles to transcripts, based on the comparison. Upon a determination by the processor 305 at step 1450 the cosine similarity score changed, the method continues at step 1460 with the processor 305 comparing the candidate string length to the half the stanza length, to determine the next action matching subtitles to transcripts, based on the comparison. At step 1465 the processor 305 performs a test to determine if the candidate string length is greater than or equal to half the stanza length, based on the comparison performed by the processor 305 at step 1460. Upon a determination by the processor 305 at step 1465 the candidate string length is not greater than or equal to half the stanza length, the method continues at step 1455 with the processor 305 appending the next subtitle to the candidate string, the processor 305 calculating the candidate string cosine similarity score, and the processor 305 advancing to the next stanza. Upon a determination by the processor 305 at step 1465 the candidate string length is greater than or equal to half the stanza length, the processor 305 performs a test at step 1470 to determine if the candidate string cosine similarity score is less than a predetermined minimum. Upon a determination by the processor 305 at step 1470 the candidate string cosine similarity score is less than or equal to a predetermined minimum, the processor 305 continues executing the method at step 1455. Upon a determination by the processor 305 at step 1470 the candidate string cosine similarity score is not less than a predetermined minimum, the processor 305 at step 1475 performs a test to determine if the candidate string cosine similarity score is greater than or equal to a predetermined threshold. Upon a determination by the processor 305 at step 1475 the candidate string cosine similarity score is not greater than or equal to the predetermined threshold, the processor 305 continues executing the method at step 1455. Upon a determination by the processor 305 at step 1475 the candidate string cosine similarity score is greater than or equal to the predetermined threshold, the method continues at step 1480 with the processor 305 updating the candidate string cosine similarity score and advancing to the next subtitle. At step 1485 the processor 305 performs a test to determine if the method is done parsing stanzas. Upon a determination by the processor 305 at step 1485 the method is not done parsing stanzas, the processor 305 continues executing the method at step 1455. Upon a determination by the processor 305 at step 1485 the method is done parsing stanzas, the processor 305 at step 1490 performs a test to determine if the method is done parsing subtitles. Upon a determination by the processor 305 at step 1490 the method is not done parsing subtitles, the processor 305 continues executing the method at step 1455. Upon a determination by the processor 305 at step 1490 the method is done parsing subtitles, the method ends at step 1495 with the processor 305 returning stanzas matched to transcript timestamps.

In an illustrative example, exemplary video segmentation as a function of highlights selected from multimedia sections segmented as a function of a subtitle matched to a transcript stanza based on TF-IDF analysis as depicted, for example, in FIG. 14, may be implemented in some embodiments with code such as the following exemplary implementation of the MatchSRTtoStanzas algorithm:

```
import math
import re
from collections import Counter
WORD = re.compile(r'\S+')
def get_cosine(vec1, vec2):
    intersection = set(vec1.keys( )) & set(vec2.keys( ))
    numerator = sum([vec1[x] * vec2[x] for x in intersection])
    sum1 = sum([vec1[x]**2 for x in vec1.keys( )])
    sum2 = sum([vec2[x]**2 for x in vec2.keys( )])
    denominator = math.sqrt(sum1) * math.sqrt(sum2)
    if not denominator:
        return 0.0
    else:
        return float(numerator) / denominator
def text_to_vector(text):
    words = WORD.findall(
        re.sub('[?|$|.|!|,|[\]|(|)|\'\']', '',
            re.sub('\(.*\)', '',
                re.sub(ur'\p{P}+', '',
                    re.sub('<[^<]+?>', '', re.sub('<br\s*/?>|-|_', ' ',
                        text.lower( )
                        )
                    )
                )
            )
        )
    )
    if len(words) < 3:
        words = list(words)
    return Counter(words)
```

In an illustrative example, exemplary video segmentation as a function of highlights selected from multimedia sections segmented as a function of a subtitle matched to a transcript stanza based on TF-IDF analysis as depicted, for example, in FIG. 14, and illustrated by the foregoing exemplary code, may be implemented in some embodiments by a process similar to the following exemplary description of the MatchSRTtoStanzas algorithm. In an illustrative example, an exemplary MatchSRTtoStanzas algorithm takes a list of subtitles with timestamps and a transcript as input. Then, the MatchSRTtoStanzas algorithm finds the best matching subtitle for the transcript and merge subtitles to resembles stanzas in the transcript as closely as possible. In various embodiments, the TF-IDF cosine similarity comparison is chosen for the string comparison instead of algorithms based on Levenshtein distance, because the latter only works when the language contains alphabetized letters. TF-IDF can support any language and it is more resistant to variation of transcripts where words being repeated multiple times, making it an ideal algorithm for speeches and lyrics. In some embodiments, algorithms other than the TF-IDF cosine similarity comparison may be chosen for the string comparison. In various embodiments, an illustrative example basic implementation of the MatchSRTtoStanzas algorithm may be as follows:
1. Take a list of subtitles and transcript as input. Parse a transcript into stanzas.
2. Take TF-IDF vector of subtitles and store them into a list. Do the same for the stanzas.
3. Try to match to first stanza's TD-IDF vector to a subtitle by iterating through first fraction of subtitles. If there is no match, move on to next stanzas. The first matched serves as the anchor point for further steps and any subtitle and stanzas prior to the first match is considered inconsequential.

4. For every stanza, iterate through any unprocessed subtitles. Before proceeding to the next stanza, record the current string and timestamps and store it into a list.
   a. For a subtitle, the algorithm concatenates it to a candidate string and compares it to the current stanza and evaluates the cosine similarity score. Here are some possibilities in the comparison:
      i. If the current string to stanza comparison has no significant change in value compared to the string prior to the concatenation, then the loop continues, and next subtitle string is appended to the current string for comparison.
      ii. If the string is at least half the size of the stanza and
         1. The matching score is too low, then move on to the next stanza
         2. The matching score is low, but it matches the previous stanza, consider it to be the repeat of the previous stanzas (e.g. chorus)
         3. Calculate difference in unique words of the current string and current stanza, if the differences are high, then calculate the current subtitle to the next stanza. If this value is also high, then move on to the next stanza.
         4. Otherwise, update the score for the current string and move on to next subtitle.
   b. Check if the subtitle is better fit for the next stanza, if so, reset all temporary values and move on to the next stanza.
   c. If there is a long gap from current subtitle to the next subtitle, then the gap is considered to be an interlude that does not contain any subtitle. The timestamp for the interlude is recorded and then next subtitle and stanza are processed.
   d. If the resulting string for the stanzas has duration less than 7 seconds long, do not create a new timestamp, but proceed to the next stanza so that stanzas are merged.
5. Post Processing:
   a. If the subtitle has reached the end before all stanzas have not been processed, Ignore remaining stanzas.
   b. If the subtitle has not yet reached the end, but all stanzas have been processed, Update the timestamp so that the last stanza's ending time matches the last timestamp.
6. The sum of cosine similarity for TF-IDF vectors are summed into a total score. Out of all subtitle candidates, the best one is chosen, and it is returned for further processing.

Figure 15:
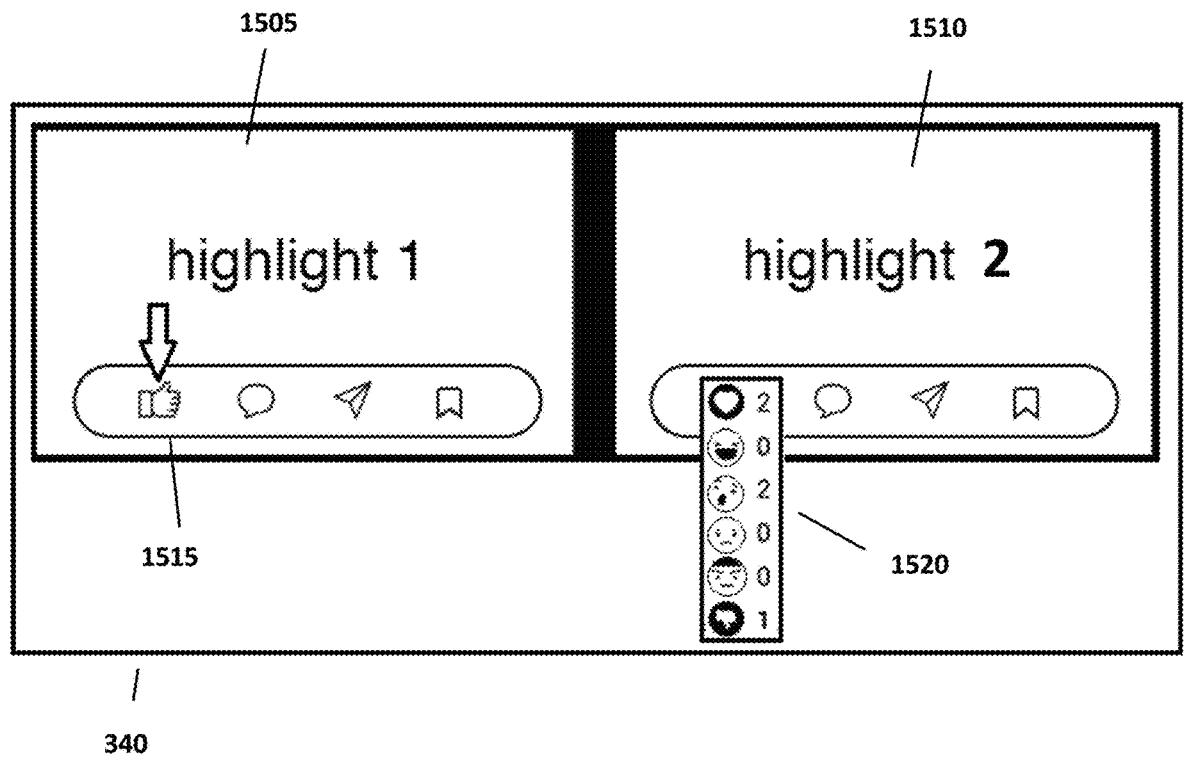
FIG. 15 depicts an illustrative view of an exemplary touch-enabled device interface user marking a video clip as a favorite highlight.

FIG. 15 depicts an illustrative view of an exemplary touch-enabled device interface user marking a video clip as a favorite highlight. In FIG. 15, the depicted embodiment touch-enabled device user interface 340, also depicted in FIG. 3, is a preview viewer illustrating exemplary interactive mobile device video segment snapshot display and annotation. In the illustrated embodiment, the preview viewer 340 displays snapshot images 1505 and 1510. In an illustrative example, in many scenarios, device displays of mobile size may be laid out in two columns. In the depicted embodiment, the preview viewer 340 column sizes are responsive to the screen size and can be changed dynamically. In the illustrated example, when the snapshot images 1505 or 1510 are selected, the corresponding video clip is played. In the depicted embodiment, while the video clip is being played, the corresponding snapshot in the preview may display user-selectable buttons configured in the reaction marking drawer 1520 to trigger various user-determined actions including, for example, actions such as those described below.

1) Casting a vote on a video clip with the 'like' button 1515 or long press the 'like' button 1515 to open up the reaction marking drawer 1520. In the depicted embodiment, the reaction marking drawer 1520 is illustrated overlaid on the video segment being played as 'highlight 2.' In various implementations, the reaction marking drawer 1520 may be referred to as a reaction pane. In the illustrated embodiment, the reaction marking drawer 1520 provides the user an option to select various reactions to the video segment, including, for example, Love, Haha, Wow, Sad, Angry, or Dislike. These actions get recorded and are displayed on the snapshot for identification purposes when the user sees it again in the preview panel in the future or in the favorites page.
2) Mark a video clip as a favorite from the preview thumbnail panel. The user maintains their favorite page in their profile and may view or arrange them at a later convenience.
3) Comment on the video clip and/or join the conversation regarding the video clip. Each video clip maintains its collection of comments, so that users can engage in a focused discussion on that clip. Comments may be sorted in a chronological order or by popularity. An article aggregates the comments that belong to the video clips. In this context, the comments place the thumbnail image of the video clip in the right-hand side, so the audience has a visual cue in the context. Pressing this thumbnail image also changes the view to play the corresponding video clip.
4) Open up the sharing options supported by the mobile Operating System with the unique link generated by the server.

Figure 24A:
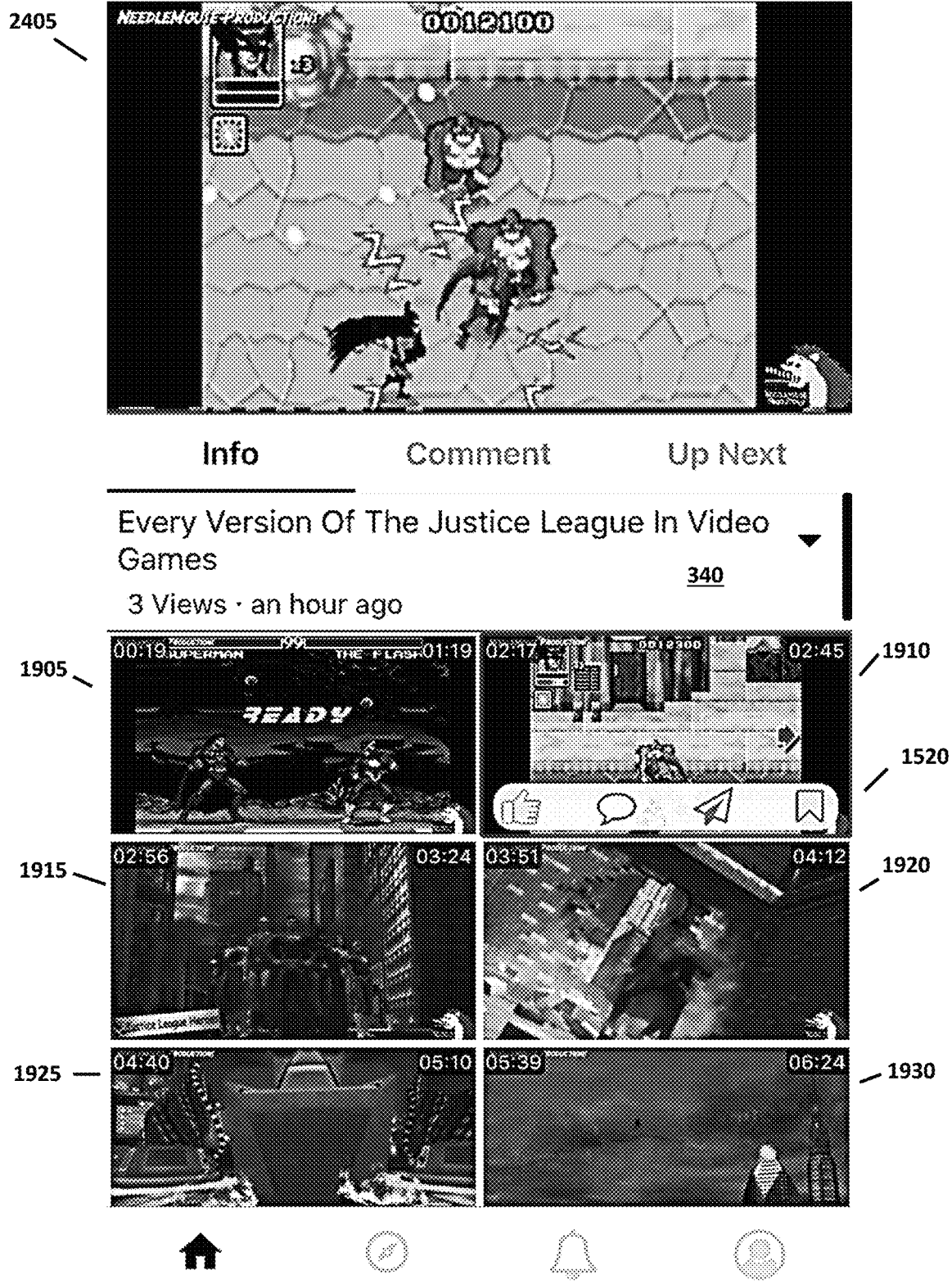
FIGS. 24A-24B depict an illustrative view of an exemplary touch-enabled video summarization and collaboration device interface user browsing highlights.
Figure 24B:
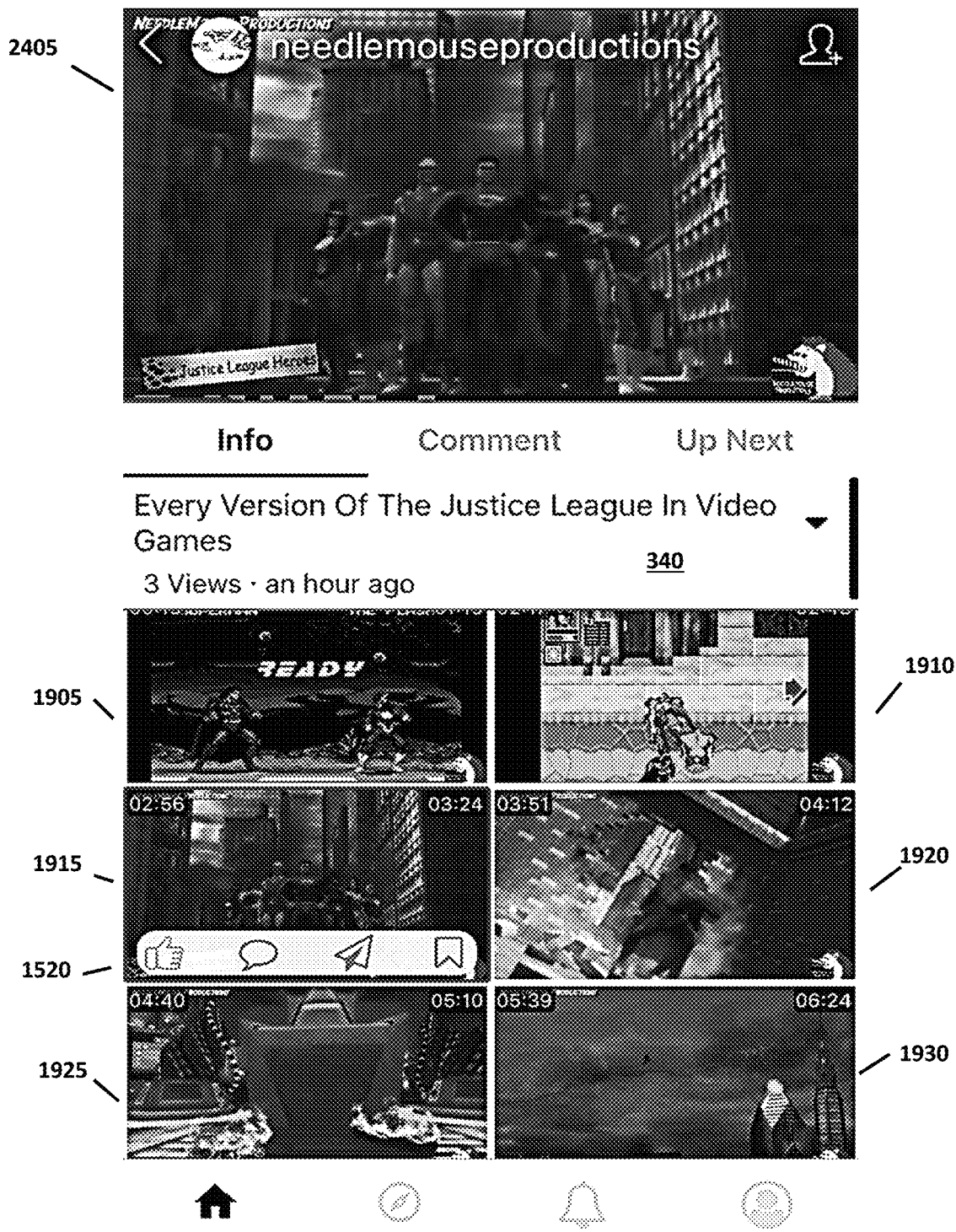

Turning now to FIGS. 24A-24B, an illustrative view of an exemplary touch-enabled video summarization and collaboration device interface user browsing highlights is described. In FIG. 24A, the illustrated embodiment touch-enabled device user interface 340, also depicted in FIG. 3, includes video player 2405, configured to play any video associated to the illustrated video highlight displays 1905, 1910, 1915, 1920, 1925, or 1930. In the depicted embodiment, the video highlight display 1910 includes user-selectable buttons configured in the reaction pane 1520 to enable the user to perform actions including, for example, indicating a 'like,' commenting, or sharing the highlight 1910. In the embodiment depicted by FIG. 24B, the user has selected the video highlight 1915 to be played in the video player 2405. In the illustrated embodiment, the video highlight 1915 is depicted overlaid with the user-selectable buttons configured in the reaction pane 1520 to enable the user to perform actions including, for example, indicating a 'like,' commenting, or sharing the highlight 1915.

Figure 16:
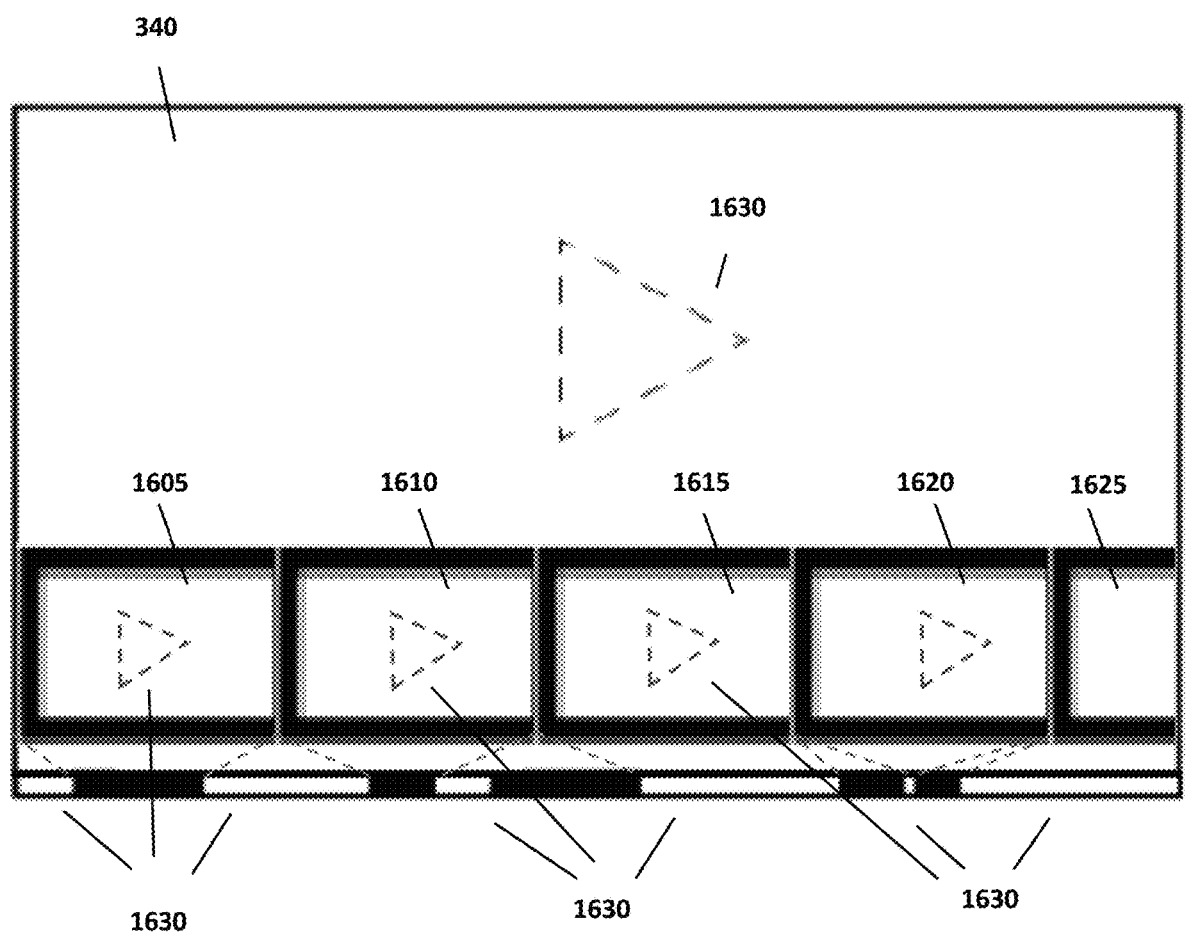
FIG. 16 depicts an illustrative view of an exemplary touch-enabled device user interface presenting a video highlight preview in landscape mode.

FIG. 16 depicts an illustrative view of an exemplary touch-enabled device user interface presenting a video highlight preview in landscape mode. In FIG. 16, the depicted embodiment touch-enabled device user interface 340, also depicted in FIG. 3, is a preview viewer illustrating exemplary interactive mobile device video segment snapshot display and annotation capability in landscape mode. In the illustrated embodiment, the touch-enabled device user interface 340 displays video previews 1605, 1610, 1615, 1620, and 1625 laid out horizontally in landscape viewing mode to maximize the screen real estate utilization on the bottom of the touch-enabled device user interface 340 page. The touch-enabled device user interface 340 includes video control buttons 1630 that are hidden while the preview panel is being displayed. Except for the orientation of the scroll, the functionalities of the video control buttons 1630 are identical. In some embodiments, the touch-enabled device user interface 340 may include control buttons permitting a user to bookmark a video clip associated to any of the depicted video previews 1605, 1610, 1615, 1620, or 1625. In various designs, the touch-enabled device user interface 340 may include a user favorite page. In various embodiments, a video clip bookmarked by a user via the touch-enabled device user interface 340 may be displayed in the user's favorite page. A bookmarked video clip displayed in a user's favorite page may play as if it is a part of the entire video, allowing users to seek the original source of the video as well as other video clips, and in some embodiments, this may be grouped into one or more collections the user may view separately. In some embodiments, a user's favorite page may lay out snapshots for the favorited clips and buttons for votes, comment, and share actions, with functionality similar to the preview panel in the viewing page. In various embodiments, when the user selects the snapshot of the video clip by pressing it, the video clip starts if it is a part of the original video stream, allowing users to discover other highlights that belong to the original video or understand the context of the favorited video clip. In some designs, video clips can be grouped into collections with a custom title. In various implementations, when all clips have been added and the order has been arranged, the collection may be converted into an article and published for a public viewing. In an illustrative example, the compilation of the article may be instantaneous, because the new article is merely metadata with all the timestamps of the clips.

Various embodiments include systems and methods for automatically, in real-time, identifying and compiling video clips during live streaming of video or playing recorded video content. The disclosed system and methods, according to some embodiments, automatically analyze a live streaming media file and identify portions of the media that are considered or constitute highlights. The disclosed systems and methods leverage these automatically detected highlights to create and enhance the social and viewing experience of users by enabling the highlight content to be indexed for searching, automatically shared across networks and rendered in various manners that provide users with the capability of focusing on the highlighted content, via the video streaming server API providing instantaneous video highlight compilation. In various examples, there may be two types of articles available on the service: Full Video, including any highlights embedded within the entire video, allowing users to skip to those highlights while watching the entire video; and, Highlights only, including a compilation of such highlights that may be grouped into a montage in a collection; in some embodiments, a collection may be converted into an article. In various examples, either an article or collection object may contain a group of image objects. In an illustrative example, Image objects may contain the metadata for the clip. When an article is requested and then received on a client, the client may first determine if there is a video source_url included. If so, it is considered 1) and the location of highlights will be marked on the timeline. Otherwise, it is considered 2) and the highlights will be placed one after another. Regardless of the type, the delivery of the video content is dynamic. The video viewer changes content based on the timestamps that are supplied by the system and the viewing mode the user has chosen.

In an illustrative example describing an embodiment Viewing System for Video Highlights, some modern video player libraries written in Javascript may contain event handlers that emit the state that the current video player is in. By putting event hook methods into these event handlers, the player can invoke different methods that are appropriate for the system. Most common events are: loaded, play, pause, ended, seek. Sometimes the video player supports progress event handler which may be called repeated under an interval of one second. In case of web access, where iframe based video players are more prevalent, this event may not be available and thus the approach to mimic the functionality differs. In an illustrative example, the video player client application fetches an article. An article is a group of meta information including author, cover image, text description, copyright information, current popularity in a float value, creation timestamp, modification timestamp, current owner, the original author, and a list of video clips metadata. Each video clip metadata contains source platform of the clip (e.g. youtube, video, twitch) and the ID of the original clip, the starting time and the duration, snapshot image url, user's vote, or the user's message.

Figure 17:
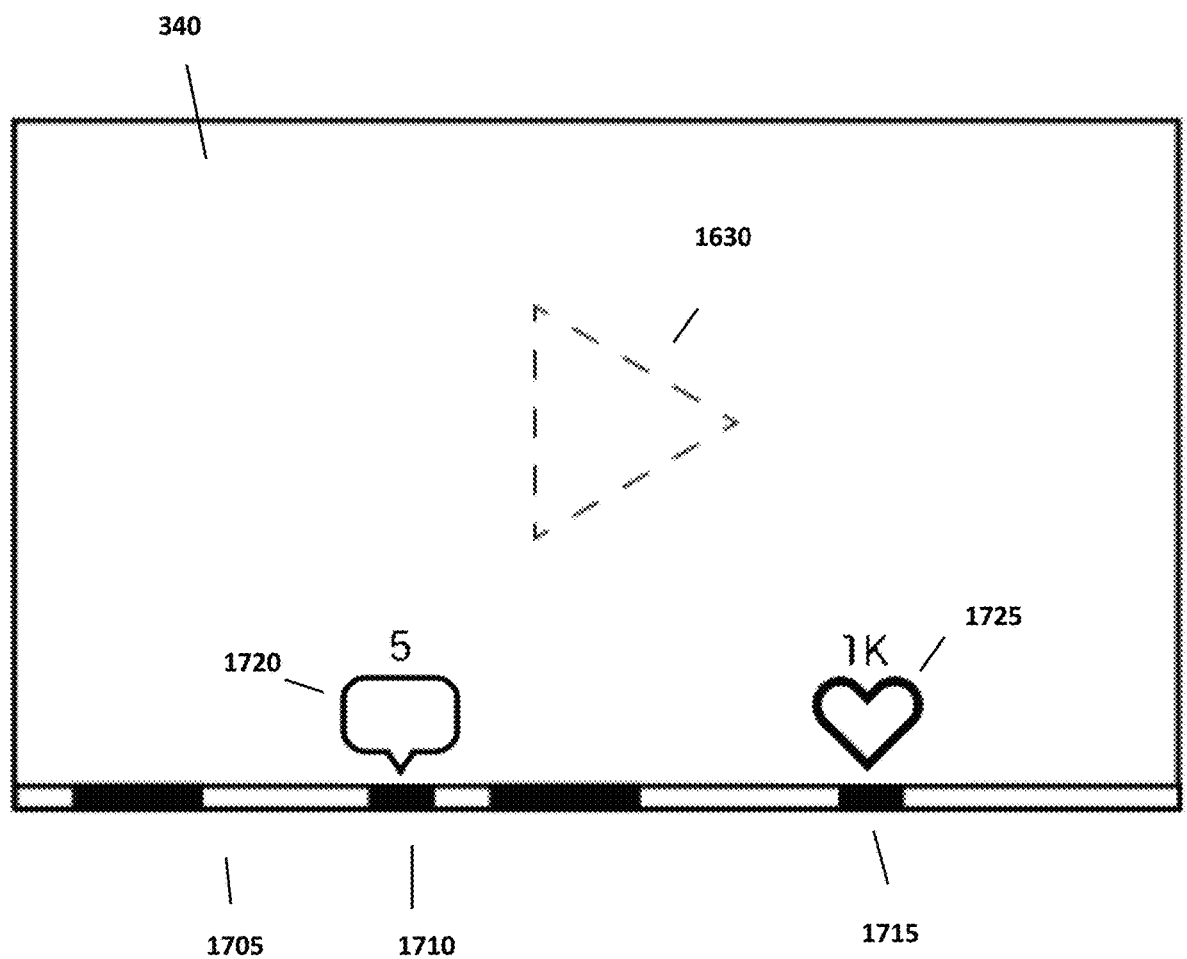
FIG. 17 depicts an illustrative view of an exemplary touch-enabled device user interface presenting a contextual video timeline of liked segments.

FIG. 17 depicts an illustrative view of an exemplary touch-enabled device user interface presenting a contextual video timeline of liked segments. In FIG. 17, the embodiment touch-enabled device user interface 340, also depicted in FIG. 3, displays timeline 1705 presenting video highlights 1710 and 1715. In the illustrated embodiment, user provided comment 1720 is linked to the video highlight 1710. In the depicted example, the video control 1630 may remain hidden while the video highlight timeline 1705 is displayed. In the illustrated example, a user awarded points 1725 to highlight 1715. In the illustrated embodiment, the exemplary touch-enabled device user interface 340 includes at least three contextual timeline video highlight viewing modes: Discrete, Continuous, and Repeat. In some embodiments of the Discrete viewing mode, the video player plays only the highlights segment by segment along the timeline. In various designs of the Continuous viewing mode, the highlight presentation may resemble a typical video play, where the stream does not stop or skip unless the user intervenes. In some exemplary implementations of the Repeat mode, the video player may repeat playing the given snippet until the user intervenes. For example. if the video was not playing one of the highlights when the repeat mode was selected, it will start repeating after it finished playing the first highlight it encounters in the timeline. In various designs, an exemplary touch-enabled device user interface 340 may be configured to display the most commented or liked segments in the timeline 1705. In the depicted example, the timeline 1705 is a separate timeline right below the video timeline to denote the location of the highlight video clips. In an illustrative example, for clips with significant numbers of comments and reactions (e.g. >10), a corresponding animation may pop up above the timeline at the beginning of the play. Clicking these animations will allow the user to jump to the video highlight.

Figure 18:
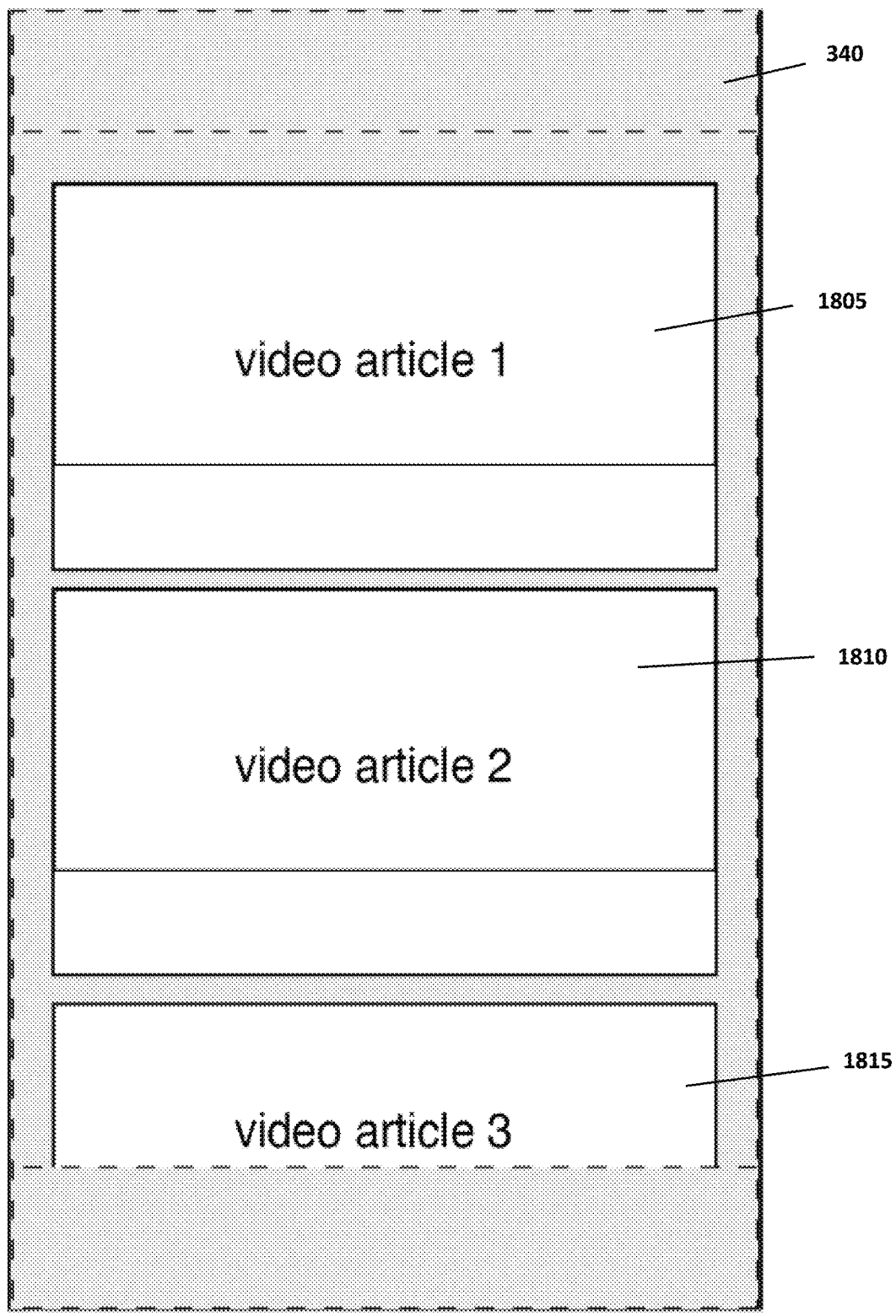
FIG. 18 depicts an illustrative view of an exemplary touch-enabled device user interface presenting various video previews in a scrolling feed page configuration.

FIG. 18 depicts an illustrative view of an exemplary touch-enabled device user interface presenting various video previews in a scrolling feed page configuration. In FIG. 18, the depicted touch-enabled device user interface 340, also depicted in FIG. 3, presents user-selectable video preview images 1805, 1810, and 1815 in a vertical scrolling video feed page design.

Figure 19:
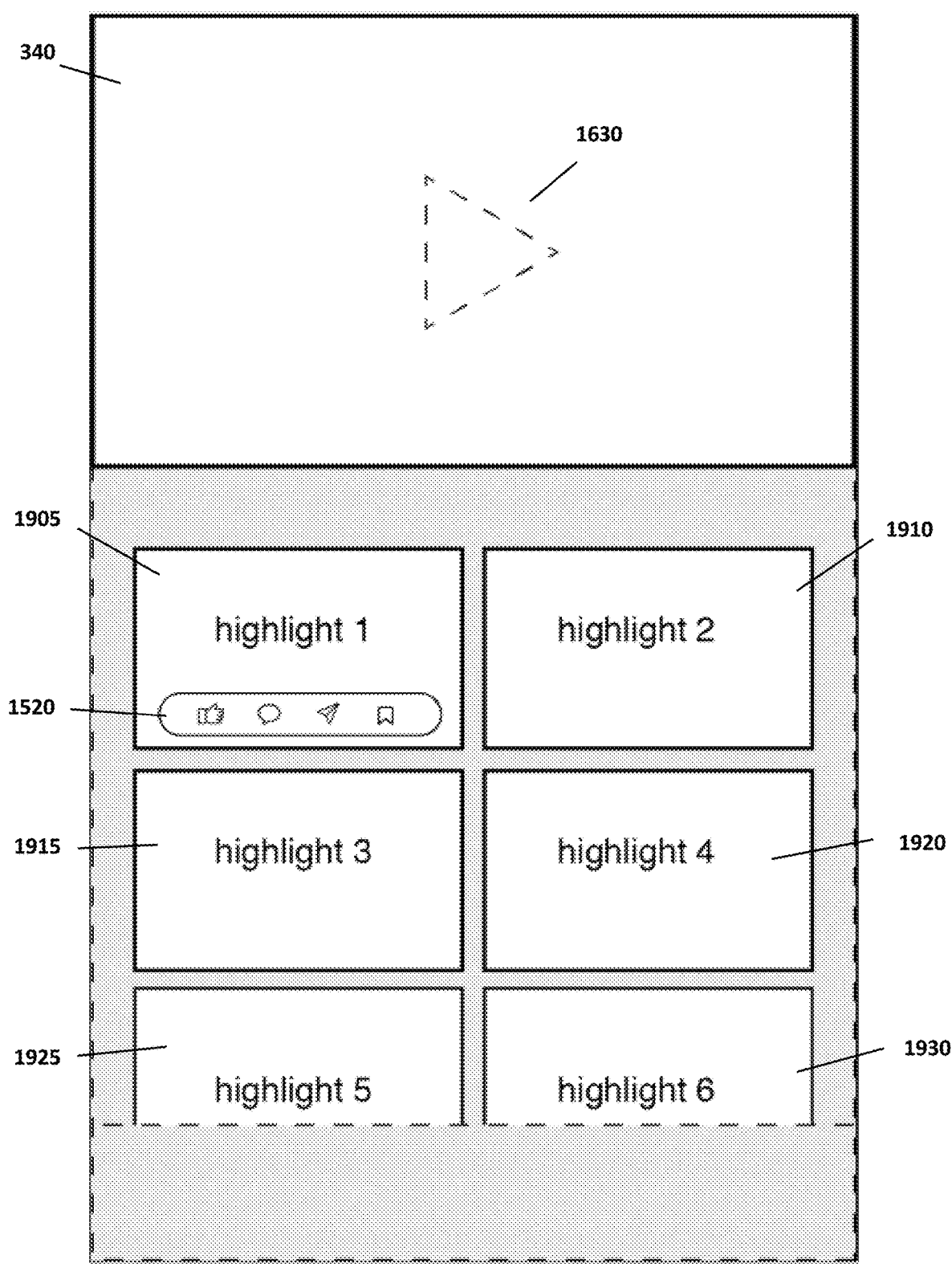
FIG. 19 depicts an illustrative view of an exemplary touch-enabled device user interface presenting various video highlights selectable for play.

FIG. 19 depicts an illustrative view of an exemplary touch-enabled device user interface presenting various video highlights selectable for play. In FIG. 19, the depicted touch-enabled device user interface 340, also depicted in FIG. 3, presents for user-selectable play the video highlights 1905, 1910, 1915, 1920, 1925, and 1930 in a grid display. In the depicted embodiment, the video highlight 1905 includes user-selectable buttons configured in the reaction marking drawer 1520 to enable the user to perform actions including, for example, indicating a 'like,' commenting, or sharing the highlight 1905. In the depicted example, the video control 1630 may remain hidden while the video highlights are previewed.

Figure 20:
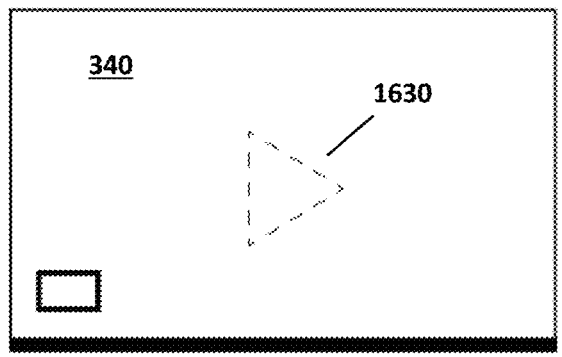
FIG. 20 depicts an illustrative view of exemplary touch-enabled device user interface viewing mode switch options.
Figure 20:
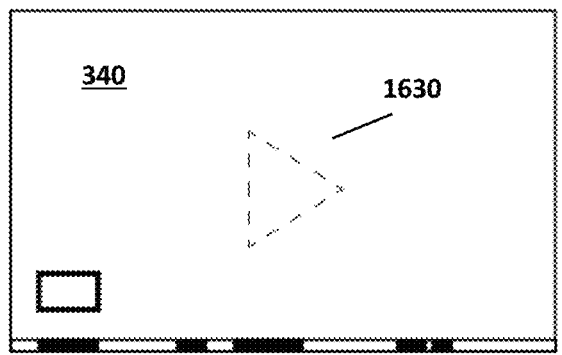
Figure 20:
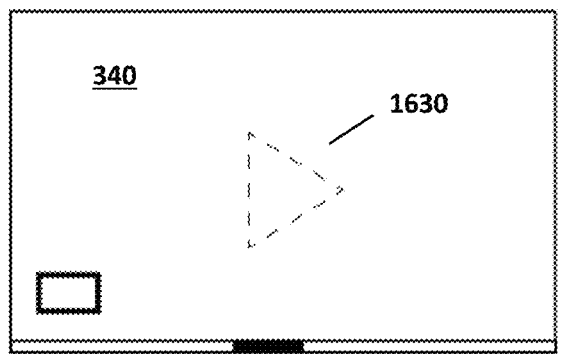

FIG. 20 depicts an illustrative view of exemplary touch-enabled device user interface viewing mode switch options. In FIG. 20, the embodiment touch-enabled device user interface 340, also depicted in FIG. 3, displays timeline 1705 configured to present video highlights in three contextual timeline modes: Continuous 2005, Discrete 2010, and Repeat 2015. In the depicted example, the video control 1630 may remain hidden while the video highlights are selected on the timeline 1705.

Figure 21:
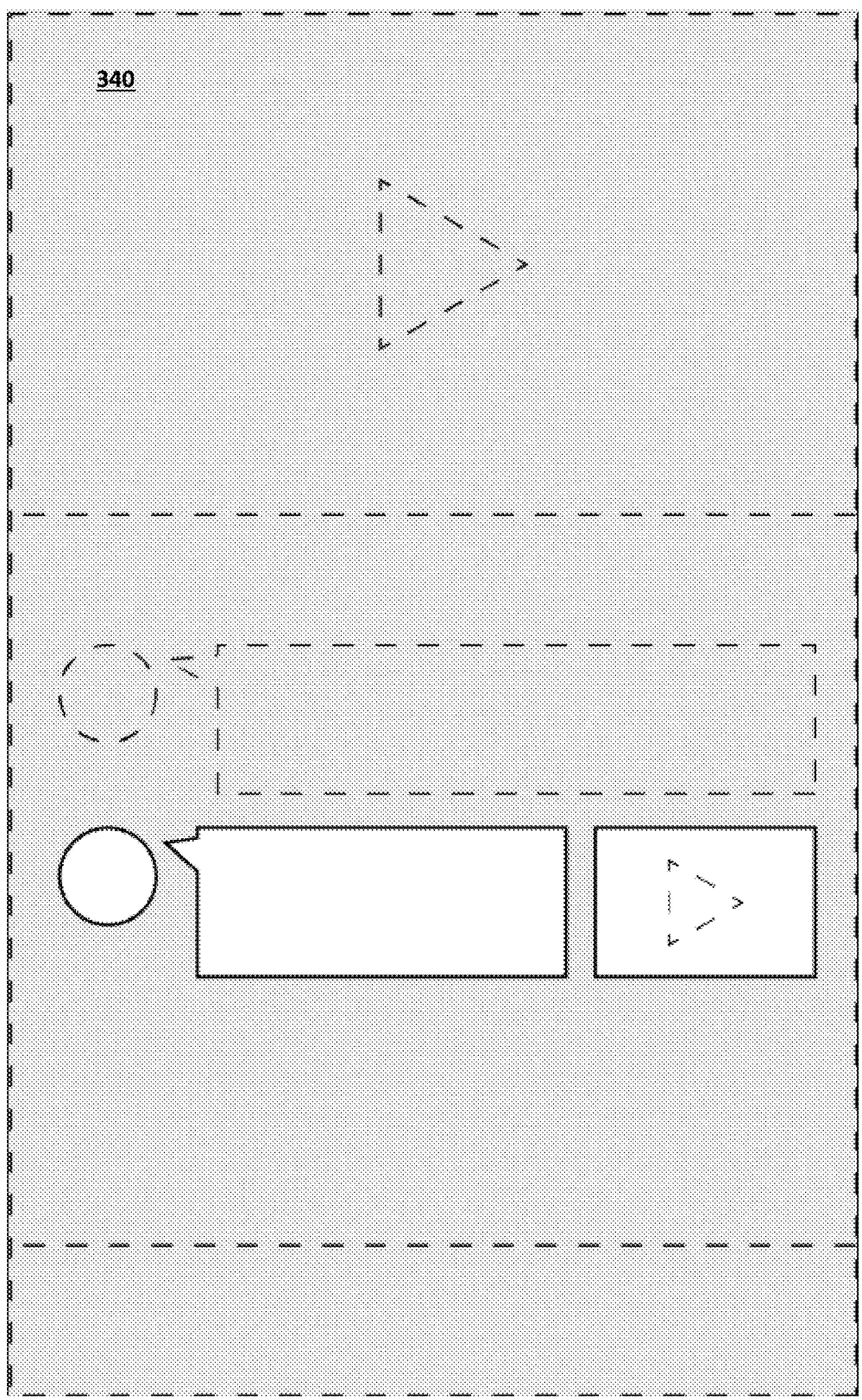
FIG. 21 depicts an illustrative view of an exemplary touch-enabled device user interface video segment comment display design.

FIG. 21 depicts an illustrative view of an exemplary touch-enabled device user interface video segment comment display design. The depicted embodiment touch-enabled device user interface 340, also depicted in FIG. 3, illustrates a touch-enabled device user interface video segment comment display design facilitating user Text, Image, and Doodling placement on video clips. In some embodiments, a video clip may have a canvas information associated with it, such that the display of any text, image or doodling may be rendered in real time as opposed to being hard coded into the video stream files. In some embodiments, a user may also keep a history of the canvas information to track their progress or undo any work they desire to discard while they edit contents. In various embodiments, canvas real time rendering, and display may require the client to support handling and processing data sent from the server. Should the user need to share it in a conventional way, the video clip can be rendered before being downloaded as a portable file.

Figure 22A:
Figure 22A:
Figure 22B:
Figure 22B:
Figure 22B:
Figure 22B:
Figure 22C:
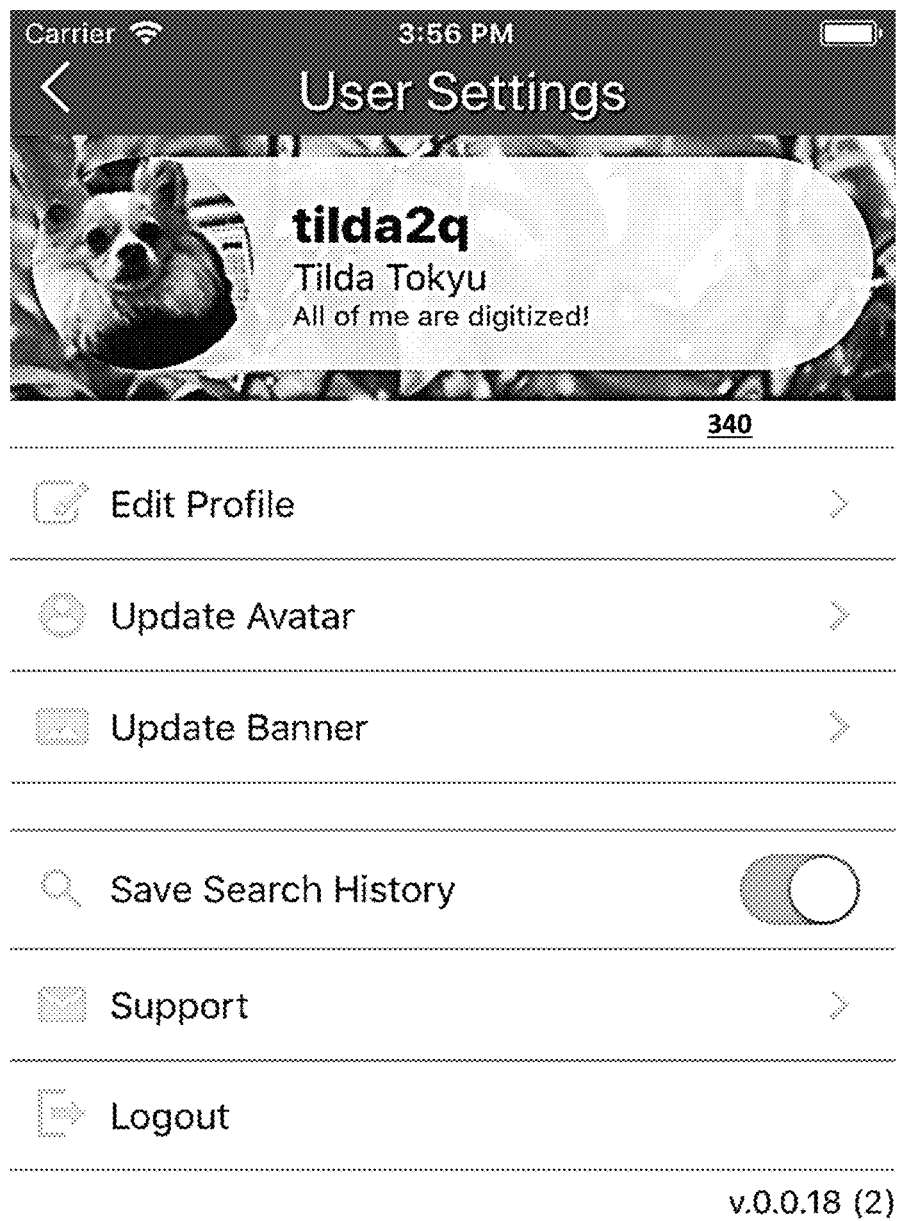
Figure 22D:
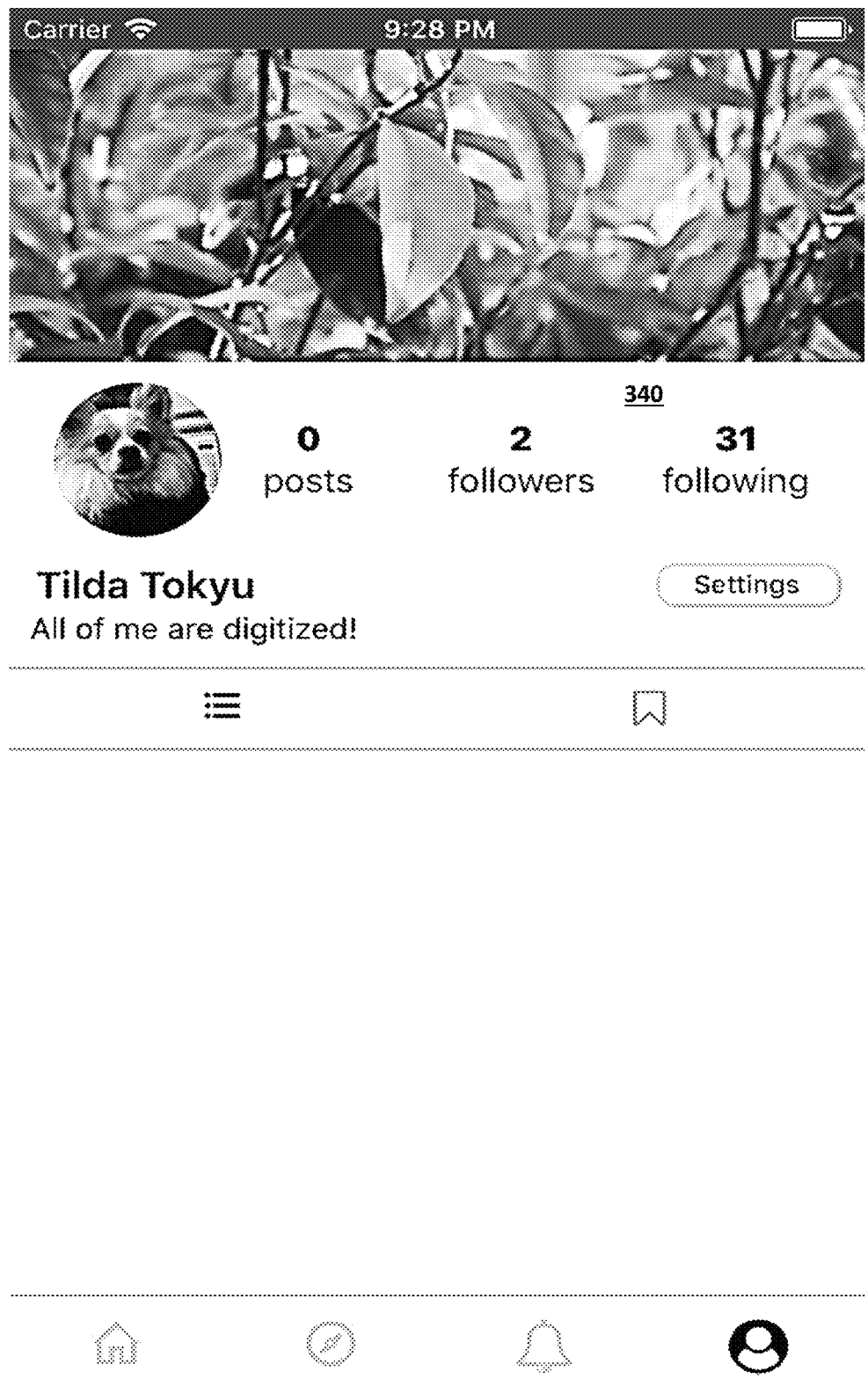
Figure 22E:
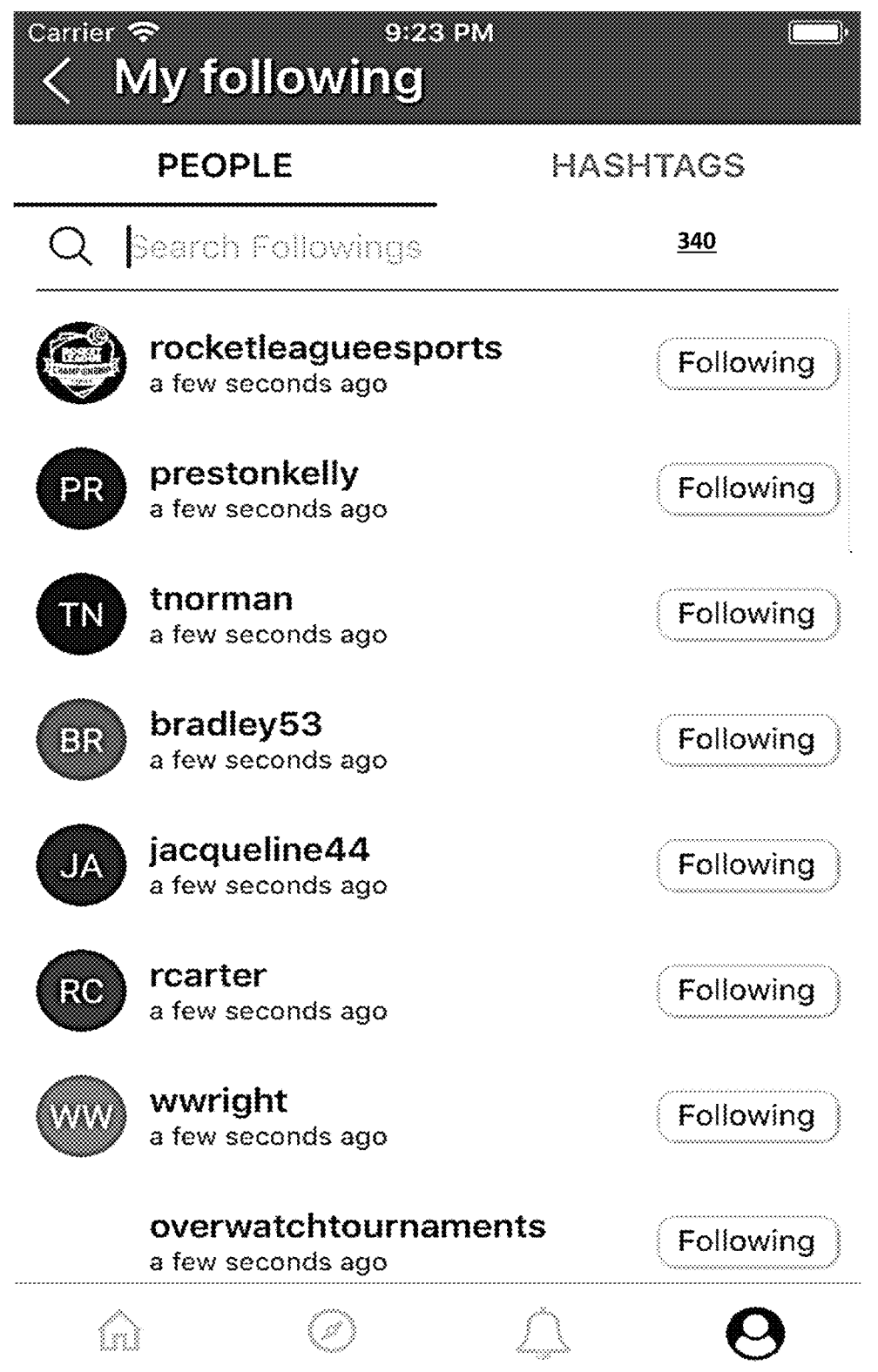
Figure 22F:
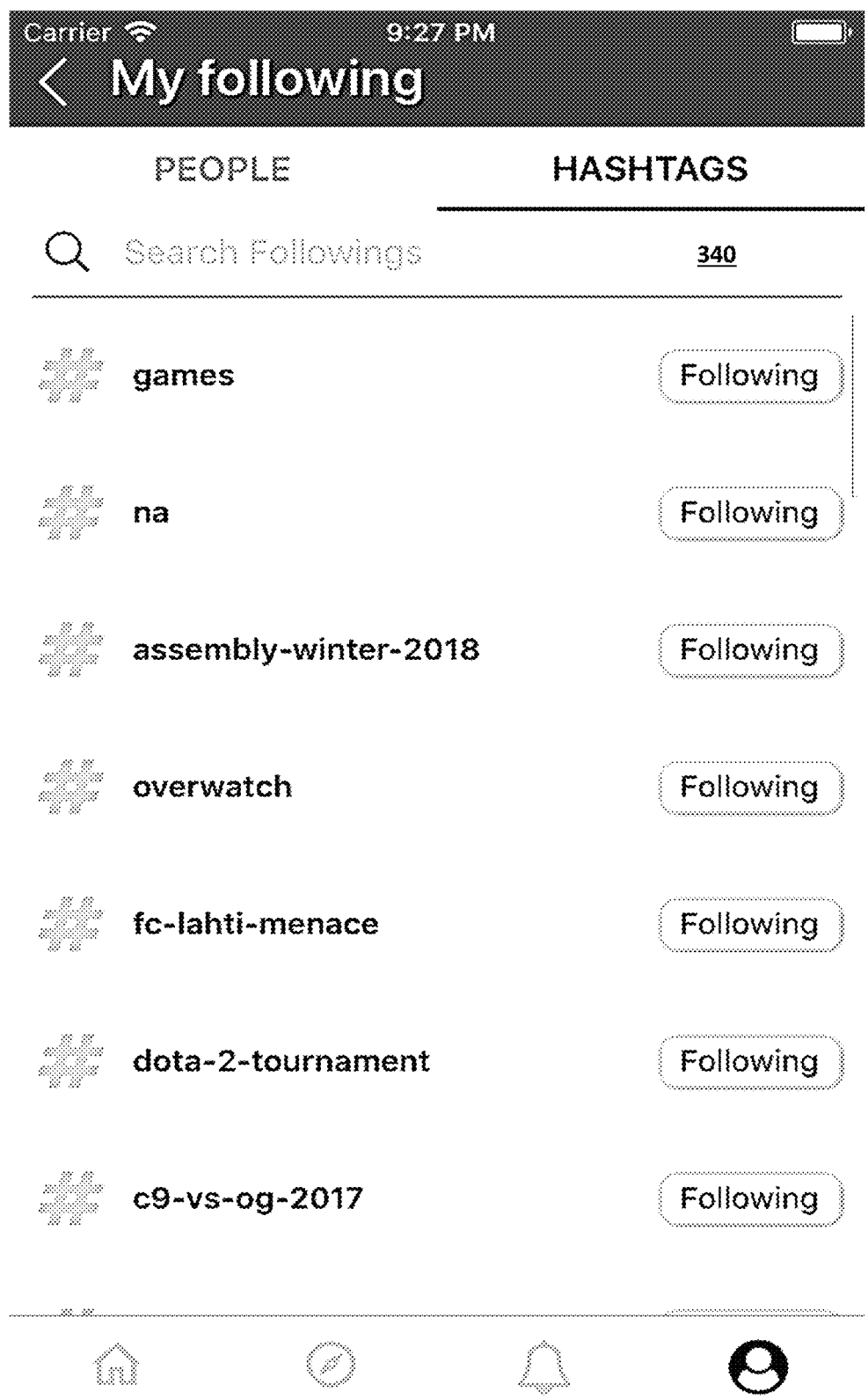
Figure 22G:
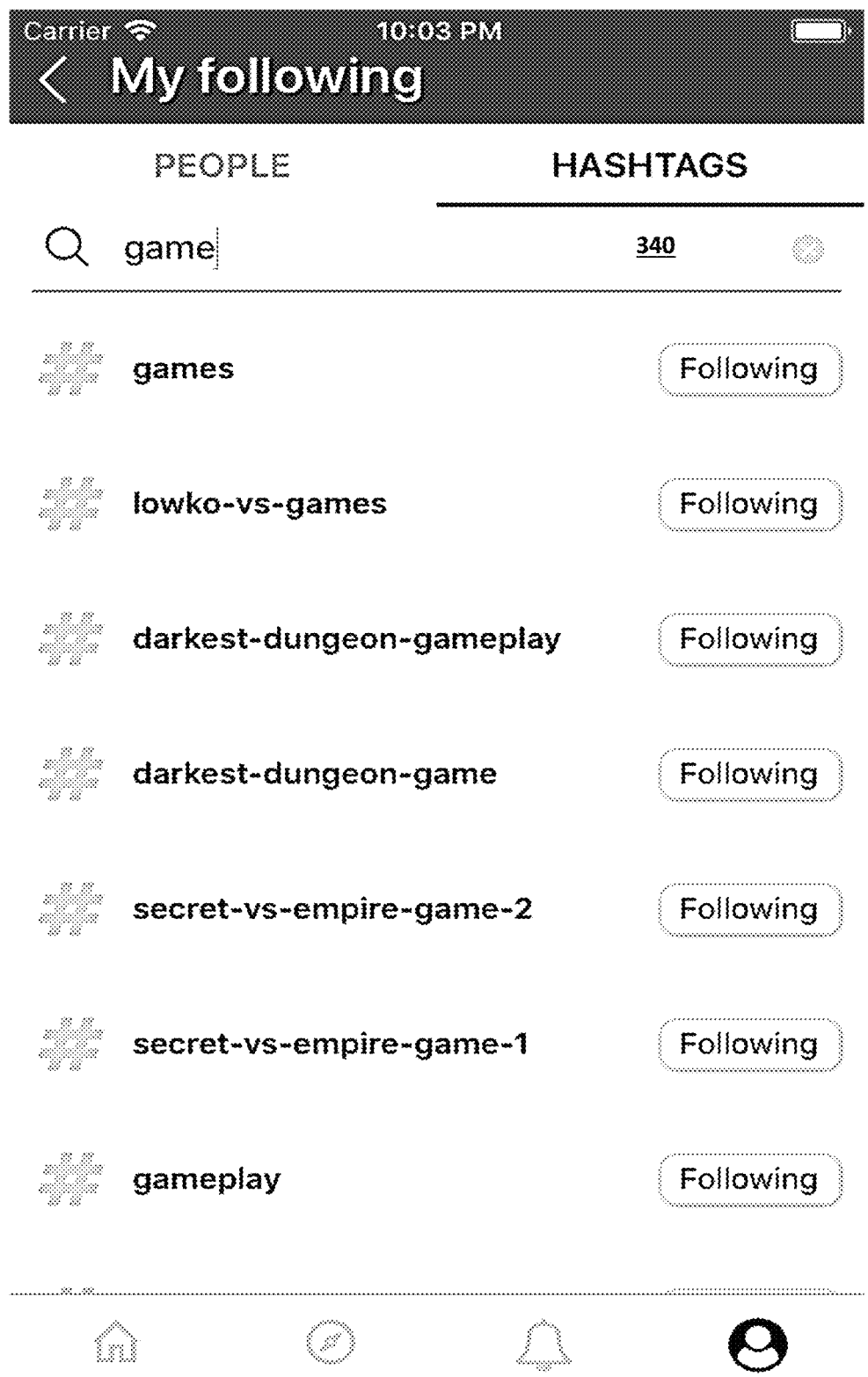

FIGS. 22A-22G depict illustrative views of an exemplary touch-enabled device interface user registering and using a video summarization and collaboration account. In the illustrated embodiment, the depicted touch-enabled device user interface 340, also depicted in FIG. 3, is depicted in FIG. 22A processing a user's video summarization and collaboration account creation with the user entering an account name, email address, and password. In FIG. 22B, the user is presented with a Log In screen. In FIG. 22C, when the user has logged in to the account created in FIG. 22A, the user may access account settings, profile, avatar, and banner preferences, in addition to the option to Logout. In FIG. 22D, the exemplary user's social profile is displayed. In the illustrated embodiment, the user is the account owner. In the depicted embodiment, the account owner's social profile status includes posts, followers of the account owner, and users the account owner is following. In FIG. 22E, in an illustrative example, the user's social following is depicted, illustrated as a searchable user list. In FIG. 22F, hashtags of interest to the user are illustrated in accordance with various designs. In the embodiment illustrated in FIG. 22G, the depicted touch-enabled device user interface 340 is illustrated performing a user-initiated hashtag search.

Figure 23A:
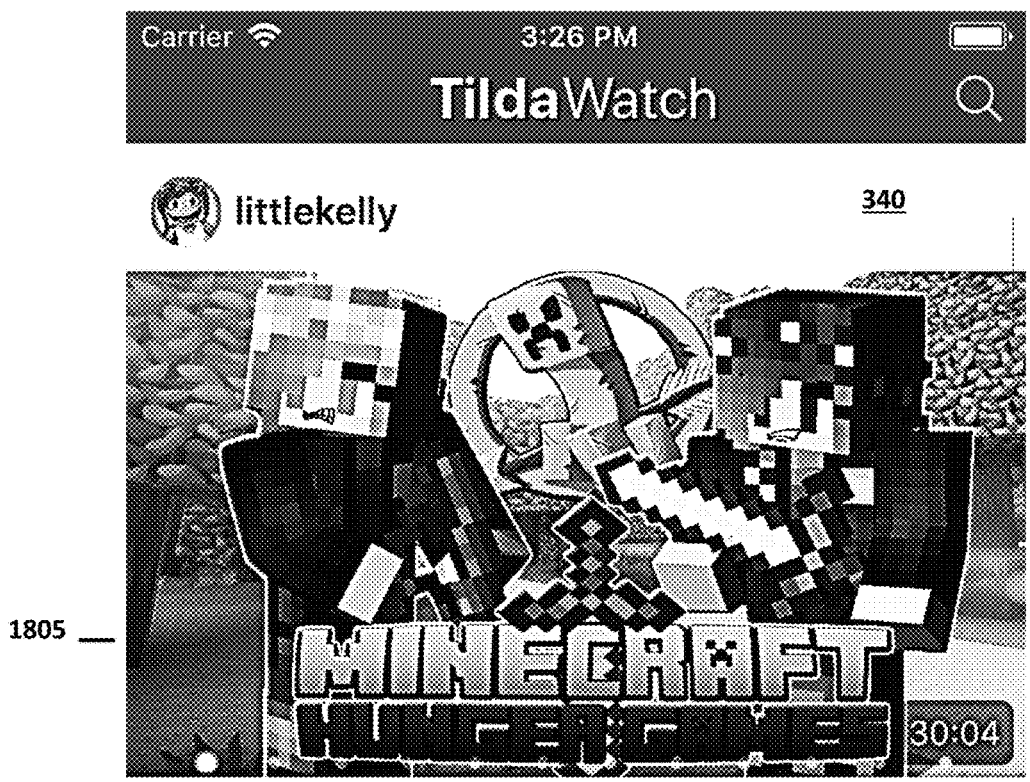
FIGS. 23A-23G depict an illustrative view of an exemplary touch-enabled video summarization and collaboration device interface user browsing videos.
Figure 23A:
Figure 23B:
Figure 23C:
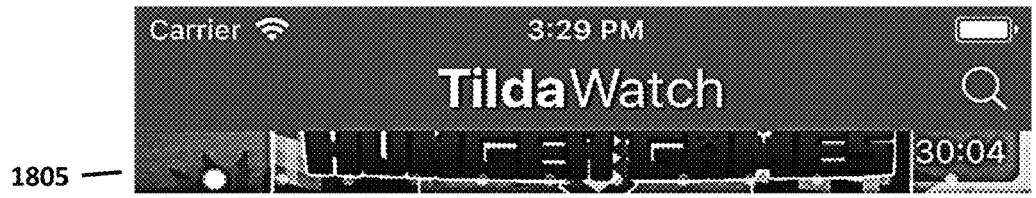
Figure 23C:
Figure 23C:
Figure 23C:
Figure 23C:
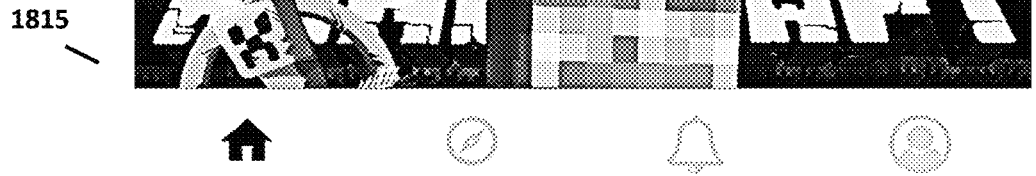
Figure 23C:
Figure 23C:
Figure 23C:
Figure 23C:
Figure 23D:
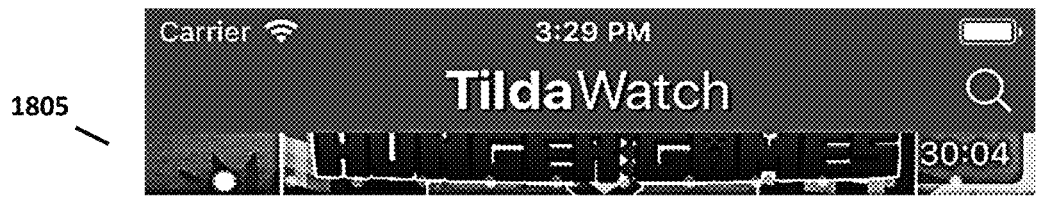
Figure 23D:
Figure 23D:
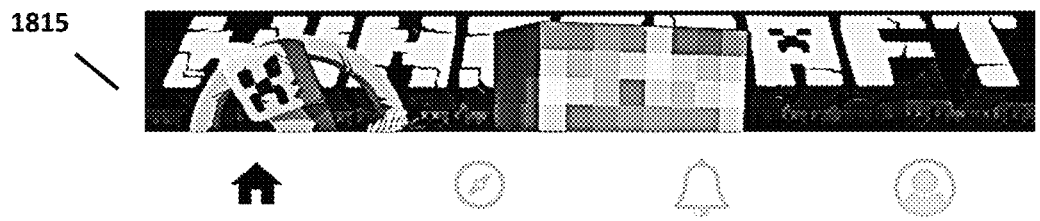
Figure 23E:
Figure 23E:
Figure 23E:
Figure 23E:
Figure 23E:
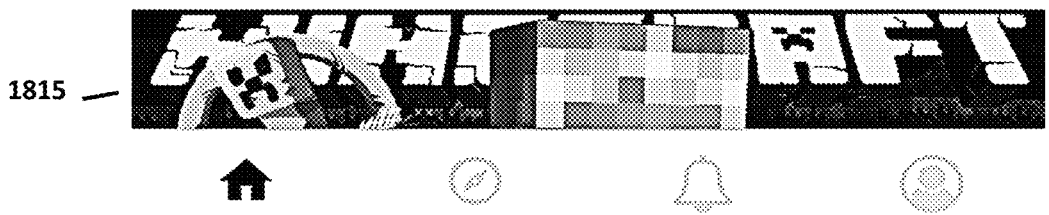
Figure 23F:
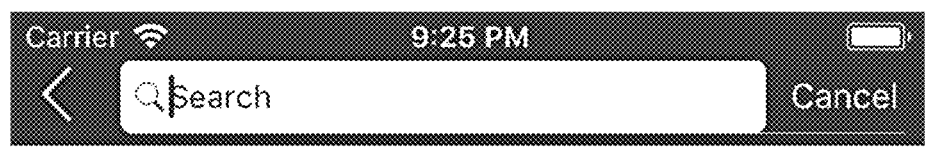
Figure 23G:
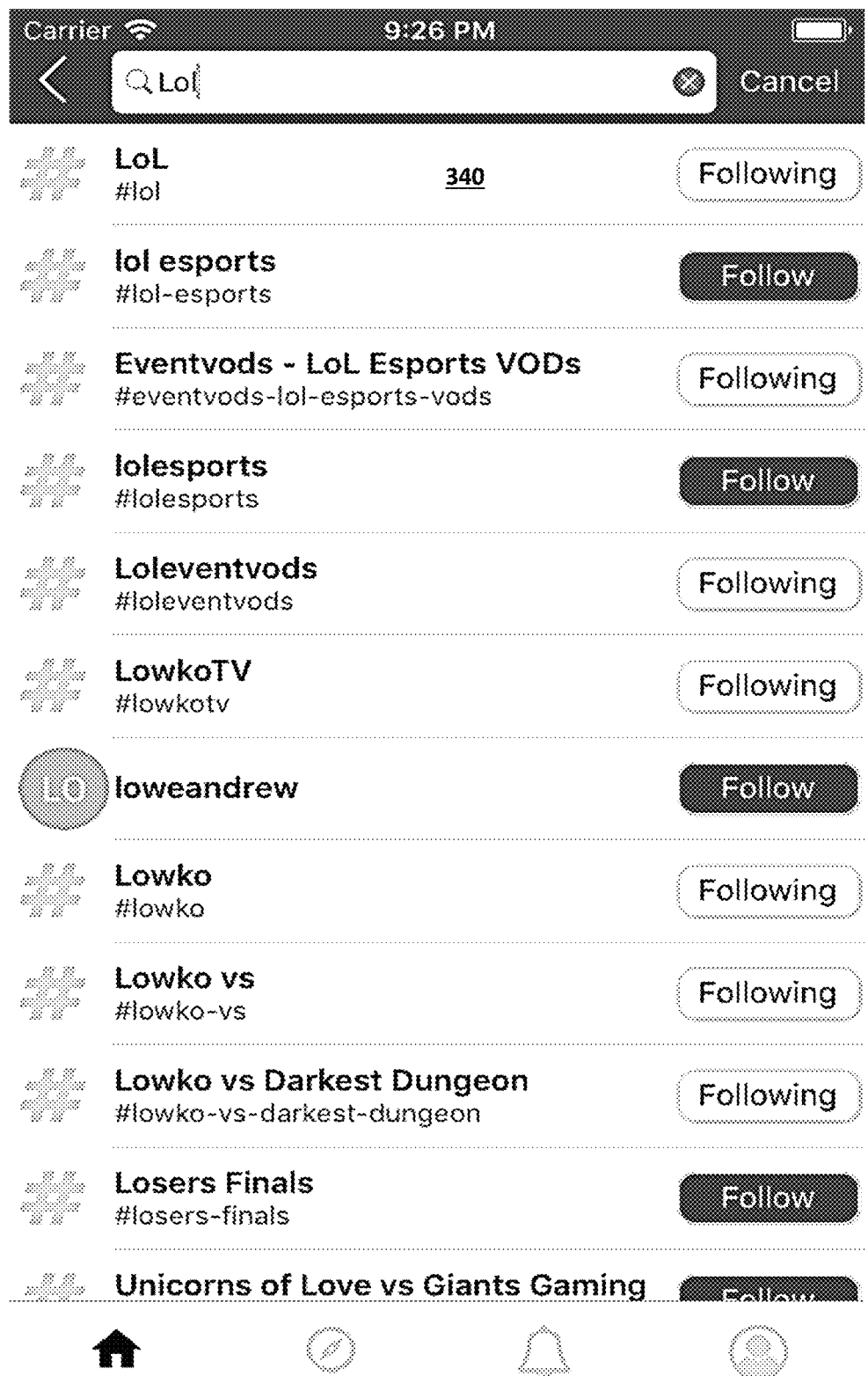

FIGS. 23A-23G depict an illustrative view of an exemplary touch-enabled video summarization and collaboration device interface user browsing videos. In the depicted embodiment, the illustrated touch-enabled device user interface 340, also depicted in FIG. 3, is depicted in FIG. 23A presenting user-selectable video preview images 1805 and 1810 in a vertical scrolling interface design. In FIG. 23B, the user has scrolled up the video preview images 1805 and 1810, such that video preview image 1815 has entered the view. In FIG. 23C, the user has selected video preview image 1810. In the depicted embodiment, the user has begun to scroll video preview image 1810 to the left causing a first video highlight 1505 of the video previewed by video preview image 1810 to emerge from the right side of the illustrated touch-enabled device user interface 340. In FIG. 23D, the user has activated the video viewer configured in the illustrated touch-enabled device user interface 340 to play the video highlight 1505. In FIG. 23E, the user has selected for play the next video highlight 1505 in the video viewer configured in the illustrated touch-enabled device user interface 340. In the embodiments depicted by FIG. 23F and FIG. 23G, the illustrated touch-enabled device user interface 340 may present a user with a searchable home feed. In the embodiment depicted in FIG. 23F, the user's recent search history is displayed. In an illustrative example, recommendations to a user may be presented in a home feed associated to a user's account. In the embodiment depicted in FIG. 23G, the user's social following status is illustrated. In the illustrated example, the user may change the following status via user-selectable buttons presented by the illustrated touch-enabled device user interface 340. In various exemplary scenarios, the recommendations presented in the user's home feed may be closely associated to the user's preference and followings.

Figure 25A:
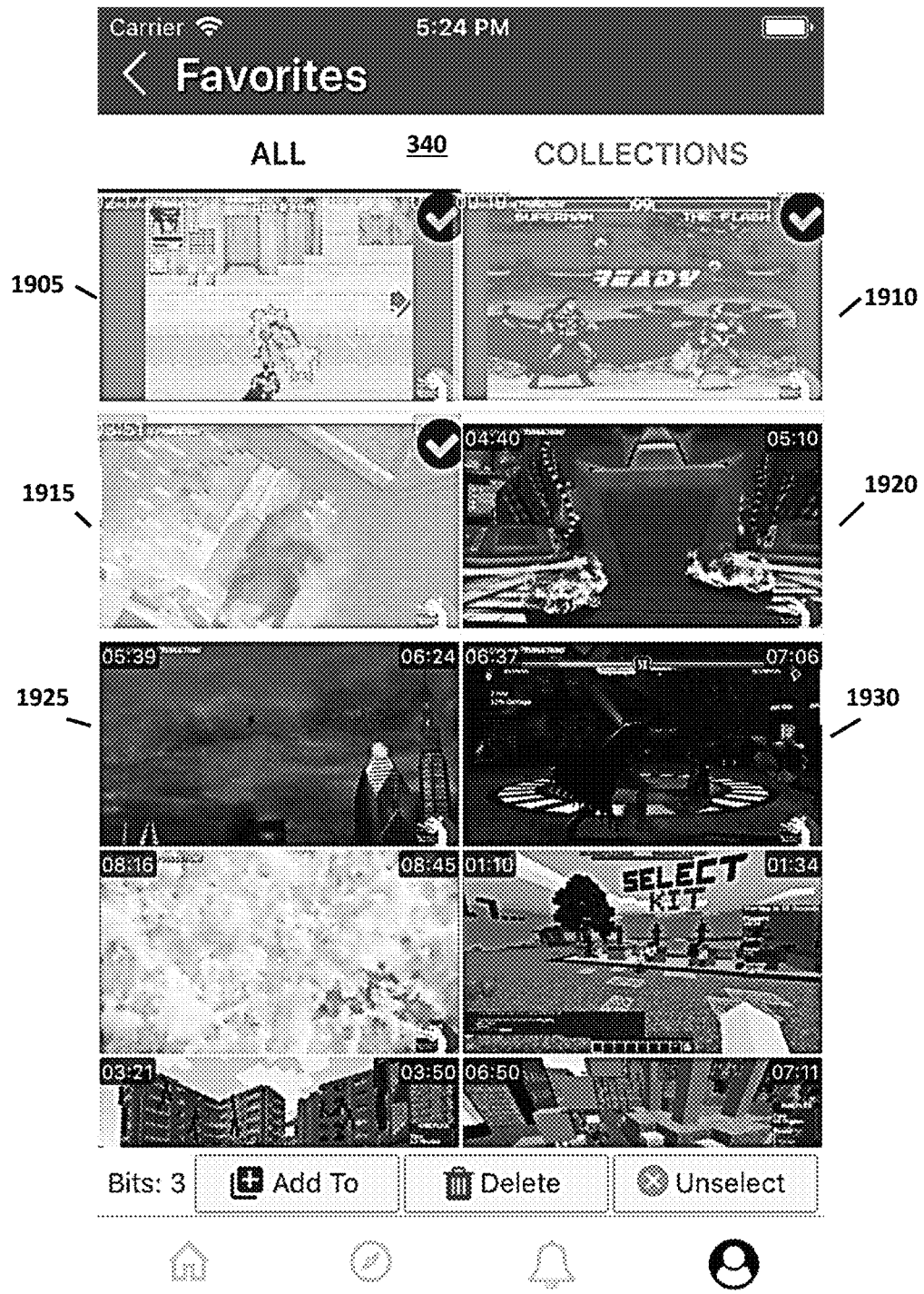
FIGS. 25A-25D depict an illustrative view of an exemplary touch-enabled video summarization and collaboration device interface user managing highlight collections.
Figure 25B:
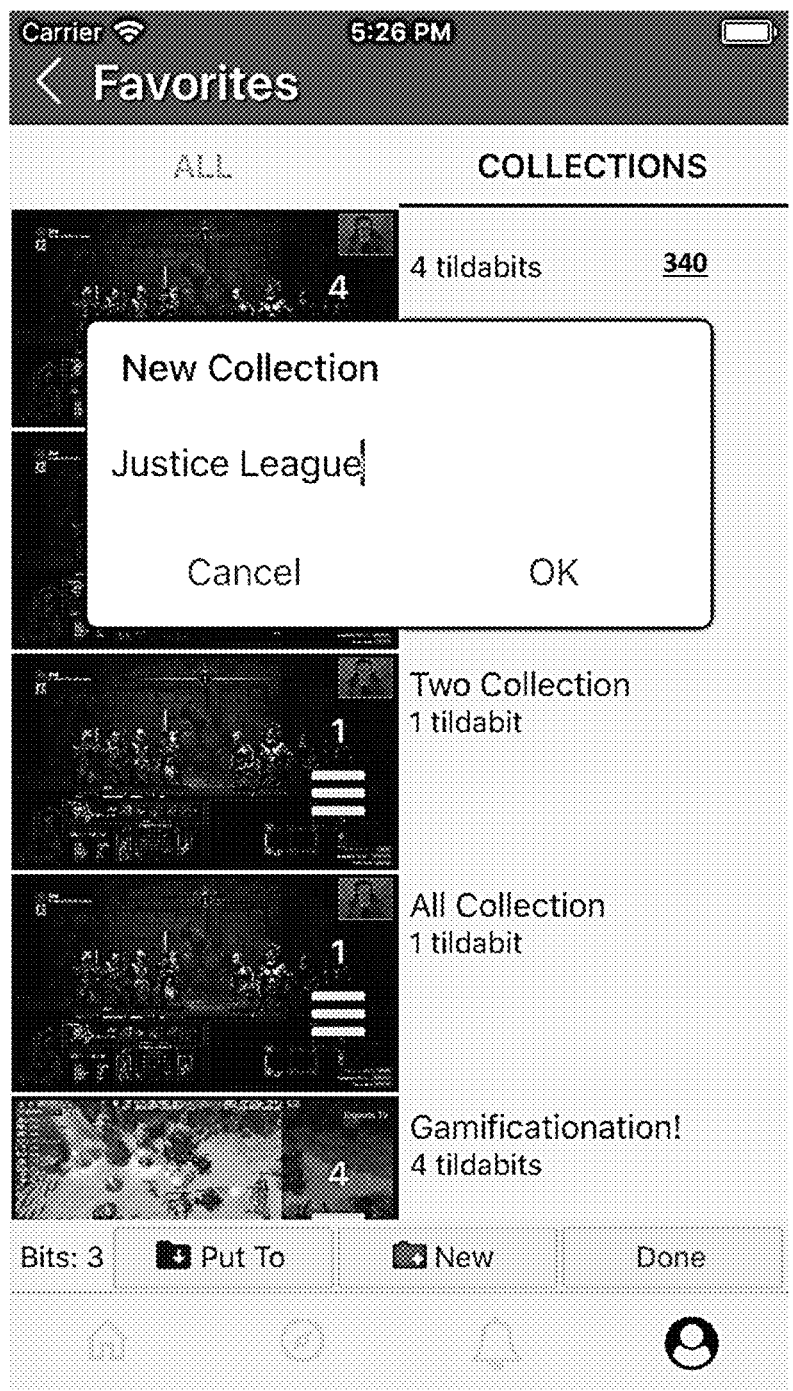
Figure 25C:
Figure 25D:
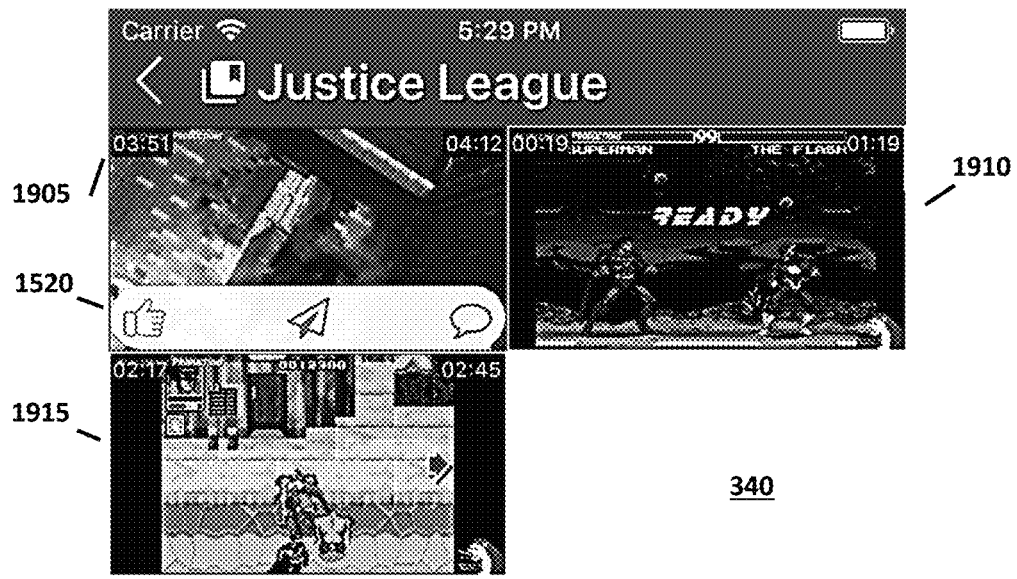
Figure 25D:
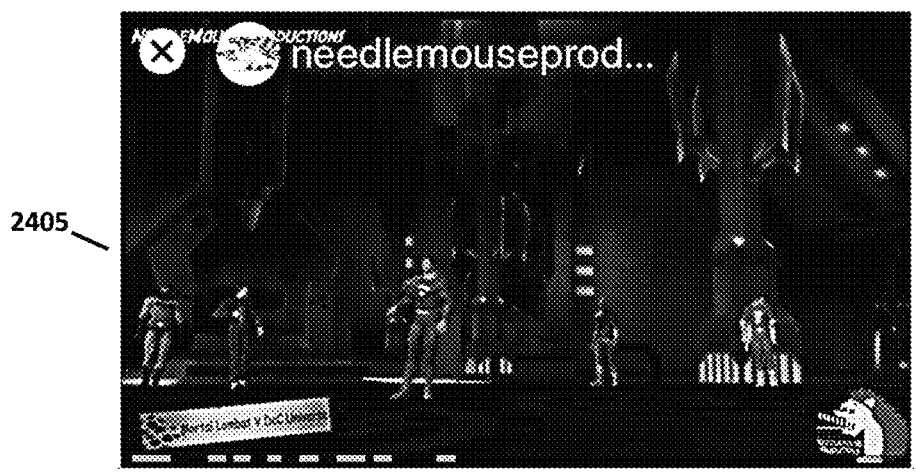

FIGS. 25A-25D depict an illustrative view of an exemplary touch-enabled video summarization and collaboration device interface user managing highlight collections. In FIG. 25A, the illustrated embodiment touch-enabled device user interface 340, also depicted in FIG. 3, presents the user with video highlights 1905, 1910, 1915, 1920, 1925, or 1930. In the depicted embodiment, the user has selected the video highlights 1905, 1910, 1915. In the illustrated example, the user may add selected video highlights to a Collection configured in the user's video summarization and collaboration account. In FIG. 25B, the depicted user interface 340 presents the user with a New Collection screen to facilitate user creation of a Collection in the user's video summarization and collaboration account. In FIG. 25C, the depicted user interface 340 enables the user to review the user's Collections in a scrolling display. In the illustrated embodiment, the Collection displayed as created in FIG. 25B is displayed. In FIG. 25D, the user has selected the Collection created in FIG. 25B, and the depicted user interface 340 facilitates the user's review of the selected the video highlights 1905, 1910, 1915 the user added to the Collection configured in the user's video summarization and collaboration account. In the depicted embodiment, the user has selected video highlight 1905 to play in the video player 2405. In the illustrated embodiment, the video highlight 1905 is depicted overlaid with the user-selectable buttons configured in the reaction marking drawer 1520 to enable the user to perform actions including, for example, indicating a 'like,' commenting, or sharing the highlight 1905.

Figure 26:
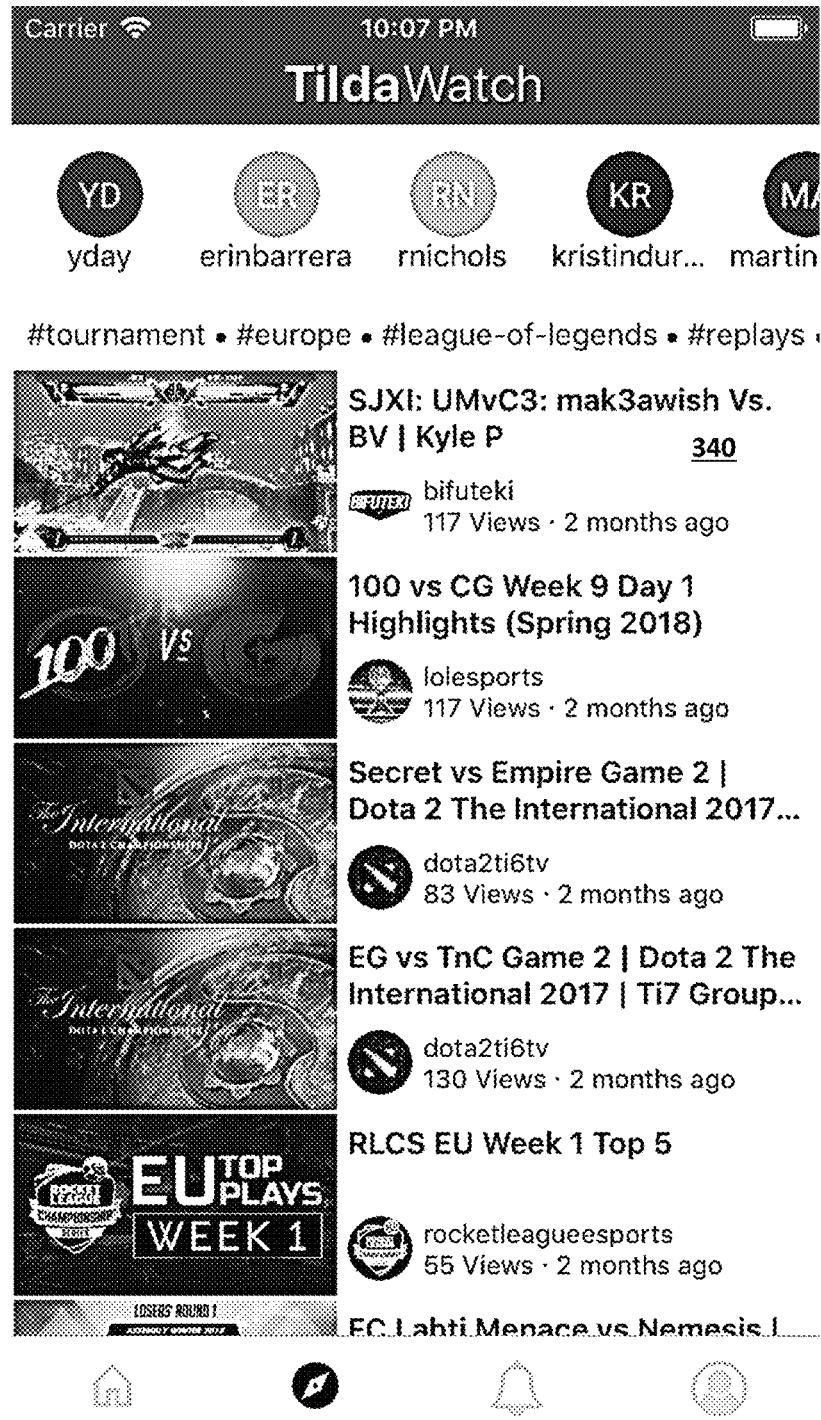
FIG. 26 depicts an illustrative view of an exemplary touch-enabled video summarization and collaboration device interface user managing social network following associations.

FIG. 26 depicts an illustrative view of an exemplary discovery page configured in the depicted touch-enabled video summarization and collaboration device interface 340. In the illustrated embodiment, the exemplary discovery page recommends popular users, tags, and content.

Figure 27A:
FIGS. 27A-27B depict exemplary designs illustrating social media integration with various video summarization and collaboration embodiments.
Figure 27B:
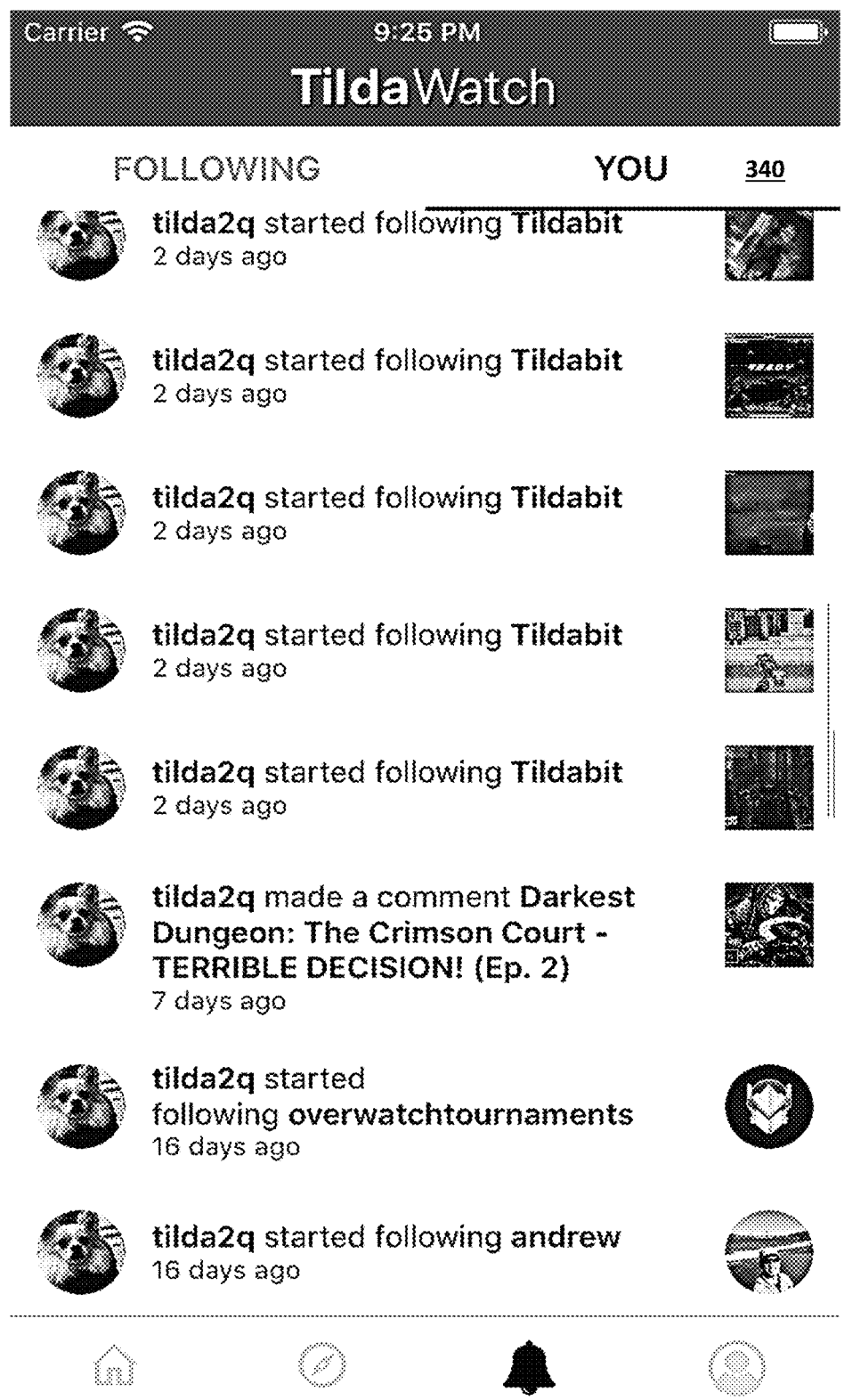

FIGS. 27A-27B depict exemplary designs illustrating social media integration with various video summarization and collaboration embodiments.

Figure 28:
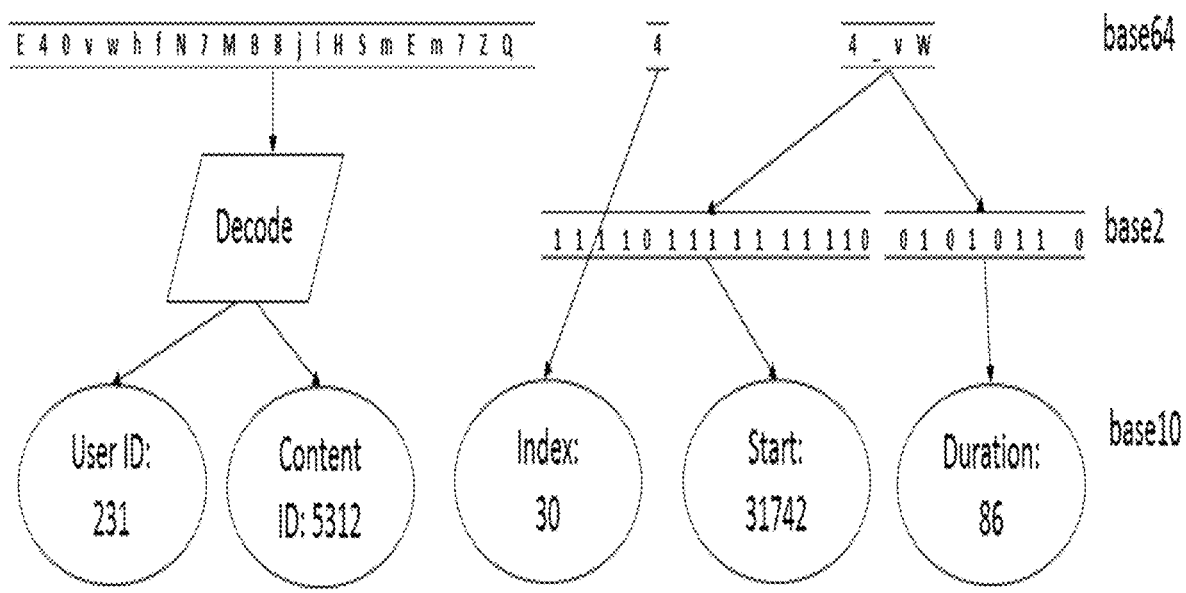
FIG. 28 depicts exemplary encryption techniques in accordance with various embodiment video segmentation designs.

FIG. 28 depicts exemplary encryption techniques in accordance with various embodiment video segmentation designs.

Although various embodiments have been described with reference to the Figures, other embodiments are possible. For example, various embodiments may create and use a method of video summarization by segmenting video clips and allowing users to collect them for creating their own montages instantaneously. Some embodiments may skip a video rendering process by using servers providing video streaming service to serve different videos on the fly by the metadata supplied. In various implementations, media may be delivered with an optimized user interface for touch-enabled devices for a more interactive video experience.

Video Segment image generation: in some embodiments, an exemplary VSACE 325 may include Video Segment image generation configured to extract video highlight preview images. In various implementations, for example, in FIG. 4, Video Segment image generation may be referred to as a Video Segmentation and Snapshot Extraction Engine. In an illustrative example, exemplary Video Segment image generation may be implemented in some embodiments by a process similar to the following:

1) In various embodiments, a thumbnail image algorithm may receive timestamps and the video file path as its input at minimum. In some embodiments, other information, such as, for example, output directory, may be provided to the thumbnail image algorithm.
2) The algorithm obtains access to the video stream. In some embodiments, the algorithm may load the video into the memory using the Open Source Computer Vision Library, but instead of iterating through the video, may skip to the starting time given in the timestamps.
3) For each timestamp, there is a suggestion where the iteration should end, otherwise, the default is the end time.
4) The algorithm iterates from the suggested time and calculates the Laplacian value at that frame to determine the sharpness of the frame. If the sharpness is above a threshold, it is registered as a snapshot and the image is temporarily saved in a specified directory.
5) If the image is not sharp enough, the algorithm may iterate up to 1 second to find the best possible candidate image. If a good candidate image has been found, the loop skips 100 ms to find the next candidate instead of the next frame to cut down the processing time.
6) The image is uploaded to the server along with the timestamp for the clip and other meta information. The server takes care of creating various image sizes that are optimized for user's viewing experience, including thumbnails.

Video highlight generator API service: in some embodiments, an exemplary VSACE 325 may include a Video highlight generator API service configured to interactively generate and publish segmented highlights extracted from video supplied by users. In various embodiments, a user may have the option to choose which algorithm to use as outlined in the respective client they use, whether it may be web service, mobile device, or smart TV, however this may not be required. In various implementations, a user may only need to supply the source of the video URL. In an illustrative example, an exemplary Video highlight generator API service may be implemented in some embodiments by a process similar to the following, wherein, having a video source URL, the Video highlight generator API service may:

1) check whether the service can support processing videos from that source
2) check if there are other metadata that can be used to determine the nature of the video and categorize the genre
3) based on the genre, tags, video length, title, author, and the description of the video, the algorithm will be selected
4) once the user request gets queued into the processing system, the client may return a response to the user with an estimated processing time
5) once the processing has completed, the user may be notified with a push notification
6) when the user opens up the client, the video viewer with segmented highlights may be displayed for final tweaking and approval before being published to the service for either private or public viewing. In various embodiments, the user may:
    a) choose a different snapshot for preview
    b) choose different time for starting and ending
    c) add or move a video chip
    d) change the order of the video clip
    e) change other metadata: owner, copyright, description, title, cover image, tags, genre
    f) crop video so that only a certain portion of the video is zoomed in
    g) Add a canvas overlay which may include text, image, or doodling, as a result of various embodiment implementations of Text, Image, Doodling placement on video clips, also disclosed herein.

Unique ID generation for video segmentation per user: in some embodiments, an exemplary VSACE 325 may include Unique ID generation for video segmentation per user configured to generate unique IDs for articles and collections for each user. In various examples, such per-user Unique ID generation may be used, for example, to track sharing on social media, to reward the user who shares effectively and brings more traffic to the service. In an illustrative example, Unique ID generation for video segmentation per user may be implemented in some embodiments with code such as the following exemplary implementation:

```
SECRET_KEY = ***
ALPHABET = "ABCDEFGHIJKLMNOPQRSTUVWXYZ0123456789abcdefghijklmnopqrstuvwxyz-_"
ALPHABET_REVERSE = dict((c, i) for (i, c) in enumerate(ALPHABET))
BASE = len(ALPHABET)
SIGN_CHARACTER = '$'
def base_encode(n):
    if n < 0:
        return SIGN_CHARACTER + base_encode(-n)
    s = [ ]
```

```
        while True:
            n, r = divmod(n, BASE)
            s.append(ALPHABET[r])
            if n == 0: break
        return ''.join(reversed(s))
def base_decode(s):
    if s[0] == SIGN_CHARACTER:
        return -base_decode(s[1:])
    n = 0
    for c in s:
        n = n * BASE + ALPHABET_REVERSE[c]
    return n
xB = 2
pE= 32
uE= 32
xiE = 1
yE = 4
yB = 2
iE= 6
sE= 16
dE= 8
pM = xB**pE
iM = xB**iE
uM = xB**uE
sM = yB**sE
dM = yB**dE
def id_encode(p, u, i=-1, s=-1, d=-1):
    u = u or 0
    xi = ""
    y = ""
    if p > pM:
        return p * -1
    elif u > uM:
        return u * -1
    elif p < 0 or u < 0:
        return -1
    elif i > iM:
        return i * -1
    elif s > sM:
        return s * -1
    elif d > dM:
        return d * -1
    if p > pM:
        return p * -1
    n = (p * xB**(uE))
    n = n + u
    x = encode(n, SECRET_KEY)
    if i > -1:
        xi = ALPHABET[i]
    if s > -1 and d > -1:
        n = (s * yB**dE) + d
        y = base_encode(n)
    return x+xi+y
def id_decode(aid):
    try:
        x = aid[:22]
        n = decode(x, SECRET_KEY)
        p = n / xB**(uE)
        u = n % xB**(uE)
        if len(aid) == 23:
            i = str(ALPHABET).index(aid[22])
        else:
            i = 0
        if len(aid) == 27:
            y = aid[23:]
            n = base_decode(y)
            s = n / yB**dE
            d = n % yB**dE
        else:
            s = -1
            d = -1
        return [p,u,i,s,d]
    except Exception as e:
        return [None,None,None,None,None]
```

In an illustrative example descriptive of the foregoing exemplary code, Unique ID generation for video segmentation per user may generate unique IDs for articles and collections for each user. Such IDs may be used for sharing on social media, and when a client makes a request on the server, the server may decrypt these IDs and may identify from which user the sharing originated. In some embodiments, the API server may encrypt a user ID and the object ID together so that it is not possible to guess exactly which user and content is associated with a given ID. FIG. 27 depicts exemplary encryption techniques in accordance with various Unique ID generation for video segmentation per user embodiments. In various embodiments, the server may track sharing activity so that these records can be used to reward the user who shares effectively and brings more traffic to the service. In some designs, when a user requests information on a Tildwatch service using this ID on the API server, the API server may re-generate an ID in the response it returns, such that should the user choose any sharable link in the response, it contains the current user's ID encoded. In some embodiments, the character set for the link may be an alphanumeric charaset set with the addition of hyphen (-) and underscore (_) to create base64 encoding:

"ABCDEFGHIJKLMNOPQRSTUVWXYZ012345678 9abcdefghijklmnopqrstuvwxyz-_"

In an illustrative example, the Secret Key, encoding, and decode methods are not detailed out for security purposes.

p (post), u (user), i (index), s (start), d (duration): Only post ID and user ID are required. The limitation for post ID is $2^{32}$ and user ID is $2^{32}$. The maximum number of combination is $2^{32+32}=64^{16}$. With base64 character set, this translates to 16 characters, but in some embodiments, we add $64^5$ salt to the value, ending up with 22 character encoded ID.

Additional characters to the ID may be added for optional functionality. Instead of being encrypted, information is encoded with arbitrary length limitation. In the example, there are three fields with assumed length limitations. index is $64^1=64$ encoded in one character, start time is $2^{16}$ and duration is $2^8$, $2^{24}=64^4$ encoded in 4 characters These fields may be changed depending on the use case. Conversely, when the user supplies these ID in encoded form, these get converted into integer values doing the reverse operation.

In an illustrative example, various embodiments of inventions disclosed herein may relate to techniques for video analytics, and more particularly, to techniques and implementation for video segmentation and summarizing, viewing, browsing, navigating, and bookmarking videos and displaying optimized preview images. In some embodiments, video segmentation and summarization may be based on multiple features from the raw video data and other metadata, including, for example, features such as subtitle or transcript, even without needing the classification information from other videos.

A portion of the disclosure of this patent application contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

In some exemplary scenarios illustrative of prior art usage, media contents in the internet may not be optimized to watch or navigate interesting/highlighted sections. In various examples of prior art usage, finding meaningful segments of a given media content may require considerable time and effort. Various types of prior art media content segmentation techniques and bookmarking implementation methods can allow a user to browse section or segment of interest within audio/video content being watched. In some prior art usage scenarios, metadata associated with media article may be used to collaborate with other users using social media.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f).

According to an embodiment of the present invention, the system and method may be accomplished through the use of one or more computing devices. As depicted, for example, in FIG. 1, FIG. 2, FIG. 3, and FIG. 4, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus, comprising:
   a computer-implemented multimedia processing system configured to identify highlight sections of a multimedia stream, comprising:
   a processor; and,
   a memory that is not a transitory propagating signal, the memory connected to the processor and encoding data and computer readable instructions, including processor executable program instructions, the data and computer readable instructions accessible to the processor, wherein the processor executable instructions, when executed by the processor, cause the processor to perform operations comprising:
   receive a multimedia stream;
   divide the multimedia stream into sections segmented as a function of a characteristic of the multimedia stream, wherein the segmented sections are divided as a function of matching a chi-square histogram distance peak of the characteristic to a chi-square histogram distance trough of the characteristic; and,
   choose from the segmented multimedia stream sections a highlight multimedia segment selected as a function of the segmented multimedia stream section content.

2. The apparatus of claim 1, wherein the multimedia stream further comprises video.

3. The apparatus of claim 1, wherein the multimedia stream further comprises audio.

4. The apparatus of claim 1, wherein the characteristic of the multimedia stream further comprises a temporal characteristic.

5. The apparatus of claim 1, wherein the characteristic of the multimedia stream further comprises a spatial characteristic.

6. The apparatus of claim 1, wherein the operations performed by the processor further comprise evaluating the characteristic of the multimedia stream.

7. The apparatus of claim 1, wherein the operations performed by the processor further comprise: a first evaluation at a first time of the characteristic of the multimedia stream; and, a second evaluation at a second time of the characteristic of the multimedia stream.

8. The apparatus of claim 7, wherein the operations performed by the processor further comprise extracting a segment of the multimedia stream disposed between first and second multimedia stream boundaries determined as a function of: the first evaluation of the multimedia stream characteristic, and the second evaluation of the multimedia stream characteristic.

9. The apparatus of claim 7, wherein the operations performed by the processor further comprise determining if the extracted segment is a highlight segment based on evaluating the extracted multimedia stream segment as a function of: the characteristic of the multimedia stream; and, the multimedia segment content.

10. An apparatus, comprising:
    a computer-implemented video processing system configured to identify highlight sections of a video stream, comprising:
    a processor; and,
    a memory that is not a transitory propagating signal, the memory connected to the processor and encoding data and computer readable instructions, including processor executable program instructions, the data and computer readable instructions accessible to the processor, wherein the processor executable instructions, when executed by the processor, cause the processor to perform operations comprising:
    receive a video stream;
    divide the video stream into sections segmented based on extracting a segment of the video stream disposed between first and second video stream boundaries determined as a function of: a first evaluation of the video stream characteristic; and, a second evaluation of the video stream characteristic, and wherein the segmented sections are divided as a function of matching a chi-square histogram distance peak of the characteristic to a chi-square histogram distance trough of the characteristic; and,
    choose from the segmented video stream sections a highlight video segment selected as a function of the segmented video stream section content.

11. The apparatus of claim 10, wherein the video further comprises audio.

12. The apparatus of claim 10, wherein the characteristic of the video stream further comprises a temporal characteristic.

13. The apparatus of claim 10, wherein the characteristic of the video stream further comprises a spatial characteristic.

14. The apparatus of claim 10, wherein the operations performed by the processor further comprise: determining if the extracted segment is a highlight segment based on evaluating the extracted video stream segment as a function of: the characteristic of the video stream; and, the video segment content.

15. The apparatus of claim 14, wherein the operations performed by the processor evaluating the extracted video stream segment content further comprise evaluating a function of multimedia content activity.

16. The apparatus of claim 10, wherein the video processing system further comprises a touch-enabled user interface adapted to interactively present user-selectable extracted video stream highlight segments in a random-access preview display.

17. An apparatus, comprising:
    a computer-implemented video processing system configured to identify highlight sections of a video stream, comprising:
    a processor;
    a touch-enabled user interface operably and communicatively coupled with the processor; and, a memory that is not a transitory propagating signal, the memory connected to the processor and encoding data and computer readable instructions, including processor executable program instructions, the data and computer readable instructions accessible to the processor, wherein the processor executable instructions, when executed by the processor, cause the processor to perform operations comprising:

receive a video stream;

divide the video stream into sections segmented based on extracting a segment of the video stream disposed between first and second video stream boundaries determined as a function of: a first evaluation of the video stream characteristic; and, a second evaluation of the video stream characteristic, and wherein the segmented sections are divided as a function of matching a chi-square histogram distance peak of the characteristic to a chi-square histogram distance trough of the characteristic;

choose from the segmented video stream sections highlight video segments selected as a function of the segmented video stream section content; and, present user-selectable extracted video stream highlight segments in a random-access preview display.

18. The apparatus of claim 17, wherein the operations performed by the processor further comprise providing collaboration access to a summarized video stream constructed as a function of extracted highlight video segments.

19. The apparatus of claim 18, wherein the operations performed by the processor providing collaboration access to the summarized video stream further comprise constructing the summarized video stream from extracted video highlights selected by a predictive analytic model adapted to identify user-preferred highlights.

20. The apparatus of claim 17, wherein the operations performed by the processor evaluating the extracted video stream segment content further comprise evaluating text.

* * * * *